3,849,392

PROCESS FOR THE PRODUCTION OF POLYCONDENSATION PRODUCTS OF AROMATIC DIAZONIUM COMPOUNDS

Hartmut Steppan, Wiesbaden-Dotzheim, Germany, assignor to Kalle Aktiengesellschaft, Wiesbaden-Biebrich, Germany

No Drawing. Continuation of abandoned application Ser. No. 826,296, May 20, 1969. This application Feb. 7, 1972, Ser. No. 224,324
Int. Cl. C07c *113/04;* G03c *1/54;* G03f *1/54*
U.S. Cl. 260—141 32 Claims

ABSTRACT OF THE DISCLOSURE

This invention relates to a process for the preparation of polycondensation products of aromatic diazonium compounds, useful as light-sensitive coatings, particularly in the preparation of printing plates and the like, in which at least one $A—N_2X$ compound and at least one $B_1$ compound of the formula:

$$E(—CHR_a—OR_b)_m$$

in which: $A—N_2X$ is a radical of a compound selected from the group consisting of a compound of the formulae:

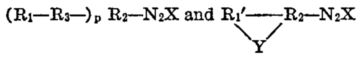

wherein $R_1$ is an aryl group of the benzene or naphthalene series
$R_1'$ is an arylene group of the benzene or naphthalene series
$R_2$ is a phenylene group
$R_3$ is a single bond or one of the groups —$(CH_2)_q$—$NR_4$—
—O—$(CH_2)_r$—$NR_4$—
—S—$(CH_2)_r$—$NR_4$—
—S—$CH_2$—CO—$NR_4$—
—O—$R_5$—O—
—O—
—S— or
—CO—$NR_4$— the left-hand free valence of the specified groups is attached to $R_1$ and the right-hand free valence is attached to $R_2$, wherein

*q* is a number from 0 to 5
*r* is a number from 2 to 5

$R_4$ is selected from the group consisting of hydrogen, alkyl with 1 to 5 carbon atoms, aralkyl with 7 to 12 carbon atoms, and aryl with 6 to 12 carbon atoms,
$R_5$ is an arylene group having 6 to 12 carbon atoms
Y is one of the groups
—NH—, and —O—
X is an anion
P is a number from 1 to 3
E is a residue obtained by splitting off of *m* H atoms from a compound free of diazonium groups selected from the group consisting of aromatic amines, phenols, thiophenols, phenol ethers, aromatic thioethers, aromatic heterocyclic compounds, aromatic hydrocarbons and organic acid amides,
$R_a$ is selected from the group consisting of hydrogen and phenyl,
$R_b$ is selected from the group consisting of hydrogen and alkyl and acyl groups having 1 to 4 carbon atoms, and a phenyl group, and
*m* is an integer from 1 to 10, are reacted in a strongly acid condensation medium and under condensation conditions sufficient to produce a polycondensation product of an aromatic diazonium compound containing, on the average, about 0.1 to 50 $B_1$ units per unit of $A—N_2X$.

This is a continuation of application Ser. No. 826,296 filed May 20, 1969, and now abandoned.

This invention relates to a new process for the preparation of light-sensitive compounds, the compounds prepared according to the new process, and to light-sensitive reproduction material, which latter comprises a support having a reproduction layer thereon containing at least one of the novel compounds which are light-sensitive condensation products of aromatic diazonium salts.

It is known to use light-sensitive aromatic diazonium compounds for sensitizing reproduction materials which are useful for the production of single copies or printing plates.

High molecular weight diazonium salts with several diazonium groups in the molecule have been advantageously employed, particularly in the production of tanned images or planographic printing forms, the reproduction layer of which is to be rendered insoluble or oleophilic by the action of light. These diazonium compounds usually have a resinous character and are obtained, for example, by the introduction of diazonium groups into phenol-formaldehyde condensation resins either by nitration, reduction, and diazotization or by other known reactions. The diazo resins thus obtained have certain disadvantages, however, e.g. a very limited storability, and therefore have not become of practical importance.

Polyfunctional diazonium salts have been obtained in another way, i.e., certain aromatic diazonium salts have been condensed in an acid condensation medium with active carbonyl compounds, particularly formaldehyde. This type of high molecular weight diazonium compound is used on a large scale in the production of reproduction materials, particularly in the production of printing forms. Of these compounds which are described, for example, in U.S. Pats. Nos. 2,063,631 and 2,667,415, particularly the condensation products of diphenylamine diazonium salts with formaldehyde have become of great technical importance.

The preparation of such and similar diazo resins is further described in U.S. Pats. Nos. 2,679,498; 3,050,502; 3,311,605; 3,163,633; 3,406,159, and 3,227,074.

The production of tanned images by combining such diazo resins with hydrophilic colloids and, if desired, dyestuffs or pigments, in reproduction layers is described, for example, in U.S. Pats. Nos. 2,100,063; 2,687,958, and 3,010,389.

By far the greatest importance, however, of this class of diazo resins is in reproduction materials for the photomechanical production of planographic and offset printing forms. The diazo resins may be employed in the reproduction layers of these materials without further additives or, for example, in combination with water-soluble colloids or with water-insoluble polymers which are not light-sensitive. Exemplary of suitable supports for such reproduction layers are water-resistant papers with suitable lithographic surfaces, i.e., superficially saponified cellulose acetate, metal supports such as aluminum, zinc, copper, brass, chromium, niobium, and tantalum; multimetal supports; lithographic stone; and the like. Metal supports are preferable for long printing runs and aluminum is usually employed. The use of metal as a supporting material for reproduction layers containing the listed diazo resins has the disadvantage, inter alia, that the adhesion of the exposure products of the diazo resins on the metal supports usually is not very good and, furthermore, that the metal may have a decomposing effect on the diazo resin.

A number of suggestions have been made for avoiding these difficulties, e.g. to pretreat the metal surface with silicates (U.S. Pat. No. 2,714,066), with organic polyacids (U.S. Pat. No. 3,136,636), with phosphonic acids and their derivatives (U.S. Pat. No. 3,220,832), with potassium hexafluorozirconate (U.S. Pat. No. 2,946,683), furthermore to use diazo resins prepared in phosphoric acid (U.S. Pat. No. 3,235,384), to add phosphoric acid to the diazo resins and to use them in a metal salt-free state (U.S. Pat. No. 3,236,646), to use anodized aluminum surfaces, and the like.

Despite finding wide technical use, the known diazo resins have other disadvantages. With the low molecular weight condensates which are advantageously employed, with respect to storability, only unsatisfactory ink acceptance of the exposure products is achieved on non-metallic supports into which the mass can easily penetrate, e.g. on superficially saponified cellulose acetate film.

Another drawback of the known diazo resins lies in that their usually employed double salts with zinc chloride, and particularly the metal salt-free products containing phosphoric acid or other acids, yield reproduction layers having a high sensitivity to moisture and thus to fingerprints. In the case of careless handling, the reproduction layer may be easily damaged.

For overcoming this drawback it has been suggested in U.S. Pat. No. 3,300,309, for example, to react the diazo resins with certain phenolic coupling components to obtain addition products sparingly soluble in water and yielding reproduction layers which are less sensitive to moisture. These addition products, which contain relatively loose bonds of the nature of a salt or complex, can be easily decomposed again, e.g. by organic solvents, and their stability thus is not sufficient under all conditions.

Furthermore, the light-sensitivity is not satisfactory, particularly in the case of the known diazo resins which have excellent thermostability, e.g. condensation products of 3-alkoxy-4-diazo-diphenylamine with formaldehyde.

A common disadvantage of the diazo resins hitherto preferably technically employed, furthermore resides in the fact they can be separated only with difficulty in a metal salt-free form, e.g. as chlorides, sulfates, or as salts of simple organic sulfonic acids, and their salts are often only insufficiently soluble in organic solvents.

The drawbacks of the prior art can be overcome, or at least considerably reduced, by using new diazo condensation products instead of the diazonium salts hitherto employed for the above applications.

In co-pending application Ser. No. 826,297, filed May 20, 1969, and now abandoned, by Leon A. Tencher there are described and claimed novel light-sensitive compounds and a light-sensitive reproduction material which comprises a support having a reproduction layer thereon, the latter containing at least one of the novel compounds which are light-sensitive condensation products of aromatic diazonium compounds which condensation products include at least one unit each of the general types:

$$A(—D)_n \text{ and } B,$$

which are connected by a bivalent intermediate member derived from a condensable carbonyl compound and wherein A is a radical of a compound containing at least two aromatic carbocyclic and/or aromatic heterocyclic nuclei, which compound is capable of condensation in at least one position with an active carbonyl compound in an acid medium, D is a diazonium salt group attached to an aromatic carbon atom of A, $n$ is an integer from 1 to 10, and B is a radical of a compound free of diazonium groups, which compound is capable of condensation in at least one position with an active carbonyl compound in an acid medium, the condensation product containing, on the average, about 0.01 to 50 B units per of $A(—D)_n$.

In co-pending application Ser. No. 826,289, filed May 20, 1969 by Thomas N. Gillich and now U.S. Pat. No. 3,679,419, there are described and claimed novel light-sensitive compounds, a process for their preparation and a light-sensitive reproduction material containing the novel compounds, the latter being light-sensitive condensation products of at least one diazonium salt of the general formula

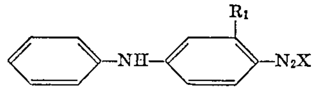

wherein $R_1$ is selected from the group consisting of H, an alkoxy group having from 1 to 4 carbon atoms, and a 2-hydroxy-ethoxy group, and X is the anion of the diazonium salt, and at least one compound of the general formula $$R(—CH_2—OR_2)_n$$

wherein $n$ is an integer from 1 to 4,

R is a residue produced by the splitting off of $n$ hydrogen atoms from a diphenyl ether, and $R_2$ is selected from the group consisting of H, an alkyl group with 1 to 4 carbon atoms, and an acyl group with 1 to 4 carbon atoms, said condensation product containing, on the average, 0.25 to 0.75 unit derived from $R(—CH_2—OR_2)_n$ per diazo group.

The first-mentioned co-pending application, furthermore, describes and claims a process for the preparation of the novel light-sensitive condensation products which process comprises condensing, in a strongly acid medium, at least one aromatic diazonium compound of the general formula $A(—D)_n$ and at least one compound B, the symbols having the above-indicated meanings, with at least one active carbonyl compound, in a free form, or with agents producing such a carbonyl compound.

This process often may be employed advantageously when the components $A(—D)_n$ and B are sufficiently soluble in the condensation medium. Whereas many diazo compounds exhibit this solubility, only part of components B concerned are sufficiently soluble in the condensation mixture.

But unfortunately such compounds B as yield mixed condensates leading to reproduction materials with particularly advantageous properties have a very low solubility in the strong acids of high concentration which are preferred as condensation media. This applies, for example, to the aromatic hydrocarbons, phenol ethers, and certain non-basic heterocyclic compounds.

A number of such compounds are sufficiently soluble in 96 to 98% sulfuric acid which is highly effective as a condensation medium, but sulfonation of components B easily occurs as a side-reaction in this medium and the desired mixed condensates are not obtained in these cases. Mesitylene, anisole, and diphenyl ether, for example, dissolve in 96 to 98% sulfuric acid at 30 to 40° C. with sulfonation. This trouble does almost not occure in 80% sulfuric acid but, on the other hand, the solubility of the mentioned preferred second components is relatively low.

Furthermore, highly concentrated sulfuric acid is not preferred as a reaction medium since a number of diazo compounds, e.g. the 3-alkoxy-diphenylamine-4-diazonium salts yielding particularly valuable mixed condensates are very sensitive to this acid. 80 to 100% phosphoric acid is a substantially more gentle condensation medium but the solubility of many preferred components B is particularly low in this acid.

It is possible to achieve a certain improvement of the homogeneity during condensation by the addition of organic solvents, e.g. glacial acetic acid or methanol, but it has to be taken into account that the efficiency of the condensation medium often is decreased too much thereby, in comparison with the pure acid, and the danger of side-reactions occurs.

Furthermore, when using components $A(—D)_n$ and B having very different reaction speeds with respect to the active carbonyl compound, it is not easy to prevent the formation of homocondensates of the more rapidly reacting component and to perform condensation in a manner such that condensation products of a relatively uniform structure are obtained. Due to the extra-ordinarily numerous reaction possibilities of the three reaction partners, it is difficult to obtain always the same condensation products from the same starting products. If condensation products with exactly reproducible properties are to be obtained, it generally is necessary to carefully keep to the same reaction conditions.

These and other difficulties during the production of diazo mixed condensates are avoided or at least considerably diminished if the condensation products are produced according to the process described below, which is the object of the present invention.

The present invention relates to a new process for the preparation of light-sensitive aromatic diazo condensation products of the above-indicated general type, to the compounds obtained according to the new process and the use of the compounds in light-sensitive reproduction material which process comprises reacting at least one $A(—D)_n$ compound and at least one $B_1$ compound of the general formula $E(—CHR_a—OR_b)_m$ in a strongly acid medium, wherein A is a radical of a compound containing at least two members selected from the group consisting of an aromatic ring and a heterocyclic ring of aromatic nature, D is a diazonium salt group linked to an aromatic carbon atom of A,

*n* is an integer from 1 to 10,

E is a residue obtained by the splitting-off of *m* H atoms from a compound free of diazonium groups and being capable of condensation in at least one position with an active carbonyl compound in an acid medium, $R_a$ is selected from the group consisting of hydrogen, alkyl, aryl, and heterocyclic groups, $R_b$ is selected from the group consisting of hydrogen, alkyl or acyl groups having 1 to 4 carbon atoms, and a phenyl group, and

*m* is an integer from 1 to 10, the condensation product containing about 0.1 to 50 units derived from $B_1$ per unit of $A(—D)_n$.

In the above formula, $R_a$ is preferably hydrogen and $R_b$ preferably hydrogen, methyl, ethyl or acetyl.

Although longer alkyl chains or higher acyl groups may be used, they reduced normally in an undesirable manner the solubility of the component $B_1$ in the condensation mixture and thus impede the condensation process and render it more expensive.

Depending on the size of the molecule, the value of *m* may range from 1 to about 10. Preferably it does not exceed 4. It can be assumed that during condensation component $B_1$ reacts completely or partially with component $A(—D)_n$ or with itself (particularly when an excess of component $B_1$ is present), with intermolecular splitting off of $R_bOH$, thus forming the condensation products. The behavior and the composition of the reaction products can be explained by such a condensation process.

The condensation according to the process of the invention proceed surprisingly smoothly, i.e. in many cases already under very moderate conditions, e.g. at 10 to 40° C. in 80 to 100% phosphoric acid practically quantitatively with the formation of mixed condensates.

The process of the invention for the production of mixed condensates from diazo compounds $A(—D)_n$ and $B_1$, inter alia, has the following advantages over the reaction of $A(—D)_n$ and B with carbonyl compound:

(1) In cases where components B having very different reaction speeds with respect to the diazo compound are employed, the transition to compound $B_1$ generally favors the mixed condensation with respect to the homocondensation of the more rapidly condensing partner.

(2) In many cases, condensation of $A(—D)_n$ with $B_1$ is possible under more moderate conditions than is the corresponding condensation of $A(—D)_n$, B, and active carbonyl compound. This is of advantage when $A(—D)_n$ or B are sensitive to highly active condensation media, e.g. concentrated sulfuric acid.

(3) In the case of condensation of $A(—D)_n$ with $B_1$, it generally is possible to obtain more uniform and better defined condensation products of a better quality and in a higher yield.

(4) The compounds $B_1$ generally are more readily soluble in the usual strongly acid condensation media than is the parent compound B. An addition of organic solvents during condensation thus can be dispensed with in most cases. Especially suitable is the application of low-melting, particularly liquid components $B_1$. The low alkyl ethers ($R_b$=alkyl), therefore, are a preferred group of components $B_1$.

(5) The process is less susceptible to trouble and substantially more easily reproducible since it can be performed in many cases in the homogeneous phase.

A group of mixed condensates prepared according to the process of the invention also distinctly differs in substance characteristics from the mixed condensates prepared according to the process of the co-pending application from the corresponding components $A(—D)_n$, B and formaldehyde. This group derives from components $B_1$ which, preferably under moderate condensation conditions, e.g. in 80 to 100% phosphoric acid at temperatures from 10 to 40° C., do not undergo substantial splitting off of formaldehyde.

This group particularly includes such components $B_1$ as derive from parent compounds of the series of the aromatic hydrocarbons, the phenol ethers, the aromatic thioethers, and the non-basic heterocycles, e.g. diphenylene sulfide, diphenylene oxide, phenoxathiine, and the like. These parent compounds have as a common feature the property to undergo a condensation reaction with formaldehyde not in an alkaline medium but only in an acid medium. It also should be noted, however, that phenol alcohols, obtained in an alkaline medium from phenols or the ethers and esters thereof with a free phenolic OH group undergo a surprisingly slight splitting off of formaldehyde under the above-mentioned moderate conditions.

N-methylol compounds as well as the ethers and esters thereof, however, are more easily accessible to the splitting off of formaldehyde under condensation conditions.

The mentioned group of the condensation products obtained according to the process of the invention differs in the arrangement of the units from the condensates obtained from $A(—D)_n$, B, and formaldehyde. In the condensates of the invention, the units $A(—D)_n$ are linked together substantially only via linking members derived from one or more molecules $B_1$. This means that the distance from diazo group to diazo group in the mixed condensate normally has at least a minimum value caused by the structure of E, whereas condensates prepared according to the process of the co-pending application contain the units $A(—D)_n$ and B linked by methylene bridges substantially in a statistical distribution or in other mixed arrangements which are influenced by the manner in which $A(—D)_n$, B, and formaldehyde are introduced into the acid. Such products, of course, also include condensates with more units $A(—D)_n$ only linked to one another by methylene bridges, a type which practically does not occur in the condensates prepared according to the process of the invention since the mentioned components $B_1$ are not to be regarded as agents splitting off formaldehyde under moderate condensation conditions, e.g. 10 to 40° C. and 80 to 100% phosphoric acid as the condensation medium.

Within the scope of this invention, the most important process products are those in the production of which $B_1$ is used in such a quantity that at least one —$CHR_aOR_b$ group occurs per each molecule $A(—D)_n$. Particularly preferable are such mixed condensates as contain about 0.5 to 2 moles of $B_1$ per unit of $A(—D)_n$.

Within this large group, there should be pointed out another preferred group of condensation products which have been prepared under moderate condensation conditions from the above-mentioned components $B_1$ practically not splitting off formaldehyde during condensation and from easily condensable diazonium salts of the general formula $$R_1—R_3—R_2—N_2X,$$

wherein $R_1$ is a phenyl group either unsubstituted or substituted by one or more alkyl or alkoxy groups, $R_2$ is a benzene ring which, in addition to the diazonium group, may carry one or two identical or different substituents which may be halogen atoms, alkyl groups with 1 to 4 carbon atoms, or alkoxy groups with 1 to 5 carbon atoms, and $R_3$ is a homopolar bond or one of the members

—O—
—S—
—NH—.

Of the last preferred group of condensation products prepared according to the invention such are particularly preferred as are obtained with chemically uniform compounds $B_1$, i.e. not with isomer mixtures.

Such particularly preferable compounds $B_1$ are di-methoxymethyl-diphenylether, particularly the 4,4′-isomer,
di-methoxymethyl-diphenylsulfide, particularly the 4,4′-isomer,
di-methoxymethyl-diphenyl, particularly the 4,4′-isomer,
4,4′-bis-methoxymethyl-diphenylmethane.

By the use of these uniform components $B_1$, in addition to the above-mentioned predominantly alternating structure of the condensates, a degree of uniformity of the products is achieved as it usually can not be achieved by the condensation of $A(—D)_n$ and formaldehyde. The mixed condensates prepared according to the process of the invention generally have a more uniform chemical structure than have those prepared according to the last-mentioned process. It also is possible according to the process of the invention to obtain mixed condensates of higher molecular weights already under more moderate conditions.

Therein and in the more uniform structure of the process products of the invention there might be the cause of the particularly easy separability thereof from aqueous solutions in the form of scarcely soluble salts, the high yields in the production and the better application properties thereof in light-sensitive reproduction layers.

This particularly applies to the condensation products from 3-alkoxy-diphenylamine-4-diazonium salts and 0.75 to 2 moles of $B_1$, $B_1$ deriving from diphenyl ether, diphenyl sulfide, diphenyl, and diphenyl methane, $m$ being 2, and uniform compounds $B_1$ being used, particularly those the —$CHR_aOR_b$ groups of which are in p,p′-positions.

In the case of particularly reactive basic compounds $B(=EH)_m$, the components $B_1$ may be prepared by the addition of active carbonyl compounds in an alkaline or neutral medium to the basic compounds (such as phenols, sulfonamides or carbonamides). The primarily formed addition products of the alcohol type may be easily converted into the corresponding ethers or esters which are normally more stable.

In the case of basic compounds B which do not form addition products with active carbonyl compounds in an alkaline medium, but react in an acid medium (such as aromatic hydrocarbons and phenol ethers), an indirect production of the compounds $B_1$ is advisable, since it is normally impossible, when reacting a compound B with an active carbonyl compound in an acid medium, to separate the intermediate products of the type $B_1$ in a satisfactory yield because they further react too rapidly under the reaction conditions prevailing.

The indirect preparation of the compounds of type $B_1$ may be carried out by the following methods, e.g.:

(1) By halogenmethylation of compounds B and subsequent conversion of the halogen methyl compounds obtained into the corresponding alcohols, esters or ethers.

(2) By side-chain halogenation of compounds B carrying methyl groups in the aromatic nucleus, i.e. conversion of these methyl groups into mono-halogenmethyl groups which are then reacted as described at (1).

(3) By splitting reaction products of a Mannich reaction with acetic anhydride.

(4) By reduction of compounds B carrying aldehyde, ketone or carboxylic acid ester groups in their aromatic rings to the alcohol stage and further etherification or esterification, if desired.

(5) By reaction of aromatic metallo-organic compounds with formaldehyde or other aldehydes, or of aromatic aldehydes the CHO groups of which are attached to the aromatic nucleus, with metallo-organic compounds.

The preparation of compounds corresponding to the general formula $B_1$ is known and described in detail in the literature. Some compounds of the type $B_1$ are commercially available. The preparation of the compounds corresponding to the general formula $B_1$ does not come within the scope of the present invention.

The compounds of the general formula $B_1$ may be employed in the form of mixtures of isomers and/or as mixtures of compounds which differ in the parameter $m$. It is of advantage, however, as mentioned above, to use uniform compounds of the type $B_1$ or definitely adjusted mixtures of such compounds for condensation, because in this manner the number of chemical variations in the structure of the condensation products is considerably reduced so that reproducible condensation products can be prepared particularly easily. Compounds of the type $B_1$ are preferred, in which the aromatic nuclear positions capable of condensation with carbonyl compounds or with groups —$CHR_a$—$OR_b$, or at least some of these positions, are occupied by such groups or other groups.

The condensation process according to the invention can also be performed by using the corresponding thio compounds of the general formula $B_1$ $$E(—CHR_a—S—R_b)_m.$$

However, the condensation process proceeds far less smoothly in such cases and there may be an annoyance by unpleasant odors. Moreover, these thio compounds of type $B_1$ are considerably more expensive than the easily accessible oxygen compounds.

The process of the present invention has a plurality of variations relating to the performance of the condensation, the quantitative ratios employed and the like.

Condensation in accordance with the invention is performed in the presence of a strongly acid condensation medium. Preferably employed are concentrated moderately strong to strong acids of which the content of acid predominates with respect to that of diluent. The condensation medium further should be so selected that it is liquid under condensation conditions.

The lower limit of the quantity of acid condensation medium which is employed for the mixed condensations according to all process variations described is determined by the viscosity of the mixture, and the upper limit by the economy of the process. The procedure preferably is such that, on the one hand, as little acid as possible is used and that, on the other hand, an easily stirrable and easily mixable condensation mixture is obtained. When selecting the type and quantity of the acid to be used, the condensability and solubility of the components in the acid should be considered.

The most favorable conditions for each combination of $A(—D)_n$ and $B_1$ are determined in preliminary tests. Particular care should be observed with regard to the exothermic condensation reaction so that it does not proceed too vigorously, since this would impede the control of the reaction procedure and furthermore might lead to decomposition of the diazo compounds.

Exemplary of acids suitable as condensation media are those listed in U.S. Pat. No. 3,235,382, column 1, line 71, to column 2, line 5.

Condensation media useful for the present process are phosphoric acid, methanesulfonic acid, and sulfuric acid, which acids are employed in concentrations of at least 40%, preferably 70 to 100% by weight. The remainder generally is water, but also may entirely or partially consist of solvents, e.g. methanol, acetic acid, N-methyl-pyrrolidone, and the like. 85% phosphoric acid, 80% sulfuric acid, and 90% methanesulfonic acid are successfully employed, for example.

80–100%, particularly 85–90%, phosphoric acid is a rather mild condensation medium in which the condensations can be performed very gently. It is, therefore, the most preferred condensation medium for all combinations of compounds which will react sufficiently fast under these rather gentle conditions.

80–100%, particularly 90%, methanesulfonic acid is a stronger medium. This acid is advantageous as it dissolves a plurality of components $B_1$ still more readily than phosphoric acid.

Halogen hydracids, such as at least 15%, preferably concentrated, aqueous hydrochloric acid or hydrobromic acid, are suitable as condensation media only to a limited extent. The use of these acids is less favorable, since, under such conditions, halogen alkyl compounds of low reactivity are formed which do not further react under relatively moderate condensation conditions.

For the same reason, diazonium salts such as diazonium phosphates or sulfates are superior in many cases to the halides as starting materials for condensation.

When diazonium salts are to be used for mixed condensation, which salts are in the form of the often used metal halide double salts, it is generally advisable to dissolve them in the condensation medium, then pass dry nitrogen or dry air through the mixture until all the chloride ions have escaped in the form of gaseous hydrochloric acid, and then use the halide-free solution for condensations.

The quantity of the acid serving as the condensation medium may vary within wide limits. It is possible, for example, to use 1 to 100 parts by weight of acid per part by weight of the mixture of $A(—D)_n+B_1$, as shown in the examples. The quantity of acid also may be higher without generally obtaining further advantages, however. It is important to employ the condensation medium in a quantity sufficient to ensure an easily mixable reaction medium.

Depending upon the condensation medium, the condensation partners and their concentration in the condensation medium, it may be necessary to accelerate the condensation reaction by heating or to slow it by cooling. It is advisable to use a condensation temperature not in excess of 70° C., since the stability of the diazo compounds $A(—D)_n$ generally is limited at a higher temperature. It is possible, however, to prepare diazo condensation products according to the invention also above 70° C. The preferable temperature range for the preparation of the condensates is from +10° C. to +40° C., however.

It is of advantage to perform all variations of the mixed condensations in homogeneous reaction media, because reproducible results are most easily obtained in such media. Therefore, components $B_1$ which are not liquid may be employed in the form of solutions, the solvent used being e.g. methanol, acetic acid and the like. However, if some of the components are only sparingly soluble in the condensation medium, they also may be used in the form of very fine suspensions or as emulsions in the condensation medium. In any case, care should be taken that the condensation mixture is thoroughly mixed mechanically.

If the condensation process is impeded by an insufficient solubility of the starting materials or end products, a homogeneous condensation medium may be achieved by adding an organic solvent. Of course, tests must be made in each case to determine which organic solvents are suitable. Glacial acetic acid has proved to be suitable for many cases, for example. Other suitable solvents are, e.g.: formic acid, N-methyl-pyrrolidone, and methanol. When adding an organic solvent, it should be considered that this often reduces the efficiency of the condensation medium, as compared with the unmixed concentrated acid and that the use of a solvent also may cause side reactions.

For the preparation of the mixed condensates, the proportions of the reactants $A(—D)_n$ and $B_1$ and the conditions of the condensation process may be varied within wide limits.

It is, in principle, possible to produce mixed condensates of any desired composition, e.g. mixed condensates containing only traces of a diazo compound $A(—D)_n$ condensed therein. Generally, mixed condensates containing, on the average, 0.01 to 50 moles of second component per mole of $A(—D)_n$, may be useful for the preparation of valuable light-sensitive reproduction materials. Apart from special cases, the most important mixed condensates are those which contain 0.1 to 20 moles of second component per mole of $A(—D)_n$. Within this range, the mixed condensates normally display properties which are clearly distinguished from those of the corresponding homocondensates.

In the simplest and also most preferred case, mixed condensation is effected by dissolving the $A(—D)_n$ compound in an acid suitable as the condensation medium, and adding the compound $B_1$, either in the form of the substance itself or as a solution, while stirring. Various modifications of this process may be made, bearing in mind, however, that it is disadvantageous in many cases to dissolve $B_1$ in the condensation medium in the absence of $A(—D)_n$, since, depending on the reactivity of $B_1$, homocondensates of $B_1$ may separate from such solutions more or less quickly which are no longer easily accessible to a mixed condensation.

However, it is possible in many cases to mix components $A(—D)_n$ with $B_1$ and to introduce the mixture or the individual components into the acid either in the form of a solution or as the substances themselves.

In a few cases the condensation reaction may be initiated with the $B_1$ component and the $A(—D)_n$ component may be added later. It is even possible, by one of these methods, to condense diazo resins, e.g. those prepared by acid condensation of diphenylamine - 4 - diazonium salts with carbonyl compounds and having lower condensation degrees, with one or several components $B_1$ in an acid medium. In some cases, a mixed condensation of a lower molecular weight homocondensate of a second component $B_1$ with $A(—D)_n$ in an acid medium is possible, and even a mixed condensation of formaldehyde condensates of a compound $A(—D)_n$ with homocondensates of a compound $B_1$ or mixed condensates of several compounds $B_1$ in an acid medium may be successfully performed.

In the preparation of soluble condensates generally those components $B_1$ are preferred, in which $m$ is 2 or slightly greater than 2, i.e. about 3 or 4. Within this class, components with $m=2$ are particularly preferable since they yield condensation products of a simpler structure and polycondensation products carrying more than one diazo group per molecule, when $n$ equals 1 in $A(—D)_n$, and, also when employing several moles of $B_1$ per mole of $A(—D)_n$, the tendency to formation of cross-linked and sometimes insoluble condensation products is reduced in many cases. Components $B_1$ in which $m$ is greater than 2 preferably are employed in smaller quantities, the quantity of such compounds generally does not exceed 1 mole per mole of diazo compound.

The upper limit must be ascertained for each individual case by experiment. An important application of those components in which $m$ is greater than 2 is their combined use with compounds in which $m=2$.

Components $B_1$ in which $m=1$ also may be used for condensation, but in this case diazo condensates are obtained which carry only one diazo group per molecule, when $n=1$ in $A(—D)_n$. The use of such condensation products in the reproduction layers generally is not preferred. It is of advantage, however, to combine components of type $B_1$, in which $m$ is 1, with those in which $m=2$ or a number greater than 2. In these cases, the first mentioned component $B_1$ ($m=1$) may perform the function of a "modifier" for the size of the molecules formed during condensation.

The mean molecular weights of the condensation products may vary within wide limits, depending on the selection of the condensation partners and conditions. It has been found that, for the production of good reproduction materials, mixed condensates having molecular weights between about 500 and 10,000 are generally preferred. It should be considered that these values are mean values and that the molecular weights of the individual constituents of each condensate obtained are statistically distributed about this mean value. The type of distribution is shown in some of the examples below by way of a fractionation of the condensates obtained.

The mixtures obtained by condensation can be used directly or further processed. The mixture also can be worked up and the condensates can be separated in a solid form.

Working up of the condensation mixtures can be performed in various ways. The method is adapted to the chemical and physical properties of the particular reaction product. Mixed condensates containing a relatively large quantity of second component $B_1$ often can be separated by stirring the condensation mixture into water. It may occur in these cases that a more soluble fraction of the mixed condensate can be separated from the aqueous mother liquor in the form of any sparingly soluble salt. When the mixed condensate is water-soluble but sparingly soluble in organic solvents, it is often possible to separate the product by diluting the reaction mixture with an organic solvent, e.g. with a lower alcohol or a lower ketone, and the like.

An advantage of many of the condensates prepared according to the process of the invention resides in their easy separability in the form of salts free from complex-forming metal salts. Many condensates, for example, yield sulfates, chlorides, and bromides which are sparingly soluble in water and can be precipitated from aqueous solutions of the condensation mixtures by the addition of the corresponding acids or their salts soluble in water.

Some separation processes are described in the examples below.

The light-sensitive condensation products preferable are used in the form of diazonium salts. They also can be converted, in known manner, from this form into light-sensitive azides, diazo amino compounds, diazo sulfonates, and the like, and, in this form, be used as constituents of the reproduction materials of the invention.

Suitable components $A(—D)_n$ and $B_1$ for the preparation of the condensation products of the invention are, principally, all compounds which are capable of condensation in an acid medium and the basic structures of which are not decomposed under the condensation conditions.

As a rule, all compounds $B_1$ are capable of condensation in an acid medium according to the process of this invention, the basic structures of which are themselves capable of reaction with formaldehyde in such condensation medium.

Groups effecting the condensability of the compounds $A(—D)_n$ and $EH_m$ (which is the basic structure from which $B_1$ is derived) are the following:

(1) *Aryl radicals and heterocyclic radicals* which have nuclear positions capable of condensation. Preferred are radicals in which these nuclear positions are activated. This activation may be effected, for example, by annealation with additional aromatic rings or by substitution by groups such as —OH, —O-alkyl, —O-aryl, —SH, —S-alkyl, —S-aryl, -alkyl, -aryl, -amino, -alkylamino, -dialkylamino, -arylamino, -diarylamino, and the like. In addition to these activating substituents, the condensable aromatic or heterocyclic radicals also may contain condensation-inhibiting groups, e.g. nitro or sulfonic acid groups, if the activation caused by other groups is only reduced but not eliminated.

(2) Radicals which themselves are capable of condensation and may be directly linked to iso- or heterocyclic radicals or to aliphatic radicals or, if desired, may be directly linked to one another. Such radicals are groups such as carboxylic acid amide, sulfonic acid amide, N-alkylsulfonic acid amide, N-arylsulfonic acid amide, nitrile, urea, thiourea, urethane, ureido, thioureido, glyoxaldiureine, imidazolone, guanidine, dicyanodiamide, and amino groups directly attached to aromatic rings.

The following compound types or individual compounds are illustrative of the components of general formulae $A(—D)_n$ and $B_1$, which are used for the preparation of the diazo condensation products of the invention.

Diazonium compounds $A(—D)_n$.—The basic idea is that a benzene nucleus carrying the diazo group, apart from only few exceptions (e.g. 4-diazophenol) not included here, is deactivated to such an extent that condensation in nuclear positions of this ring is no longer possible under less severe conditions.

The diazonium compounds to be used in accordance with the present invention thus contain in the radical A, in addition to the aromatic iso- or heterocyclic nucleus carrying the diazo group, at least one aromatic iso- and/or heterocyclic ring having at least one condensable nuclear position and/or substituents of the above Type 2, which are themselves capable of condensation.

An important group of diazonium compounds particularly for processing into condensation products in accordance with the present invention has a structure according to the following general formula $$(R_1—R_3—)_pR_2—N_2X$$

in which $p$ is an integer from 1 to about 3, preferably 1;
X is the anion of the diazonium salt; it also may be formed by an acid substituent of the molecule;
$R_1$ is an aromatic iso- or aromatic heterocyclic group, if desired substituted, which has at least one position capable of condensation, and preferably is a phenyl group, if desired substituted.

Preferable substituents are those which increase the reactivity of the nucleus with respect to condensation, e.g. the alkyl, alkoxy, alkylmercapto, aryloxy, arylmercapto, hydroxy, mercapto, amino, and anilino groups.

$R_2$ is an aromatic ring of the benzene or naphthalene series, which, in addition to the diazo group, may carry other substituents;
$R_3$ is a connecting member between the rings $R_1$ and $R_2$, e.g. of the following types, of which the radical $R_1$ is always to be considered on the left-hand side, and the group $R_2$ on the right-hand side, if $R_3$ is not symmetrical:

Simple homopolar bond

—$(CH_2)_q$—$NR_4$— ($q$ is a number from 0 to 5, $R_4$ is H, or alkyl with 1 to 5 carbon atoms, or aralkyl with 7 to 12 carbon atoms or aryl with 6 to 12 carbon atoms)
—$(CH_2)_q$—$NR_4$—$(CH_2)_r$—$NR_5$— ($r$ is a number from 2 to 5, $R_5$ is H or alkyl with 1 to 5 carbon atoms)
—O—$(CH_2)_r$—$NR_4$—
—S—$(CH_2)_r$—$NR_4$—
—O—$R_6$—O— ($R_6$ is arylene with 6 to 12 carbon atoms)
—O—
—S—
—CO—$NR_4$—
—$SO_2$—$NR_4$—

Exemplary of compounds of the formula $$(R_1—R_3—)_pR_2—N_2X$$

are 2,3′,5-trimethoxy-diphenyl-4-diazoniumchloride
2,4′,5-triethoxy-diphenyl-4-diazoniumchloride
4-[3-(3-methoxy-phenyl)-propylamino]-benzenediazoniumsulfate
4-[N-ethyl-N-(4-methoxy-benzyl)-amino]-benzenediazoniumchloride
4-[N-(naphthyl-(2)-methyl-N-n-propyl-amino]-benzenediazoniumsulfate
4-N-[-(3-phenoxy-propyl)-N-methyl-amino]-2,5-dimethoxy-benzenediazoniumtetrafluoroborate
4-[N-(3-phenylmercapto-propyl-Nethylamino]-2-chloro-5-methoxy-benzenediazoniumchloride
4-[4-(3-methyl-phenoxy)-phenoxy]-2,5-dimethoxy-benzenediazoniumchloride
4-(4-methoxy-phenylmercapto)-2,5-diethoxy-benzenediazoniumchloride
4-(3,5-dimethoxy-benzylamino)-2,5-diethoxy-benzenediazoniumhexafluorophosphate
carbazole-3-diazoniumchloride
3-methoxy-diphenyleneoxide-2-diazoniumchloride
diphenylamino-4-diazoniumsulfate
2,5-diethoxy-4-phenoxy-benzene-diazoniumchloride Mixed condensates particularly suitable for use in the reproduction layers of this invention are obtained by using diazo compounds of the general formula $$(R_1—R_3—)_pR_2—N_2X$$

in which $p$ is an integer from 1 to 3, preferably 1,
$R_1$ is a phenyl group either unsubstituted or substituted by one or more alkyl or alkoxy groups,
$R_2$ is a benzene ring which, in addition to the diazonium group, may carry one or two identical or different substituents which may be halogen atoms, alkyl groups with 1 to 4 carbon atoms, or alkoxy groups with 1 to 5 carbon atoms, and
$R_3$ is a homopolar bond or one of the members

—O—
—S—
—NH—

A particularly important group of diazo compounds having structures according to the general formula $R_1—R_3—R_2—N_2X$, and which are preferably used in accordance with the present invention for the preparation of the diazo condensation products, are the salts of the diphenylamine-4-diazonium ion and its substitution products since these are particularly easily condensable in many cases and the condensation products yield particularly valuable reproduction layers.

Preferably employed substituents which may be linked to the phenyl nuclei of the diphenylamine-4- diazonium compounds are alkyl and alkoxy groups with 1 to 6, preferably 1 to 2, carbon atoms, furthermore the halogens and the following groups —COOR (R is H, alkyl or aryl)
—$CONH_2$
—CN
—COR (R is alkyl or aryl)
—$SO_2OR$ (R is H, alkyl or aryl)
—NHCOR (R is alkyl or aryl)
—NHR and NRR′ (R and R′ are alkyl, aryl, aralkyl)

Exemplary of such substituents which may be linked to the phenyl nuclei of the diphenyldiazonium group are methyl, propyl, isobutyl, trifluoromethyl, methoxy, difluoromethoxy, ethoxy, hydroxyethoxy, ethoxyethoxy, fluorine, chlorine, bromine, iodine, ethoxycarbonyl, phenoxycarbonyl, acetyl, methoxysulfonyl, ethoxysulfonyl, acetylamino, methylamino, ethylamino, dimethylamino, diethylamino, methylethylamino, phenylamino, benzylamino, methylbenzylamino, and ethylbenzylamino.

Suitable diphenylamine-4-diazonium salts are, for example, the diazonium salts derived from the following amines:

4-amino-diphenylamine,
4-amino-3-methoxy-diphenylamine,
4-amino-2-methoxy-diphenylamine,
4′-amino-2-methoxydiphenylamine,
4′-amino-4-methoxy-diphenylamine,
4-amino-3-methyl-diphenylamine,
4-amino-3-ethyl-diphenylamine,
4′-amino-3-methyl-diphenylamine,
4′-amino-4-methyldiphenylamine,
4-amino-3-ethoxy-diphenylamine,
4-amino-3-hexyloxy-diphenylamine,
4-amino-3-hydroxy-ethoxy-diphenylamine,
4′-amino-2-methoxy-5-methyl-diphenylamine,
4-amino-3-methoxy-6-methyl-diphenylamine,
4′-amino-3,3′-dimethyl-diphenylamine,
3′-chloro-4-amino-diphenylamine,
4′-amino-4-n-butoxy-diphenylamine,
4′-amino-3′,4-dimethoxy-diphenylamine,
4-amino-diphenylamine-2-sulfonic acid,
4-amino-diphenylamine-2-carboxylic acid,
4-amino-diphenylamine-2′-carboxylic acid, and
4′-bromo-4-amino-diphenylamine.

Preferably employed are 4-amino-diphenylamine and 3-methyl-4-amino-diphenylamine, particularly preferable are the 3-alkoxy-4-amino-diphenylamines having 1 to 3 carbon atoms in the alkoxy group, especially the 3-methoxy-4-amino-diphenylamine.

Diazonium compounds $A(—D)_n$ useful in the condensation reaction in accordance with the invention also may be homocondensation products of the described diazo compounds with active carbonyl compounds, i.e. relatively low-molecular weight types of the known diazo resins, for example, which, in accordance with the invention, can be regarded as larger molecules capable of further condensation and having several diazo groups.

The diazonium compounds $A(—D)_n$ may be reacted in the form of any soluble salt of a moderately strong to strong acid, e.g. in the form of a salt of sulfuric acid, orthophosphoric acid, hydrochloric acid, trifluoroacetic acid, methanesulfonic acid, benzenesulfonic acid, and the like. Preferably employed are the sulfates and the phosphates.

Components $B_1$

Similarly, a plurality of compounds are suitable as components $B_1$ in the preparation of the mixed condensates. An important class are those derived from the substituted or unsubstituted aromatic hydrocarbons and aromatic heterocyclic compounds provided the basic compounds have nuclear positions capable of condensation, in an acid medium, with carbonyl compounds and, accordingly, of receiving the $CHR_aOR_b$ groups.

A large number of unsubstituted aromatic isocyclic and heterocyclic compounds are thus suitable as basic compounds $EH_m$ for the components $B_1$, e.g. benzene, naphthalene, anthracene, phenanthrene, pyrene, indene, fluorene, acenaphthene, thiophene, furane, benzofurane, diphenylene oxide, benzothiophene, acridine, carbazole, phenothiazine, and the like. These aromatic compounds may contain one or more identical or different substituents.

Exemplary of such substituents are:

—$NR_7R_8$
—$N(R_8)_2$
—$OR_7$
—$OR_8$
—$R_8$
—$SR_7$
—$SR_8$ wherein $R_7$ may be H, —CO—alkyl, —CO—aryl, —CO-heteroyl, —CO-aralkyl, —$SO_2$—alkyl, —$SO_2$—aryl, —$SO_2$—aralkyl, —$SO_2$—heteroyl, —$CONH_2$, —$CSNH_2$, —CONH—alkyl, —CONH—aryl, —CO—O—alkyl, —CO—O—aryl, —CS—O—aryl, and —CS—O—alkyl, and $R_8$ may be H, an alkyl, aryl or an aralkyl group.

The meanings of certain expressions are as follows:

Alkyl: A branched or unbranched alkyl group with 1 to 10 carbon atoms which may be substituted, e.g. by —halogen, —alkoxy, —OH, —COOH, —$CONH_2$, —CN, —CO—$CH_3$, —$SO_3H$, or —$PO_3H_2$, or hydrogens in neighbouring positions may be replaced by oxygen (epoxides) or removed (multiple bonds). The alkyl radical also may be interrupted, e.g. by —O—, —S—, —N(alkyl)—, —$SO_2$—, or —SO—.

Aryl: A mono- or polynuclear aromatic ring which, including alkyl, alkoxy or aralkyl groups which may be linked to it, contains 6 to 20 carbon atoms. The aryl nucleus may carry additional substituents.

Aralkyl: A group containing 7 to 20 carbon atoms which is composed of alkyl and aryl radicals (corresponding to the above definition).

Alkoxy: O-alkyl group, the alkyl having the above meaning.

The alkyl, aryl, aralkyl, and alkoxy groups may be present once or several times, either alone or together. For not exceeding the portion of these substituents with respect to the molecular weight of $B_1$, the portion of the four above-described substituents is limited in compound $EH_m$ with respect to the structure of the molecule, the primarily given aromatic iso- or heterocyclic ring or the condensed ring system is to be substituted only to such an extent that, in the case of substitution, this compound is increased by alkyl groups: only by a maximum of 10 carbon atoms
by aryl groups: only by a maximum of 20 carbon atoms
by aralkyl groups: only by a maximum of 10 carbon atoms, and
by aralkyl groups: only by a maximum of 20 carbon atoms.

The total increase in C atoms by means of these four types of substituents together should not exceed 30 C atoms with respect to the original aromatic nucleus.

It results therefrom that substituents of longer chains, i.e. those which have a relatively large number of C atoms, occur less frequently together than those with few C atoms. Generally, the short-chain alkyl and alkoxy groups (1 to 4 carbon atoms) and the smaller aromatic radicals are preferred in aryl and aralkyl groups (up to 12 C atoms) since the corresponding compounds are more easily soluble in the condensation media and condensation thus can be performed more easily. Limitation of substitution, as described above, results from the same reason.

The condensable iso- or heterocyclic aromatic rings also may have substituents exerting a deactivating effect on the nuclei, e.g. $O_2N$—, HOOC—, NC—, $HO_3S$—, $H_2O_3P$—, Cl—, Br—, and the like, provided condensability is not eliminated thereby. This will particularly be the case when the ring as such is easily condensable or when it carries substituents having a considerable activating effect. Another possibility for introducing deactivating substituents without reducing the condensability of the ring is to place the substituents in side-chains, e.g. aliphatic side-chains.

Substituents deactivating nuclear condensation also may be present in those cases in which the reactivity of the condensable nucleus is not necessary because the nucleus has substituents at which condensation can take place. Such substituents have been listed above, for example the groups —CO—$NH_2$, —$SO_2NH_2$, and—$SO_2NH$-alkyl.

According to the above, the basic compounds $EH_m$ or the components $B_1$ derived therefrom belong to the following groups of substances, for example:

aromatic compounds (iso- and heterocyclic) unsubstituted or substituted
aromatic amines
phenols and thiophenols
phenolethers and thiophenolethers
urea, thiourea, carboxylic acid amides (aliphatic and aromatic), and
sulfonic acid amides (aliphatic and aromatic).

Exemplary individual representatives are listed below.

Soluble types of the new diazo condensation products preferably are used in this invention. In addition to a corresponding selection of the components A(—D)$_n$ and $B_1$ according to their properties and their ratios there are preferably further used, for promoting the formation of soluble condensation products, components $B_1$ the basic structures $EH_m$ of which have molecular weights (amines are regarded as free amines, not in the form of salts: acid groups are considered in the H form) less than 500, preferably less than 250. In the case of aromatic compounds, those compounds are preferred within these which do not contain more than 4, preferably 1 to 2, especially 2, aromatic single rings (anneallated and/or preferably linked via homopolar bonds and/or via intermediate members).

The use of the compounds $B_1$ of the lower molecular weight range is advantageous also because often they are more readily soluble in the condensation medium and thus can react more easily.

Of the indicated classes of compounds from which the compounds $B_1$ derive, generally those are preferred which are unsaponifiable or only difficultly saponifiable under acid condensation conditions. The same applies to the diazo compounds A(—D)$_n$.

For this reason, those basic compounds for the components belonging to the series of the aromatic iso- and heterocyclic compounds are advantageous which are unsubstituted or carry as substituents the groups alkyl, aralkyl, aryl, alkoxy, alkylmercapto, aryloxy, arylmercapto, OH, SH, and amino, if desired in addition to unsaponifiable deactivating substituents, e.g. COOH. Of these compounds, those aromatic iso- and heterocyclic compounds are particularly preferred which are unsubstituted and/or contain as substituents one or more of the radicals alkyl, aralkyl, aryl, alkoxy, alkylmercapto, arylmercapto, and aryloxy, particularly when condensates are desired which should not contain salt-forming groups other than the diazo group.

Exemplary of particularly suitable types of compounds $B_1$ are those derived from diphenylether, diphenylsulfide, diphenylmethane and biphenyl which may contain one or two substituents selected from the group consisting of halogen atoms, alkyl groups, and alkoxy groups, however which are preferably unsubstituted.

If these compounds are condensed with diphenylamine-4-diazonium salts which are unsubstituted or substituted by a lower alkyl group or a lower alkoxy group containing up to 3 carbon atoms, mixed condensates are obtained in a very smooth reaction, which can be precipitated very readily in good yields in the form of salts of hydrochloric acid, of hydrobromic acid, or of suitable sulfonic acids mentioned below, especially when the component $B_1$ is employed in proportion of 0.5 to 2 moles per mole of diazo compound.

The new condensation products of the invention generally contain 0.01 to 50 moles, preferably 0.1 to 20 moles, on the average, of units of component $B_1$ per mole of units of component $A(—D)_n$. A particularly preferred range is from 0.2 to 2 moles of $B_1$ per mole of $A(—D)_n$.

The use of the condensates may be effected in various ways. In some cases, the new condensation products may be employed in the form of crude condensates, i.e. without separating the condensation medium. This is especially possible, when the quantity of condensation medium per mole of diazo compound can be maintained small.

Generally, the new condensation products are separated in the form of any salt and in this form, after the addition of any desired additional layer constituents, are used for the production of the reproduction material.

The diazo condensation products may be separated as salts of the following acids and then be employed: hydrohalogenic acids, such as hydrofluoric acid, hydrochloric acid, and hydrobromic acid; sulfuric acid; nitric acid; phosphoric acids (5-valent phosphorus), particularly orthophosphoric acid; in organic iso- and heteropolyacids, e.g. phosphotungstic acid, phosphomolybdic acid; aliphatic or aromatic phosphonic acids or their semiesters; arsonic acids; phosphinic acids; trifluoroacetic acid; amidosulfonic acid; selenic acid; fluoboric acid; hexafluorophosphoric acid, and perchloric acid; furthermore aliphatic and aromatic sulfonic acids, e.g. methanesulfonic acid, benzenesulfonic acid, toluenesulfonic acid, mesitylenesulfonic acid, p-chlorobenzenesulfonic acid, 2,5-dichlorobenzenesulfonic acid, sulfosalicylic acid, naphthalene-1-sulfonic acid, naphthalene-2-sulfonic acid, 2,6-di-tert.-butyl - naphthalenesulfonic acid, 2,6-di-tert.-butylnaphthalenedisulfonic acid, 1,8-dinitronaphthalene-3,6-disulfonic acid, 4,4'-diazidostilbene-3,3'-disulfonic acid, 2-diazo-1-naphthol-4-sulfonic acid, 2-diazo-1-naphthol-5-sulfonic acid, 1-diazo-2-naphthol-4-sulfonic acid, and the like. Other organic sulfonic acids suitable for the separation of the condensates are listed in columns 2 to 5 of U.S. Pat. No. 3,219,447.

The new diazo condensation products also can be separated in the form of the double salts with metal halides or pseudo halides, e.g. of the metals zinc, cadmium, cobalt, tin, and iron, or as the reaction products with sodium tetraphenyl borate or with 2-nitroindanedione-(1,3), and then be used in known manner.

By the action of sodium sulfite, sodium azide or amines, they also can be converted into the corresponding diazosulfonates, azides or diazoamino compounds and be employed in this form, as is known in the case of the diazo resins.

The following advantages of the new diazo condensation products have been indicated before:

(a) Minor penetration of the diazo compound into supports favoring this phenomenon, e.g. superficially saponified cellulose acetate film. The result is that the image areas have excellent oleophilic properties after exposure to light.
(b) Minor sensitivity of the reproduction layers to fingerprints.

Both advantages generally become more and more noticeable with the increase of the proportion of incorporated component. Whereas the advantage becomes generally apparent in case (a) with condensates containing as little as 0.1 mole of $B_1$ per mole of $A(—D)_n$, the desired effect is obtained in case (b) only from about 0.5 mole, in some cases only at a higher degree of incorporation of these components.

The use of the new condensation products has other advantages in addition to those indicated above. Compared with the known diazo resins, an improved effective light-sensitivity of the reproduction layers prepared with the new condensation products can be observed, i.e. when using the same light source, shorter exposure times are required. Also, this effect generally increases with an increase of the content of $B_1$ and differs, depending upon the type of component $B_1$ selected. The effect generally is the more the higher the molecular weight of component $B_1$. Generally, an increase of the components by another aromatic ring has a greater effect than the same increase of the molecular weight by other groups.

With an increasing content of a suitable second component $B_1$, the resin character of the mixed condensates becomes increasingly more pronounced, while the salt character decreases with the decreasing content of diazonium salt groups in the molecule of the condensate. Consequently, such mixed condensates are more compatible with polymerisates which do not contain ionizable groups.

For the same reason, the mixed condensates often possess good film-forming properties and the films show in the fully exposed state an improved flexibility and in many cases a good resistance to various etching agents. Thus, is is possible with a number of mixed condensates to produce reproduction layers of satisfactory etching resistance without the customary addition of resins, which layers may be used, e.g. for the photomechanical preparation of halftone gravure plates, printed circuits etc.

Mixed condensates are particularly suitable for this purpose which contain components that are not capable of forming a salt with acid or alkaline etching agents and have no tendency for hydrolytic splitting, i.e. second components selected from the group of aromatic hydrocarbons, either unsubstituted or substituted by alkyl, alkoxy, alkylmercapto, aryloxy or arylmercapto groups.

A particularly favorable group of condensation products is derived from components $B_1$ containing 2 benzene rings linked via a bridge member.

Particularly preferred in this series are the mixed condensates from components $B_1$ which are derived from diphenylether, diphenylsulfide, diphenylmethane or biphenyl with diphenylamine-4-diazonium salts, particularly 3-alkoxy-diphenylamine-4-diazonium salts. These condensates have a high light-sensitivity and those made from 3-alkoxy-diphenylamine-4-diazonium salts have simultaneously a surprising high storability. The corresponding condensation products can be prepared particularly easily and under moderate conditions. Diphenylether derivatives of Type $B_1$ suitable for the preparation of the condensation products are commercially available.

In contradistinction to the known diazo resins, the new condensation products, can be separated in many cases very easily from an aqueous solution by the addition of hydrochloric acid or common salt solution in the form of the chlorides or analogously as bromides. For this reason, a number of the new condensation products can be advantageously employed in those cases where the halides of the known diazo resins, which can be separated in a cumbersome manner only, have been preferably employed, e.g. for the production of screen printing forms. Furthermore, the chlorides can be easily converted into the salts of acids of low volatility, e.g. into the orthophosphates, which, of course, also may be obtained directly, e.g. by condensation of the diazonium phosphates in phosphoric acid.

A special group of the new condensation products has particular advantages with respect to the acid resistance of the exposure products and their adhesion to metallic supports. These are the condensation products carrying phosphonic acid groups. The exposure products of these condensates have good adhesive properties on aluminum foils roughened by metal brushes only, for example, without the foils being provided with one of the known chemical adhesive layers, and even then when the products are employed in the form of the zinc chloride double salts.

Another special group of mixed condensates has special advantages particularly for the hardening of hydrophilic colloids. Mixed condensates belonging thereto are mixed condensates of diphenylamine-4-diazonium salts and urea or similar compounds. Colloid layers which are hardened with these condensates with the action of light, have better hydrophilic properties after hardening than have those sensitized with the hitherto known diazo resins. This effect is important for the production of printing forms as described in U.S. Pat. No. 3,085,008, for example.

It also should be noted that mixed condensates prepared from diazonium salts and an excess of phenols are capable of yielding positive copies upon aqueous alkaline development (if desired with the addition of a small quantity of solvent).

The new condensation products can be combined with water-soluble and water-inosoluble polymers in the reproduction materials of the invention. Particularly, the production of reproduction layers containing water-insoluble polymers is simplified when using the new condensation products, since the latter can be particularly easily obtained in the form of salts compatible with these polymers, which are readily soluble in a number of organic solvents.

The reproduction layer is prepared in a manner analogous to that in the case of the known diazo resins, i.e. the diazo condensates are dissolved as such or, if desired, together with additional layer constituents in a suitable solvent and a support is coated with the solution thus obtained. Suitable supports are, e.g. those mentioned in Col. 2 of the present specification.

In some cases, it is also possible to apply the mixed condensates in the form of a very fine suspension. Coating may be performed, for example, by immersing or casting and draining, by casting and whirling off the excess solution, by brushing, swabbing or by roller application, as well as by other coating methods. The coating is then dried at room temperature or at an elevated temperature.

A number of substances may be added, as other constituents, to the reproduction layers. Exemplary thereof are:

Acids, e.g. phosphoric acids (particularly those of the 5-valent phosphorus, preferably orthophosphoric acid), phosphonic acids, phosphinic acids, and arsonic acids, furthermore the strong acids described in U.S. Pat. No. 3,235,382, such as sulfuric acid, hydrobromic acid, organic sulfonic acids, e.g. toluenesulfonic acid, methanesulfonic acid, and naphthalene-1,5-disulfonic acid, furthermore arsenic acid, and hexafluorophosphoric acid, furthermore the organic polyacids described in U.S. Pat. No. 3,179,518, e.g. polyacrylic acid, polyvinylphosphonic acid, polyvinylsulfonic acid, mellitic acid, and polyvinylhydrogenphthalate.

Water-soluble polymers, e.g. polyvinyl alcohol, polyethylene oxide, partially saponified polyvinyl acetate with an acetyl content up to about 40 per cent, polyacrylamide, polydimethylacrylamide, polyvinylpyrrolidone, polyvinyl methyl formamide, polyvinyl methyl acetamide and copolymers of monomers forming these polymers or with monomers which alone form water-insoluble polymers, in such a quantity that the water-solubility of the copolymers is maintained, furthermore natural substances or modified natural substances, such as gelatine, methyl cellulose, carboxymethyl cellulose, hydroxyethyl cellulose alginates, and the like.

Polymers sparingly soluble or insoluble in water, e.g. phenol resins, epoxy resins, oil-modified alkyd resins, amineformaldehyde resins, such as urea and melamine resins, polyamides, polyurethanes, polyvinyl resins, polyacrylic and polymethacrylic acid esters, polyvinyl acetals, polyvinylchloride, polyesters, and polyethers, as obtained, for example, by the polymerization of vinyl ethers, of oxiranes, oxetanes or tetrahydrofuran. The polymers also may carry groups capable of enhancing solubility in alkali, e.g. carboxyl, carboxylic acid anhydride, sulfonic acid, sulfonic acid amide, and phosphonic acid groups, furthermore sulfuric acid semi-ester, phosphoric acid monoester and phosphonic acid monoester groups. The polymers may be incorporated into the reproduction layers either individually or, when they are compatible with one another, also in the form of mixtures.

Printing forms of substantially increased length of run are obtained from reproduction layers containing the mixed condensates in combination with polyvinyl formal resins, particularly on grained aluminum supports:

Colored or uncolored pigments
Dyestuffs
Plasticizers
Wetting agents
Sensitizers
Indicators
Fatty acids Aldehydes, particularly formaldehyde, also may be added to the reproduction layers.

All additives should be so selected, of course, that they are compatible with the diazo condensates and, furthermore, absorb light to as low a degree as possible in the wave length range important for light-decomposition of the diazo compounds.

The additives generally may be incorporated into the reproduction layers in the following quantities:

Acids: On metal supports and superficially saponified cellulose acetate films, acids of 5-valent phosphorus, particularly orthophosphoric acid, generally are employed in quantities of 0.01 to 4 moles, phosphonic and arsonic acids in quantities of 0.01 to 3 moles, per mole of diazo groups. On paper supports as described in U.S. Pat. No. 2,778,735, in addition to phosphoric acid, there also may be used strong acids, e.g. those described above, in quantities of 1 to 100 moles at the most per mole of diazo groups. In this connection, 1 mole means the quantity which contains 1 gram-atom P, As or an equivalent COOH.

The organic polyacids, insofar as they are readily water-soluble, generally are used in quantities of only 0.01 to 3 moles per mole of diazo groups.

The water-soluble polymers generally are used in quantities up to 100 parts by weight per part by weight of diazo compound, preferably not more than 20 parts by weight.

The addition of polymers insoluble in water generally will not exceed 20 parts by weight per part by weight of diazo compound; the preferred range is not more than about 10 parts by weight.

When the reproduction layers contain water-soluble and/or water-insoluble polymers, colored or uncolored pigments generally are added to them only in quantities not exceeding 50 percent by weight, calculated on the weight of the polymers.

Plasticizers, dyestuffs, wetting agents, sensitizers, indicators, and fatty acids generally are incorporated into the reproduction layers in quantities not exceeding 20 percent by weight, preferably not exceeding 10 percent by weight, calculated on the weight of the other layer constituents.

Reproduction layers containing or consisting of the new diazo condensates also may be combined with known light sensitive systems. This applies, for example, to the known diazo resins (formaldehyde condensates of the substituted or unsubstituted 4-diazo-diphenylamine), p-quinonediazides, iminoquinonediazides, azido compounds, photo-crosslinkable polymers with azido groups, chalcone groupings, cinnamic acid groupings, allyl ester and allyl ether groups, and to photopolymer layers.

Depending upon the layer constituents, suitable solvents for the preparation of the coating solutions are, for example, water, alcohols such as methanol, ethanol, and ethylene glycol monoethyl ether, dimethyl formamide, diethyl formamide, and the like. Water, if desired with the addition of an organic solvent, is preferably employed in the case of metal halide double salts, sulfates, and phosphates of the new diazo condensates.

Pure organic solvents or those containing only a little water are preferred in the case of chlorides, bromides, and salts of the new diazo condensates, which are water-insoluble to a large extent, e.g. the salts of organic sulfonic acids, fluoboric acid, and hexafluorophosphoric acid. In these cases, to the alcohols or amides which normally are good solvents for these compounds, there are added solvents which dissolve them only sparingly, e.g. ethers such as dioxane, and tetrahydrofuran: esters such as acetic acid ethyl ester, butyl acetate, and ethylene glycol monomethyl ether acetate: ketones such as methyl ethyl ketone, cyclohexanone, and the like, in order to improve the levelling properties of the coating compositions.

The reproduction materials thus produced may be used directly after production, but there also may be days, weeks or months between production and processing. It is advantageous to store them at a cool, dry place.

The reproduction material is processed by image-wise exposure through an original. For image-wise exposure to light, any light source, conventional for reproduction purposes, may be used which emits in the long-wave ultraviolet range and in the short-wave visible range, e.g. carbon arc lamps, high-pressure mercury vapor lamps, xenon impulse lamps, and others.

After exposure to light, development is effected with a suitable developer. Suitable developers are, for example, water, mixtures of water with organic solvents, aqueous salt solutions, aqueous solutions of acids, e.g. of phosphoric acid, to which salts or organic solvents may be added, or alkaline developers, e.g. aqueous solutions of sodium salts of phosphoric acid or silicic acid. Also organic solvents may be added to these developers. In some cases, it is also possible to develop with undiluted organic solvents. The developers may contain additional constituents, e.g. wetting agents, and hydrophilizing agents.

Development is performed in known manner, e.g. by immersing or wiping over or rinsing with the developer liquid.

The reproduction layers prepared with the new diazo condensation products yield negative copies of the originals employed in nearly all cases. When adding phenol resins to the reproduction layers, particularly in excess of the mixed condensate, positive copies of the original are obtained, however, with alkaline development.

Depending upon the composition of the layer, the supporting material, and processing, it is possible to produce with the new diazo condensates, for example, single copies, relief images, tanned images, printing forms for screen printing, relief printing, intaglio printing, and planographic printing, or printed circuits. In many cases, it is possible to improve the abrasion resistance and the chemical resistance of the image stencil by burning in.

The reproduction materials according to the invention can be stored for months, provided suitable components have been selected. Alternatively, the reproduction layers may be applied to a support immediately preceding use, if this is desirable. The mixed condensates according to the invention are very suitable for use in so-called "wipe-on" processes, in which a support, particularly an aluminum support, which has been mechanically and/or chemically pretreated in an appropriate manner, is coated either manually or with the aid of simple devices with a light-sensitive layer by the printer for the photomechanical preparation of a printing plate. For this purpose, the high light-sensitivity of the diazo compounds and the excellent oleophilic properties of their light-decomposition products are also of particular advantage.

The novel diazo mixed condensates may also be used by the printer for sensitizing pre-coated (but not pre-sensitized) screen printing fabrics. Alternatively, they may be used for the preparation of pre-sensitized screen printing stencils, which have the advantage over known chromate-sensitized screen printing stencils that they possess a considerably better storability. The good light-sensitivity of the novel diazo compounds is also of advantage for screen printing.

The invention is further illustrated by the following series of compound types and individual compounds, which are suitable as components $B_1$ for the preparation of the condensation products to be employed in accordance with the present invention.

The preparation of compounds of the general formula $B_1$ is known and described in detail in the literature. Some of the compounds of Type $B_1$ are commercially available.

Condensation products with the use of such components $B_1$ alone or with others also can be used for the production of reproduction materials.

The compounds of the general formula $B_1$ may be employed as isomer mixtures and/or as mixtures of compounds $B_1$, which differ in the parameter $m$. It is often of advantage to employ uniform compounds of Type $B_1$ or particularly adjusted mixtures of such compounds for condensation, since chemical variation in the structure of the condensation products is substantially reduced thereby and a reproducible production of the condensation products is facilitated.

The following list of components $B_1$ represents a classification. The characteristic feature in each case is the substituent activating condensation. When two or more different activating substituents occur, attribution to a certain group is at random, of course.

In some cases, it is possible to employ also aromatic compounds substituted only by deactivating substituents as the basic compounds for components $B_1$.

Examples thereof are in the first group of the following list.

Preferably employed, however, are compounds listed in the following groups, i.e. compounds of Type $B_1$ carrying activating substituents or no further substituents except the —$CHR_a$—$OR_b$ groups.

Compounds $B_1$ Derived From Aromatic Isocyclic and Hetero-Cyclic Compounds

Benzylalcohol
Dibenzylether
1,3-Bis-hydroxymethyl-benzene
1,4-Bis-methoxymethyl-benzene
1,5-Bis-acetoxymethyl-naphthalene
1,4-Bis-hydroxymethyl-naphthalene
1-Hydroxymethyl-naphthalene
2-Hydroxymethyl-naphthalene
9,10-Bis-methoxymethyl-anthracene
9-Hydroxymethyl-phenanthrene
2,5-Bis-methoxymethyl-thiophene
2-Hydroxymethyl-furan
Bis-methoxymethyl-diphenyleneoxide
Bis-methoxymethyl-diphenylenesulfide
Bis-methoxymethyl-dimethyldiphenyleneoxide
2,6-Bis-hydroxymethyl-naphthalene
Benzhydrol
1,4-Bis-(α-hydroxybenzyl)-benzene
3-Methyl-hydroxymethyl-benzene
2,5-Dimethyl-hydroxymethyl-benzene
2-Methyl-5-isopropyl-hydroxymethyl-benzene
4,6-Dimethyl-1,3-bis-hydroxymethyl-benzene 2,5-Dimethyl-1,4-hydroxymethyl-benzene
2,4,6-Trimethyl-1,3-bis-hydroxymethyl-benzene
2,4,6-Trimethyl-1,3,5-tris-methoxymethyl-benzene
2,3,5,6-Tetramethyl-1,4-bis-acetoxymethyl-benzene
2,4,5,6-Tetramethyl-1,3-bis-ethoxymethyl-benzene
4,4'-Bis-acetoxymethyl-diphenylmethane
4,4'-Bis-methoxymethyl-diphenyl
2-Methyl-1,5-bis-acetoxymethyl-naphthalene
2-Ethyl-9,10-bis-methoxymethyl-anthracene
2,4-Diisopropyl-hydroxymethyl-benzene
4,6-Diisopropyl-1,3-bis-hydroxymethyl-benzene
4,6-Diisopropyl-1,3-bis-methoxymethyl-benzene
6-Chloro-1-hydroxymethyl-naphthalene
4,4'-Bis-acetoxymethyl-dihpenylsulfone
4,4'-Bis-methoxymethyl-benzophenone
4-Chloro-hydroxymethyl-benzene Well defined derivatives of type $B_1$ of aromatic amines can not be obtained as easily as in the case of other compound types, since, inter alia, they have a marked tendency to split off water, and since a number of by-reactions are possible. Examples of such products obtained by splitting-off water are N,N'-methylene-bis-diphenylamine and anhydro-formaldehyde-aniline. These compounds also are capable of condensation in an acid medium according to the process of the invention.

Compounds $B_1$ derived from phenols, i.e. from compounds in which the OH group is linked directly to an iso- or heterocyclic aromatic ring system and which may include one or more aromatic rings. These rings may carry any further substituents with the condition that at least one position which may carry a group —$CHR_a$—$OR_b$ is maintained in the molecule.

Examples (a) Phenols of the general formula

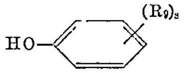

wherein $R_9$ is a monovalent radical and $s$ is a number from 0 to 4.

Examples of combinations of $R_9$ and $s$:

| $R_9$ | $s$ | Isomers |
|---|---|---|
| Alkyl (1 to 3 carbon atoms) | 1-4 | All. |
| Alkyl (4 to 10 carbon atoms) | 1-2 | All. |
| Halogen (F, Cl, Br, I) | 1-2 | All. |
| Aralkyl, if desired substituted (7 to 20 carbon atoms). | 1-2 | All. |
| Aryl, if desired substituted (6 to 20 carbon toms). | 1-2 | All. |
| Alkoxy and alkymercapto (1 to 3 carbon atoms). | 1-3 | All. |
| Alkoxy, alkylmercapto and aralkoxy, if desired substituted (4 to 10 carbon atoms). | 1-2 | All. |
| Aryloxy, arylmercapto, if desired substituted (6 to 20 carbon atoms). | 1-2 | All. |
| Alkylamino, dialkylamino (1 to 4 carbon atoms). | 1-2 | All. |
| Arylamino (6 to 10 carbon atoms) | 1-2 | All. |
| Aryl-$SO_2$-, (6 to 14 carbon atoms) | 1 | Preferably in para-position to the OH group. |
| $SO_3H$, $PO_3H_2$, $AsO_3H_2$, COOH and the corresponding esters and amides. | 1 | Do. |

The "phenol alcohols" $B_1$ obtained from the above-mentioned phenols by means of formaldehyde addition as well as the ethers and esters thereof at the aliphatic OH group can be used in the process of the invention. Numerous phenol alcohols are described in the literature. A summary can be found, for example, in the monograph of Martin "The Chemistry of Phenolic Resins," John Wiley & Sons, N.Y., 1956. Also, the periodical "Die Makromolekulare Chemie," *44*, pages 44 to 45 (1961) should be noted. Also suitable are phenol alcohols and the esters and ethers thereof, which are obtained in another manner, e.g. by halogen methylation or reduction of phenol aldehydes or phenol carboxylic acids or the esters thereof.

In addition to the phenol alcohols and their above-mentioned derivatives, it is also possible to employ the derivatives obtained by esterification of the phenolic OH group of these compounds by means of carboxylic and sulfonic acids.

The following phenol alcohols and derivatives thereof are suitable, for example:

2-Hydroxy-hydroxymethyl-benzene
6-Hydroxy-2,4-dimethyl-1,3,5-tris-hydroxymethyl-benzene
6-Acetoxy-3-methyl-1,5-bis-acetoxymethyl-benzene
5-Chloro-2-hydroxy1,3-bis-hydroxymethyl-benzene
5-tert.-Butyl-2-hydroxy-1,3-bis-methoxymethyl-benzene
5-Benzyl-2-acetoxy-1,3-bis-acetoxymethyl-benzene
5-Phenoxy-2-hydroxy-1,3-bis-hydroxymethyl-benzene
5-Methoxycarbonyl-2-hydroxy-1,3-bis-hydroxymethyl-benzene
5-Cumyl-2-hydroxy-1,3-bis-methoxymethyl-benzene
5-Methylmercapto-2-hydroxy-1,3-bis-hydroxymethyl-benzene
5-Ethoxy-2-hydroxy-1,3-bis-methoxymethyl-benzene
5-Fluoro-2-hydroxy-6-methyl-1,3-bis-hydroxymethyl-benzene
5-Chloro-2-hydroxy-4,6-dimethyl-1,3-bis-hydroxymethyl-benzene
5-Chloro-4-hydroxy-2-methyl-1,2-bis-hydroxymethyl-benzene
3,5-Dibromo-2-hydroxy-hydroxymethyl-benzene
2,2'-Dihydroxy-dibenzylether
Dihydroxymethyl-hydroquinone
4-Hydroxy-3,5-bis-hydroxymethyl-diphenylether
2,2'-Bis-(4-hydroxy-3,5-bis-hydroxymethyl-phenyl)-propane
Bis-(4-hydroxy-5-methyl-3-hydroxymethyl-phenyl)-sulfone
3,4-Dihydroxy-hydroxymethylbenzene
2,3-Dihydroxy-1,4-bis-hydroxymethyl-benzene
2-Hydroxy-3-methoxy-hydroxymethylbenzene
2,2'-Dihydroxy-3,3'-bis-hydroxymethyl-diphenylmethane Compounds $B_1$ Derived From Thiophenols It is possible to use, instead of the phenol derivatives, the corresponding thiophenol derivatives. But the phenols are by far superior to the thiophenols since, inter alia, the latter are substantially more expensive, have a tendency toward side reactions, and many of them have an unpleasant smell.

Compounds $B_1$ Derived From Ethers of Phenols and Thiophenols

Suitable are, for example, the alkyl, aralkyl, and aryl ethers of the phenols and thiophenols stated above.

Compounds $B_1$ Derived From Aromatic Isocyclic and Hetero-Cyclic Compounds

Compounds of Type $B_1$ of this group of compounds are obtained, for example, by halogenmethylating the basic structures and then converting the halogenmethyl groups to the groups —$CH_2OH$, —$CH_2O$ alkyl or $CH_2O$ acyl.

Numerous halogenmethyl compounds (carrying this group directly in the aromatic nucleus) suitable as intermediate products for the preparation of compounds of the type described here are known.

Compounds of Type $B_1$ derived from phenolethers also can be obtained by alkylation or aralkylation of the phenolic OH group of phenol alcohols.

Suitable representatives of these groups of compounds are, for example:

1,3-Bis-(3-hydroxymethyl-phenoxy)-propane
1,5-Bis-(4-hydroxymethyl-phenoxy)-pentane
1,3-Dihydroxymethyl-2-methoxy-5-n-hexyl-benzene
1,3-Dihydroxymethyl-2-ethoxy-5-ethyl-benzene
1,3-Dihydroxymethyl-2-benzyloxy-5-methoxycarbonyl-benzene
1,3-Dihydroxymethyl-2-methoxy-5-bromo-benzene
1,3-Dihydroxymethyl-2-methoxy-5-cumyl-benzene
1,3-Dihydroxymethyl-2-ethoxy-5-methylmercapto-benzene 1,3-Dihydroxymethyl-2-ethoxy-5-phenoxy-benzene
1,3-Dihydroxymethyl-2,5-diethoxy-benzene
1,3-Dihydroxymethyl-2-methoxy-5-benzyl-benzene
1,3-Dimethoxymethyl-2-methoxy-5-fluoro-benzene
1,3-Dimethoxymethyl-2-ethoxy-5-methoxy-benzene
1,3-Dimethoxymethyl-2-methoxy-5-phenyl-benzene
Bis-[2-(4-hydroxymethyl-phenoxy)ethyl]ether
1,3-Dimethoxymethyl-2-ethoxy-5-bromo-benzene
1,3-Diacetoxymethyl-2-ethoxy-5-tert.-butyl-benzene
1,3-Diacetoxymethyl-2-methoxy-5-phenylmercapto-benzene
1,3-Diacetoxymethyl-2-methoxy-5-chloro-benzene
1,3-Diacetoxymethyl-2,5-dimethoxy-benzene
1,3-Bis-(2-methyl-4-benzyl-6-hydroxymethyl-phenoxy)-propane
3,4-Dimethoxy-hydroxymethyl-benzene
6-Bromo-3,4-dimethoxy-hydroxymethyl-benzene
4,5-Dimethoxy-2-methyl-hydroxymethyl-benzene
2,3-Dimethoxy-hydroxymethyl-benzene
2,2′-Dimethoxy-3,3′-bis-hydroxymethyl-5,5′-dimethyl-diphenylmethane
Dihydroxymethyl-hydroquinonedimethylether
4-Methoxy-3,5-bis-hydroxymethyl-diphenylether
Bis-(4-ethoxy-5-methyl-3-hydroxymethyl-phenyl)-sulfone
4-Methoxymethyl-diphenylether
2-Hydroxymethyl-diphenylether
4,4′-Bis-hydroxymethyl-diphenylether
4,4′-Bis-acetoxymethyl-diphenylether
4,4′-Bis-methoxymethyl-diphenylether
4,4′-Bis-ethoxymethyl-diphenylether
2,4′-Bis-methoxymethyl-diphenylether
2,4,4′-Tris-methoxymethyl-diphenylether
2,4,2′-Tris-methoxymethyl-diphenylether
2,4,2′,4′-Tetrakis-methoxymethyl-diphenylether
Bis-methoxymethyl-4,4′-dimethyl-diphenylether
Bis-methoxymethyl-2,4-dimethoxy-5-methyl-diphenylether
Bis-methoxymethyl-3,3′-dimethyl-diphenylsulfide
Bis-methoxymethyl-2,4′-dimethoxy-diphenylsulfide
2,2′-Dimethyl-4,4′-bis-hydroxymethyl-diphenylether
4-Chloro-4′-methoxymethyl-diphenylether
1,3-Bis-(4-methoxymethyl-phenoxy)-benzene
1,3-Bis-(4-methoxymethyl-phenoxy)-propane
4,4′-Bis-methoxymethyl-diphenylsulfide
6-Methylmercapto-3-methyl-hydroxymethyl-benzene
2,2-Bis-[4-(4-methoxymethyl-phenoxy)-phenyl]-propane
4,4′-Bis-phenoxymethyl-diphenylether
Bis-methoxymethyl-4-phenoxy-diphenylsulfide
Bis-methoxymethyl-2-isopropyl-5-methyl-diphenylether
Bis-methoxymethyl-3-brom-4-methoxy-diphenylether
Bis-methoxymethyl-4-nitro-diphenylether The preceding compounds contain at least one aromatic ring. The following compounds $B_1$ also are capable of condensation if they contain no aromatic rings.

This group of compounds $B_1$ is derived from compounds B which contain at least one substituent which is able to react with an active carbonyl compound with condensation.

Exemplary of such substituents are:

—NH—CO—$NH_2$
—NH—CS—$NH_2$
—CO—$NH_2$
—CO—NH-alkyl
—$SO_2$—$NH_2$
—$SO_2$—NH—CO—$NH_2$
—$So_2$—NH-alkyl
—NH—CO—NH-alkyl
—CN, and amino groups directly linked to aromatic, particularly to heterocyclic aromatic, rings.

These substituents, of course, also may be linked to aromatic nuclei.

Exemplary of this general group of compounds are:

Bis-hydroxymethyl-urea
Bis-hydroxymethyl-ethyleneurea
Bis-hydroxymethyl-oxamide
Bis-hydroxymethyl-succinic acid diamide
Bis-methoxymethyl-adipic acid diamide
Bis-hydroxymethyl-sebacic acid diamide
Hydroxymethylbenzamide
Bis-hydroxymethyl-terephthalic acid diamide
Hydroxymethylbenzenesulfonic acid amide
Tetra-(hydroxymethyl)-melamine
Hexa-(methoxymethyl)-melamine The preceding list shows the most important groups of compounds to be used as components $B_1$. The possibilities, however, are not limited thereby; it is also possible to use, for example, the corresponding derivatives of cyanuric acid hydrazides, guanidine derivatives, aminopyrimidines, and the like.

For further possibilities, reference is made to the literature concerning condensation resins, e.g. Houben-Weyl, "Methoden der organischen Chemie," 4th edition, volume 14/2, pages 193 to 402, "Polyadditions-bzw. Kondensationsprodukte von Carbonyl- und Thiocarbonylverbindungen."

The following examples describe the production of copying materials according to the invention, employing light-sensitive mixed condensates. In spite of their large number, the scope of the present invention is by no means limited thereby.

For better identification of the mixed condensates, in addition to the result of the elemental analysis, the molecular proportion—calculated from the values obtained by the analysis—is stated in many examples in which diazo compound and component $B_1$ take part in the structure of the product. This proportion was calculated under somewhat simplified assumptions. Although these statements can not and do not determine the exact structure of the mixed condensates according to the invention, they suffice for identifying condensation products which are reproducible in their characteristics.

As mentioned above, in many cases the condensation conditions, in particular the quantities employed, are important for further identification. The examples contain all information necessary for the preparation of the mixed condensates.

In the examples, parts by weight and parts by volume relate to each other as grams to milliliters. Percentages are by weight if not otherwise stated. The temperatures are degrees centigrade. In the values of the analysis, N means the total nitrogen content and ND the diazo nitrogen.

Normally, no great stress was placed on a complete drying of the condensation products, so that the products obtained may contain small quantities of water or condensing agent. Moreover, varying quantities of metal salts may be entrained in some cases during precipitation. However, the contents of the products of active substance can be easily determined by the values of the analysis.

The term "crude condensate" used in the examples means, generally, the crude condensation mixture obtained during condensation, which normally also contains the condensing medium.

For better orientation, the diazo compounds $A(—D)_n$ and the components $B_1$ used for the preparation of the mixed condensates contained in the reproduction material according to the invention are listed in the following Table 1 by numbers. In the examples, reference is made to these numbers.

TABLE 1

Diazo Compounds

Diazo 1: Diphenylamine-4-diazonium salt
Diazo 2: 3-Methoxy-diphenylamine-4-diazonium salt
Diazo 3: 4′-Methoxy-diphenylamine-4-diazonium salt Diazo 4: 2'-Carboxy-diphenylamine-4-diazonium salt
Diazo 5: 2,4',5-Triethoxy-diphenyl-4-diazonium salt
Diazo 6: 4 - (4-Methyl-phenylmercapto)-2,5-dimethoxy-benzene diazonium salt
Diazo 7: 2,5-Dimethoxy-4-phenoxy-benzene diazonium salt
Diazo 8: 4 - (2,5 - Diethoxy-benzoylamino)-2,5-diethoxy-benzene diazonium salt
Diazo 9: 3-Methoxy-diphenyleneoxide-2-diazonium salt
Diazo 10: 4 - [N - Methyl-N-naphthyl-(1)-methylamino]-benzene diazonium salt
Diazo 11: 4-Diazo-diphenylamine-3-carboxylic acid (inner salt)
Diazo 12: 2,5 - Dimethoxy - 4 - (N-methyl-N-phenyl-mercaptoacetylamino)-benzene diazonium salt
Diazo 13: 4 - [N - Methyl-N-(β-phenyl-mercaptoethyl)-amino]-benzene diazonium salt Components $B_1$ No. 1: N,N'-Dimethylol-succinic acid diamide
No. 2: Hexa-methoxymethyl-melamine
No. 3: N,N'-Dimethylol-urea
No. 4: N,N'-Dimethylol-terephthalic acid diamide
No. 5: 2,6-Dimethylol-4-methyl-phenol
No. 6: 2,6-Dimethylol-4-methyl-anisole
No. 7: Di-hydroxy-methyl-durene
No. 8: Di-acetoxymethyl-durene
No. 9: 1,3-Dimethyl-4,6-dimethylol-benzene
No. 10: 1,3-Diisopropyl-4,6-dimethylol-benzene
No. 11: 1,5-Di-acetoxymethyl-naphthalene
No. 12: 1,4-Dimethylol-benzene
No. 13: Commercial bis-methoxymethyl-diphenylether (Composition stated in Example 8)
No. 14: 4,4'-Di-acetoxymethyl-diphenylether
No. 15: 4,4'-Di-methoxy-methyl-diphenylether
No. 16: 2,5-Di-ethoxymethyl-thiophene
No. 17: 9,10-Di-methoxymethyl-anthracene
No. 18: Benzhydrol
No. 19: 1,4-Bis-(α-hydroxybenzyl)-benzene
No. 20: 1,3-Diisopropyl-4,6-di-methoxymethyl-benzene
No. 21: 4,4'-Di-methoxymethyl-diphenylsulfide
No. 22: Methoxymethyl-diphenyl-ether, obtained by reaction of technical chloromethylated diphenyl-ether with sodium methylate (composition see Example 53)
No. 23: 2,2'-Bis-(4-hydroxymethyl-phenoxy)-diethylether
No. 24: 1,3-Bis-(4-hydroxymethyl-phenoxy)-propane
No. 25: Bis-methoxymethyl-diphenylene oxide
No. 26: 4,4'-Bis-methoxymethyl-diphenylmethane
No. 27: Methoxymethylated biphenyl
No. 28: Methoxymethylated 4,4'-dimethyl-diphenylether
No. 29: Methoxymethylated 2-isopropyl-5-methyldiphenyl-ether
No. 30: Methoxymethylated 3-bromo-4-methoxydiphenyl-ether
No. 31: Methoxymethylated dibenzo-thiophene
No. 32: Methoxymethylated 1,4-diphenoxybenzene
No. 33: 2,6-Bis-(methoxymethyl)-4-methyl-phenol
No. 34: 4,4'-Bis-(ethoxymethyl)-diphenylether
No. 35: 4,4'-Bis-(hydroxymethyl)-diphenylether
No. 36: N,N'-Dimethylol-oxamide
No. 37: N,N'-Dimethylol adipic acid diamide
No. 38: Trimethylolcitramide.

Examples 1 to 21

In the following examples, the good to excellent oleophilic properties of the exposure products of 20 of the novel condensation products, when applied to superficially saponified cellulose acetate film, are shown in combination with an improved light-sensitivity, in comparison with pure formaldehyde condensates. The compositions of the condensation products and of the coating solutions used are listed in the following Table 2.

TABLE 2

| | Mixed condensate (MC) | | | | | Coating solution | | |
|---|---|---|---|---|---|---|---|---|
| Ex. | Diazo compound $A(D)_n$ | Component $B_1$ | $CH_2O$ | Separated as— | Proportion of $A(D)_n$ to $B_1$ in MC (approx.) | Percent MC | Further additives | Solvent |
| 1 | Diazo 3, $HSO_4^-$ | 4 | − | $Cl^- \cdot \frac{ZnCl_2}{2}$ | C:N=23.6:5 | 1.2 | | EGMME/DMF/$H_2O$, 55:37:8 |
| 2 | Diazo 2, $H_2PO_4^-$ | 5 | − | $H_2PO_4^- \cdot H_3PO_4$ | 1:1 | 1.65 | | $H_2O/C_2H_5OH$, 8:2 |
| 3 | Diazo 2, $HSO_4^-$ | 7 | − | $Cl^-$ | 1:1.1 | 1.0 | | EGMME |
| 4 | do | 6 | − | $Cl^-$ | 1:1.1 | 1.0 | | $H_2O$ |
| 5 | Diazo 1, $HSO_4^-$ | 9+11 | − | $Cl^-$ | Excess of 9.6 C atoms per $N_2$ group. | 0.8 | | $H_2O$ |
| 6 | Diazo 2, $HSO_4^-$ | 10 | − | $Cl^-$ | 1:2.4 | 1.65 | | EGMME |
| 7 | Diazo 4, $H_2PO_4^-$ | 8 | − | $Cl^-$ | 1:1.1 | 1.0 | | EGMME |
| 8 | Diazo 2, $HSO_4^-$ | 13 | − | $Cl^-$ | Excess of 10.6 C atoms per $N_2$ group. | 1.0 | | $H_2O$ |
| 9 | Diazo 1, $HSO_4^-$ | 19 | − | $Cl^-$ | 1:0.716 | 0.92 | | EGMME |
| 10 | do | 18 | + | $Cl^-$ | 1:0.9 | 0.5 | | EGMME |
| 11 | Diazo 2, $HSO_4^-$ | 13 | + | Crude condensate | 1:0.2 | 2.0 | | $H_2O$ |
| 12 | Diazo 2, $HSO_4^-$ | 10 | − | $Cl^-$ | 1:1.05 | (a) 0.1 | 2 molecules of $H_3PO_4$/diazo group. | $H_2O$ |
| | | | | | | (b) 0.1 | ½ molecule of $ZnCl_2$/diazo group. | $H_2O$ |
| 13 | Diazo 1, $HSO_4^-$ | | + | $Cl^- \cdot \frac{ZnCl_2}{2}$ | | 0.1 | | $H_2O$ |
| 14 | Diazo 1, $H_2PO_4^-$ plus diazo 2, $H_2PO_4^-$. | 16 | − | $H_2PO_4^- \cdot H_3PO_4$ | 1:2 | 1.2 | | $H_2O$ |
| 15 | Diazo 7, $Cl^- \cdot \frac{ZnCl_2}{2}$ | 20 | − | $Cl^- \cdot \frac{ZnCl_2}{2}$ | 1:1.18 | 2.0 | | $H_2O$ |
| 16 | Same as above | 20 | − | Same as above | 1:1.5 | 2.0 | | $H_2O$ |
| | | | | | | 0.1 | | $H_2O$ |

TABLE 2—Continued

| | Mixed condensate (MC) | | | | | Coating solution | | |
|---|---|---|---|---|---|---|---|---|
| Ex. | Diazo compound $A(D)_n$ | Component $B_1$ | $CH_2O$ | Separated as— | Proportion of $A(D)_n$ to $B_1$ in MC (approx.) | Percent MC | Further additives | Solvent |
| 17 | Diazo 8, $Cl^- \cdot \frac{ZnCl_2}{2}$ | 12 | – | do | 1:0.4 | 2.0 | | $H_2O$ |
| 18 | Diazo 9, $Cl^- \cdot \frac{ZnCl_2}{2}$ | 12 | – | $Cl^- \cdot \frac{ZnCl_2}{2}$ | 1:0.625 | 1.0 | | $H_2O$ |
| 19 | Diazo 2, $Cl^-$ | 15 | + | $Cl^-$ | 1:5.4 (see preparation) | 1.0 or 0.1 | | $H_2O$ |
| 20 | Diazo 6, $Cl^- \cdot \frac{ZnCl_2}{2}$ | 12 | – | $Cl^- \cdot \frac{ZnCl_2}{2}$ | 1:0.7 | 1 or 0.1 | | $H_2O$ |
| 21 | Diazo 2, $HSO_4^-$ | 15 | + | $Cl^-$ | Excess of 17 C atoms per $N_2$ group. | 1.0 | | $H_2O$ |

NOTE.—EGMME=Ethylene glycol monomethyl ether; DMF=Dimethyl formamide.

In the case of purely aqueous coating solutions, coating may be effected by swabbing, whereas solutions predominantly containing organic solvents are applied by means of a plate whirler. Warm air is used for drying. After image-wise exposure under a negative original, the material is developed, e.g. by wiping over with water or one of the known buffered solutions of water-soluble coupling components, e.g. those of the pyrazolone series. The material is then inked up with greasy ink, with the exposure products accepting the ink. In a number of cases, it is also possible to reinforce the image by means of lacquers, e.g. the usual emulsion lacquers. In all cases, the oleophilic properties of the exposure products of the novel diazo condensates are superior to those of the hitherto known formaldehyde condensates of the corresponding diazo compounds.

This fact is illustrated by the following comparisons:

Formaldehyde condensates of Diazo Compounds 1 and 2, produced in phosphoric acid as described in Example 1 of U.S. Pat. No. 3,311,605 and Example 1 of U.S. Pat. No. 3,406,159, respectively, yield exposure products which have only poor ink receptivity or accept no ink at all, when they are coated and processed as described above.

By adding phosphoric acid to the coating solution, even poorer results are obtained.

In contradistinction thereto, the novel condensation products produced in phosphoric acid, e.g. those of Examples 2 to 4, 6, 8, 10, 14, 19, and 21, possess good to excellent ink receptivity in the image areas. The good oleophilic properties are not lost by the addition of phosphoric acid to the coating solutions. The coating solutions used in Examples 3 to 15, e.g., can contain 2 molecules of phosphoric acid per diazo group, without a significant reduction of the ink receptivity of the exposure products. In Example 21, there are 10 molecules of phosphoric acid present per diazo group. A similar effect is also indicated by Example 18 in which a crude condensate produced in phosphoric acid is used for coating without separation of the condensing agent.

It is also demonstrated in these examples that the incorporation of small amounts of component $B_1$ is sufficient to cause an appreciable effect according to the invention. This effect occurs even in the case of an incorporation of only 0.15 mole of component $B_1$ per mole of diazo compound, although optimum results are not obtained in this case.

Examples 12, 13, 16, and 19 show the superiority of the novel condensation products as compared with the formaldehyde condensates prepared in sulfuric acid and precipitated in the form of the zinc chloride double salt, which latter are preferred at present as diazo resins. Even with 0.1 percent by weight solutions of the novel mixed condensates (Example 12) and the addition of 2 molecules of phosphoric acid per diazo group, printing forms of good ink receptivity are obtained from which prints can be made on conventional offset presses. When using a 0.1 percent by weight solution of the corresponding formaldehyde condensate (Example 13) and processing in the same manner, no significant ink receptivity is achieved. A moderately satisfactory ink receptivity is achieved only by increasing the concentration of this diazo compound to many times this quantity.

The preparation and composition of the mixed condensates used in Examples 1 to 21 is described in detail below:

Example 1

17.75 parts by weight of 4-methoxy-diphenylamine-4'-diazonium sulfate (91%) (Diazo 3, sulfate, Table 1) are dissolved in 150 parts by volume of 86% phosphoric acid. 11.2 parts by weight of dimethylol terephthalic acid diamide (Component $B_1$, No. 4, Table 1) are introduced in the form of a fine powder into the solution, with vigorous stirring, and condensation is effected for 21 hours at room temperature. The crude condensate is dissolved in 1,000 parts by volume of water at 40° C. and the condensation product is then precipitated from the solution by adding 200 parts by volume of 50% zinc chloride solution. The double salt is separated, dissolved in 500 parts by volume of water at 50° C., and reprecipitated by adding zinc chloride. Yield: 26.8 parts by weight. (C 46.6%, N 11.5%.) According to analysis, the product contains the elements N and C in a proportion of 5:23.6.

Example 2

6.5 parts by weight of 3-methoxy-diphenylamine-4-diazonium phosphate (Diazo 2, phosphate, Table 1) are dissolved in 60 parts by volume of 86.7% phosphoric acid at 40° C. The solution is cooled down to room temperature and a solution of 3.4 parts by weight of 2,6-dimethylol-4-methylphenol (Component $B_1$, No. 5, Table 1) in 7 parts by volume of N-methylpyrrolidone is rapidly added, while stirring. The mixture is cooled to such an extent that the temperature of the mixture does not exceed 50° C. The mixture is then condensed for 2 hours at 40° C. A crude condensate soluble in water without any residue is obtained. For precipitating the condensation product, the crude condensation mixture is stirred into 1,000 parts by volume of isopropanol, the precipitate is filtered with suction, washed twice with 200 parts by volume of isopropanol, and dried. Yield: 7.5 parts by weight. The acid phosphate of a condensate is obtained which, according to analysis, has an excess content of about 9 carbon atoms per diazo group, as compared to the uncondensed diazo compound. About 1 mole of the second component is thus condensed per mole of diazo compound. (C 47.3%, N 7.6%, ND 5.1%, P 9.4%; atomic ratio: 21.7:3:2:1.67.)

Example 3

32.3 parts by weight of 3-methoxy-diphenylamine-4-diazonium sulfate (Diazo 2, sulfate, Table 1) are dissolved in 100 parts by volume of 86% phosphoric acid. 19.4 parts by weight of bis-(hydroxymethyl)-durene (Component $B_1$, No. 7, Table 1) are added, with stirring, in small portions at room temperature and condensation is performed for 25 hours at room temperature.

The crude condensate is dissolved in 1,000 parts by volume of water, a somewhat turbid solution being obtained, which is clarified by pressure filtration. The chloride of the condensation product is precipitated by heating the filtrate to 70° C. and adding 220 parts by volume of hydrochloric acid (36% hydrochloric acid diluted with the same volume of water). For purification, precipitation is repeated in the same manner. Yield: 33.8 parts by weight. According to analysis, the condensation product has an excess content of about 13 carbon atoms per diazo group, as compared to the uncondensed diazo compound. This corresponds to a ratio of about 1.1 moles of second component per mole of diazo compound. (C 65.0%, N 8.7%, Cl 9.2%; atomic ratio: 26.1:3:1.25).

Example 4

17.8 parts by weight of 3-methoxy-diphenylamine-4-diazonium sulfate (Diazo 2, sulfate, Table 1) are dissolved in 55 parts by volume of 86% phosphoric acid. 10 parts by weight of finely powdered 4-methyl-2,6-bis-(hydroxymethyl)-anisole (Component $B_1$, No. 6, Table 1) are then slowly added with stirring. Stirring is continued for 5 hours at room temperature and for 8.5 hours at 40° C., and the mass is then left standing for 30 hours at room temperature. The condensation mixture is dissolved in 300 parts by volume of water (clear solution) and the condensate is precipitated with stirring at +5° C. with 150 parts by volume of saturated common salt solution. The precipitate is separated and reprecipitated in the same manner. 18.7 parts by weight of a sticky condensation product are obtained which, according to analysis, has an excess content of 11.2 carbon atoms per diazo group, as compared with the uncondensed diazo compound. This corresponds to a ratio of about 1.1 moles of second component per mole of diazo compound. This corresponds to a ratio of about 1.1 moles of second component per mole of diazo compound. (C 60.3%, N 8.7%, Cl 10.2%; atomic ratio: 24.2:3:3:138.)

Example 5

15.42 parts by weight of diphenylamine-4-diazonium sulfate (95%) (Diazo 1, sulfate, Table 1) are dissolved in 100 parts by volume of methane sulfonic acid (90%). 6.8 parts by weight of finely powdered 1,5-bis-(acetoxymethyl)-naphthalene (Component $B_1$, No. 11, Table 1) are then added while stirring. After condensing for 1.5 hours at room temperature, the crude condensate is capable of forming a clear solution in water. 4.15 parts by weight of 1,3-dimethyl-4,6-dimethylol-benzene (Component $B_1$, No. 9, Table 1) are then introduced into the mixture, with stirring, and condensation is continued for another 45 minutes at room temperature. The crude condensate is dissolved in 500 parts by volume of water (clear solution). The condensation product is preciptated at +10° C. by the addition of 200 parts by volume of hydrochloric acid (36.5% acid diluted with the same volume of water). For purification, the product is dissolved in water and again precipitated, as the chloride, by the addition of hydrochloric acid. Yield: 14.5 parts by weight.

According to analysis, the condensation product has an excess content of 10.7 carbon atoms per diazo group, as compared to the uncondensed diazo compound. (C 67.2%, N 10.4%; atomic ratio: 22.6:3.)

Example 6

32.4 parts by weight of 3-methoxy-diphenylamine-4-diazonium sulfate (Diazo 2, sulfate, Table 1) are dissolved in 320 parts by volume of 86% phosphoric acid. At an initail internal temperature of 25° C., 44.5 parts by weight of 1,3-diisopropyl-4,6-dimethylol-benzene (Component $B_1$, No. 10, Table 1) in a very finely powdered form are introduced, with stirring. Stirring is continued for 1 hour without heating and condensation is then performed for 20 hours at +40° C. A crude condensate is obtained which forms a clear solution in water.

The condensation product is preciptated from the aqueous solution of the crude condensate by means of hydrochloric acid, again dissolved in water for purification, and reprecipitated with hydrochloric acid. Yield: 64 parts by weight. (C 68.2%, N 5.1%; atomic ratio: 46.8:3.) It can be assumed, from the result of analysis, that about 2.4 moles of second component are incorporated per mole of diazo compound.

Example 7

At room temperature and while stirring, 2.8 parts by weight of bis-(acetoxymethyl)-durene (Component $B_1$, No. 8, Table 1) are cautiously added to a solution of 3.4 parts by weight of 2′-carboxydiphenylamine - 4 - diazonium phosphate (Diazo 4, phosphate, Table 1) in 20 parts by volume of 90% methane sulfonic acid, and stirring is continued for 24 hours at room temperature. In order to isolate the reaction product, the clear condensation mixture is stirred into 250 parts by volume of water. The precipitate is drawn off by suction, washed with 250 parts by volume of water, again dissolved at 50° C. and reprecipitated by adding 50 parts by volume of 18% hydrochloric acid. Filtration of the precipitate is improved by heating the suspension briefly to 80° C. and again cooling. The product is drawn off by suction, washed with 1 N hydrochloric acid, and dried at 35° C. The yield is 3.7 parts by weight. (C 64.0%, N 8.5%; atomic ratio: 26.3:3:3.) According to analysis, the mixed condensate contains about 1.1 moles of the second component per mole of diazo compound.

Example 8

33.2 parts b yweight of 3-methoxy-diphenylamine-4-diazonium sulfate (Diazo 2, sulfate, Table 1) (97.5%) are dissolved in 100 parts by volume of 86% phosphoric acid. During 15 minutes, 25.9 parts by weight of methoxymethyl-diphenyloxide (for composition, see below) (Component $B_1$, No. 13, Table 1) are added dropwise, while stirring. A clear crude condensate is obtained which is stirred for another 1.5 hours at room temperature and then for 6 hours at 40° C. The condensate is dissolved in 500 parts by volume of water and the solution is cleared of a slight turbidity by filtration. The condensation product is precipitated by means of hydrochloric acid. Common salt also may be used for precipitation. If a product is to be obtained which is substantially free from phosphoric acid, it is advisable to reprecipitate the product in the same manner. Yield: 37.6 parts by weight. According to analysis, the condensation product has a content of 16 more carbon atoms per diazo molecule than does the uncondensed diazo compound. (C 61.7%, N 7.4%, Cl 9.3%; atomic ratio: 29.2:3:1.5.)

The methoxymethyl-diphenyloxide used has the following composition:

| | Percent |
|---|---|
| Diphenylether | 1.3 |
| Mono-o-(methoxymethyl)-diphenylether | 2.2 |
| Mono-p-(methoxymethyl)-diphenylether | 11.8 |
| Unknown similar monomethoxymethyl component | 3.9 |
| o,p′-di-(Methoxymethyl)-diphenylether | 21.9 |
| p,p′-di-(Methoxymethyl)-diphenylether | 47.3 |
| tri-(Methoxymethyl)-diphenylether | 1.3 |
| tetra-(Methoxymethyl)-diphenylether | 9.5 |

When introducing methoxymethyl-diphenyloxide into the acid in the absence of a diazo compound, it initially dissolves, with vigorous stirring. After a few seconds to a few minutes, a condensate precipitates which is insoluble in the acid and in boiling water.

A mixed condensate yielding exposure products having the same oleophilic properties is obtained by replacing the sulfate of Diazo 2 by an equimolecular quantity of the sulfate of Diazo 1, in an otherwise identical process. However, the mixed condensate containing the Diazo 2 yields repreduction layers of better storability.

Example 9

4.65 parts by weight of diphenylamine-4-diazonium sulfate (Diazo 1, sulfate, Table 1) (95%) are dissolved in 600 parts by volume of 85% phosphoric acid. Then 4.65 parts by weight of 1,4-bis-(α-hydroxybenzyl)-benzene (Component $B_1$, No. 19, Table 1) are dissolved in 30 parts by volume of glacial acetic acid which is sufficiently heated to cause solution. The hot acetic acid solution is then poured into the diazo solution while agitating vigorously. Condensation is effected at room temperature over a period of 21 hours. The condensation mixture is then dissolved in 2,000 parts by volume of water, filtered until clear, and precipitated by adding 300 parts by volume of concentrated hydrochloric acid. The precipitate is separated, dissolved at 60° C. in 500 parts by volume of water, filtered, and precipitated by adding 50 parts by volume of 6 N hydrochloric acid solution in water. The product which precipitates is reprecipitated once more in the same manner. 4.8 parts by weight of the chloride of the condensation product are thus obtained. According to analysis, the proportion of C:N:Cl is 26.6:3:1.05. This corresponds to a ratio of about 0.73 mole of the second component per mole of diazo compound. (C 62.2%, N 9.1%, Cl 8.1%.)

Example 10

30.84 parts by weight of diphenylamine-4-diazonium sulfate (95%) (Diazo 1, sulfate, Table 1) are dissolved in 1,000 parts by volume of 86% phosphoric acid. During 1 hour, a solution of 18.4 parts by weight of benzhydrol (Component $B_1$, No. 18, Table 1) in 200 parts by volume of glacial acetic acid is then added dropwise, while stirring. Condensation is performed for 24 hours at room temperature. A clear crude condensate which dissolves in water without residue is obtained. Half of the crude condensate is introduced into 2,500 parts by volume of water heated to 40° C. The condensation product initially forms a clear solution and crystallizes in the form of small flakes upon cooling. Yield: 21.9 parts by weight. (C 56.6%, N 8.1%, P 8.9%; atomic ratio: 24.5:3:1.5.)

According to analysis, the condensation product has a content of 12.5 more carbon atoms per diazo group than does the uncondensed compound. This corresponds to a ratio of about 1 mole of second component per mole of diazo compound.

The other half of the crude condensate is mixed with 1.5 parts by weight of paraformaldehyde and condensed for 20 hours at room temperature. The crude condensate is dissolved in 2,000 parts by volume of water and cleared of a slight turbidity by filtration. It can be separated in known manner in the form of the zinc chloride double salt. Yield: 22.9 parts by weight. (C 59.9%, N 8.5%; atomic ratio: 24.6:3.)

Example 11

For the preparation of the crude condensate, 11 parts by weight of 3-methoxy-diphenylamine-4-diazonium sulfate (Diazo 2, sulfate, Table 1) are introduced into 39.9 parts by weight of 86% phosphoric acid and the mixture is cooled to room temperature. Then, 5.17 parts by weight of a mixture of methoxymethylated diphenylethers of the composition given in Example 8 (Component $B_1$, No. 13, Table 1) are introduced dropwise, and the mixture is stirred for one hour.

Then, the mixture is heated to 40° C., a mixture of 22.1 parts by weight of the same diazo compound with 2.4 parts by weight of paraformaldehyde is added, and condensation is performed for 24 hours at 40° C. The crude condensate is used directly for the preparation of the coating composition.

Example 12

For the preparation of the diazo condensation product, 81 parts by weight of Diazo 2, sulfate (Table 1) are dissolved in 500 parts by volume of 85% phosphoric acid, 61 parts by weight of 1,3-diisopropyl-4,6-dimethylol-benzene (Component $B_1$, No. 10, Table 1) are introduced during 15 minutes, and the mass is condensed for 39 hours at 40° C. The condensation mixture, which forms a clear solution in water, is then dissolved in 2,500 parts by volume of water and reprecipitated by adding 500 parts by volume of 18% aqueous hydrochloric acid solution. After suction filtration and washing with 0.5 N hydrochloric acid, the product is dried with air. Yield: 113 parts by weight of the chloride of the condensation product. (C 66.2%, N 8.8%; atomic ratio: 26.3:3.) From the result of analysis, the condensate contains about 1 mole of second component per mole of diazo compound.

Example 13

Diazo resin in the form of the zinc chloride double salt, is obtained by condensing equimolecular quantities of Diazo 1, sulfate (Table 1) and formaldehyde in 80% sulfuric acid, analogously to the process described in U.S. Pat. No. 2,063,631.

Example 14

4.84 parts by weight of 3-methoxy-diphenylamine-4-diazonium phosphate (Diazo 2, phosphate, Table 1) and 4.4 parts by weight of diphenylamine-4-diazonium phosphate (Diazo 1, phosphate, Table 1) are dissolved in 300 parts by volume of 86% phosphoric acid. 6 parts by weight of 2,5-bis-(ethoxy-methyl)-thiophene (Component $B_1$, No. 16, Table 1) are then added dropwise with vigorous stirring. The mixture becomes reddish but remains clear. Condensation is performed for 2.5 hours at room temperature. The crude condensate forms a clear solution in water.

For precipitating the reaction product, the mixture is introduced into thoroughly stirred isopropanol at about 65° C. and cooled down to room temperature. The precipitate is filtered by suction, thoroughly washed with isopropanol and dried. Yield: 10.9 parts by weight. According to analysis, the condensation product, in the form of an acid phosphate, contains the components 3-methoxy-4-diazo-diphenylamine, 4-diazo-diphenylamine, and thiophene in a ratio of 0.7 to 0.3 to 2. (C 46.9%, N 6.7%, S 10.1%, $OCH_3$ 3.1%; atomic ratio: 24.6:3:1.98:0.73.)

When introducing the 2,5-bis-(ethoxymethyl)-thiophene into phosphoric acid in the absence of the diazo compound, a homocondensate of this compound is immediately formed which is practically insoluble in acid and in water.

Example 15

3.6 parts by weight of 2,5-dimethoxy-4-phenoxy-benzene diazonium chloride (Diazo 7, Table 1) in the form of the double salt with 0.5 mole of zinc chloride (containing NaCl, N=7.7%) are dissolved in 60 parts by volume of 93% phosphoric acid. Dry air is passed through the solution until no further hydrogen chloride escapes. 2.7 parts by weight of 1,3-diisopropyl-4,6-di-(methoxymethyl)-benzene (Component $B_1$, No. 20, Table 1) are then added and the mass is condensed for 1 hour at room temperature and for 2 hours at 40° C. The condensation mixture is dissolved in water where it forms a clear solution, the condensate is precipitated with zinc chloride, separated, and dried. Yield: 2.9 parts by weight. (C 57.6%, N 4.4%); atomic ratio: 30.6:2.) Analysis shows that the mixed condensate contains about 1.2 moles of the second component per mole of diazonium compound.

Example 16

3.6 parts by weight of the diazonium salt used as the starting material in Example 15 (Diazo 7, zinc chloride double salt, Table 1) are dissolved in 60 parts by volume of 90% methane sulfonic acid and dry air is passed throug the solution until no further hydrogen chloride escapes.

Then, 2.7 parts by weight of 1,3-diisopropyl-4,6-bis-(methoxymethyl)-benzene (Component $B_1$, No. 20, Table 1) are introduced and the mass is condensed for one hour at room temperature and for 2 hours at 40° C.

The mixture is introduced into water and freed from undissolved components by the addition of charcoal, followed by suction filtration.

The condensation product is precipitated from the filtrate in the form of the zinc cholride double salt. Yield: 5.8 parts by weight. (C 41.0%, N 2.7%; atomic ratio: 35.3:2.) This corresponds to a content of approximately 1.5 moles of the second component per mole of diazo compound.

Example 17

1.75 parts by weight of 4-(2,5-diethoxy-benzoylamino)-2,5-diethoxy-benzene diazonium chloride (Diazo 8, Table 1), in the form of the zinc chloride double salt (N=4.8%), are dissolved in 10 parts by volume of 90% methane sulfonic acid, and dry air is passed through the mixture until no further hydrogen chloride escapes. Then 0.14 part by weight of 1,4-bis-hydroxymethyl-benzene (Component $B_1$, No. 12, Table 1) is added. After condensing for 4 hours at room temperature, the mixture is diluted with water, filtered, and the condensate is precipitated from the filtrate by means of a zinc chloride solution. Yield: 2.2 parts by weight. (C 25.2%, N 3.6%; atomic ratio: 24.5:3.)

Example 18

0.78 part by weight of 3-methoxy-diphenylene-oxide-2-diazonium chloride, in the form of the double salt with 0.5 mole of zinc chloride (N=7.2%) (Diazo 9, Table 1) is dissolved in 10 parts by volume of 90% methane sulfonic acid, and dry air is passed through the mixture until no further hydrogen chloride escapes. Then, 0.14 part by weight of 1,4-dimethylol-benzene (Component $B_1$, No. 12, Table 1) is added, and condensation is effected for 4 hours at room temperature. The condensation product is precipitated by means of zinc chloride. Yield: 1.4 parts by weight. (C 22.4%, N 2.9%; atomic ratio: 18.2.) From analysis, it can be assumed that about 0.6 mole of the second component are incorporated per mole of diazo compound.

Example 19

A condensation product is produced from 3-methoxy-diphenylamine-4-diazoniumchloride and formaldehyde as described in Example 1 of U.S. Patent No. 3,406,159 and separated in the form of an acid phosphate which still contains some phosphoric acid (N 9.3%; atomic ratio C:N:P=14:3:2.3.)

The product has an average degree of condensation of about 3 units of methoxydiphenylamine diazonium salt per molecule, as determined for the diazo amino compound with diisobutylamine in benzene by the cryoscopic method for determining molecular weight.

10 parts by weight of the diazo condensation product are dissolved in 85 parts by weight of 85% phosphoric acid. 5.7 parts by weight of 4,4'-bis-methoxymethyl-diphenylether (Component $B_1$, No. 15, Table 1) are added dropwise, during 10 minutes, and the mixture is then condensed for 20 hours without additional heating. The clear condensation mixture, which forms a clear solution in water, is diluted with 100 parts by volume of water and then 330 parts by volume of a saturated aqueous solution of common salt are added. The precipitate thus formed is purified by dissolving it again in water, reprecipitating it with a common salt solution, and the precipitated product is then dried. Yield: 8.1 parts by weight. (C 48.3%, N 4.3%; atomic ratio: 39.4:3.)

According to analysis, the diazo homocondensate and the second component are present in the mixed condensate in a molar proportion of about 1:5.4.

Example 20

5 parts by weight of 4-p-tolylmercapto-2,5-dimethoxy-benzene diazonium chloride, in the form of the zinc chloride double salt (N 6.9%) (Diazo 6, Table 1) are dissolved in 40 parts by volume of 80% sulfuric acid, and dry air is passed through the solution until no further hydrogen chloride escapes.

0.88 parts by weight of 1,4-bis-(hydroxymethyl)-benzene (Component $B_1$, No. 12, Table 1) is added to the solution in portions, the solution is stirred for 1 hour at room temperature, and is then allowed to stand overnight. Thereafter, it is poured into 300 parts by volume of water, 2 parts by weight of charcoal are added to remove a slight turbidity, and the solution is then drawn off by suction. From the clear filtrate, the condensation product is precipitated by adding zinc chloride and common salt. Yield: 5.4 parts by weight, air-dried. (C 31.0%, N 3.5%; atomic ratio: 20.6:2.) The condensate contains about 0.7 mole of the second component per mole of diazo compound.

Example 21

32.3 parts by weight of 3-methoxy-diphenylamine-4-diazonium sulfate (Diazo 2, sulfate, Table 1) are dissolvel in 265 parts by weight of 93% phosphoric acid. 25.8 parts by weight of 4,4'-bis-(methoxymethyl)-diphenylether (Component $B_1$, No. 15, Table 1) are added dropwise to the solution and condensation is effective for 2 hours at 40° C. 16 parts by weight of paraformaldehyde are added to the mixture, which yields a clear solution in water, condensation is continued for 6 hours at 40° C., and the mixture is then allowed to stand overnight. The mixture, which dissolves in water without leaving a residue, is then dissolved in water and a saturated common salt solution is added. The voluminous precipitate which forms is maintained at 40° C. for 1 hour, then drawn off by suction as much as possible, and the contents of the suction filter, i.e. a green paste, are then dried over phosphorus pentoxide, whereupon the product turns into a tough, green mass which smells strongly of formaldehyde. Yield: 175 parts by weight. (C 16.4%, N 1.9%, S 0.45%, P 13.7%; atomic ratio: C:N:P=30.2:3:9.7.) As compared with the uncondensed diazo compound, the condensate has a content of approximately 17 more C atoms.

Examples 22 to 28

Examples 22 to 28 show that, with the use of the new condensation products also in the presence of phosphoric acid, reproduction layers are obtained which are substantially less sensitive to fingerprints during handling than are reproduction layers produced in the same manner but with the use of the known formaldehyde condensates of the diazo compounds alone (same anion and same addition of phosphoric acid).

The coating solutions given in Table 3 are applied to an aluminum support which has been roughened with metal wire brushes and pretreated with polyvinyl phosphonic acid according to U.S. Pat. No. 3,220,832. The coating is then dried with hot air.

The decrease of the sensitivity to moisture of the material, which becomes noticeable in the sensitivity to fingerprints, naturally involves a decrease in the developability of the reproduction layer with water. Aqueous solutions of salts, which preferably additionally contain wetting agents or small additions of organic solvents, generally are suitable for development, however.

The developers used in the individual examples are given in the last column of Table 3, which contains the details of the examples.

Developer I means: 100 parts by volume of water, 5 parts by weight of sodium lauryl sulfate (50%) (residue sodium sulfate), and 3 parts by weight of tartaric acid.

Developer II means: Developer I to which 2 parts by weight of benzyl alcohol are added.

The production of the copy shows that the reproduction layers obtained with the use of the new condensation products are up to four times as light-sensitive as are the reproduction layers obtained with the use of the known formaldehyde condensates of the same diazo compounds. The image areas accept printing inks very well.

TABLE 3

| Ex. | Mixed condensate (MC) | | | | | Coating solution | | | |
|---|---|---|---|---|---|---|---|---|---|
| | Diazo compound $A(-D)_n$ | Component $B_1$ | $CH_2O$ | Separated in the form of— | Proportion of $A(-D)_n$ to $B_1$ in MC (approx.) | Percent MC | Other additives | Solvent | Developer |
| 22 | | As in Example 3 | | | | 0.5 | 2 molecules of $H_2PO_4$ per diazo group. | EGGME | I |
| 23 | | As in Example 4 | | | | 0.5 | do | EGMME | $H_2O$ |
| 24 | | As in Example 5 | | | | 0.4 | do | EGMME | I |
| 25 | | As in Example 6 | | | | 0.8 | do | EGMME | II |
| 26 | | As in Example 7 | | | | 0.5 | do | EGMME | I |
| 27 | | As in Example 9 | | | | 0.46 | do | EGMME | I |
| 28 | Diazo 1, $H_2PO_4^-$ | 17 | — | $H_2PO_4 \cdot H_3PO_4$ | 1:1.52 | 0.8 | 1 molecule of HCl per diazo group. | EGMME/$H_2O$, 96:4 p.b.v. | II |

NOTE.—P.b.v.=parts by volume; EGMME=ethyleneglycol monomethyl ether.

4.4 parts by weight of diphenylamine-4-diazonium phosphate (Diazo 1, phosphate, Table 1) are dissolved in 300 parts by volume of 96.5% phosphoric acid. A boiling solution of 4.0 parts by weight of 9,10-bis-methoxy-methyl-anthracene (Component $B_1$, No. 17, Table 1) in 30 parts by volume of glacial acetic acid is poured into the solution, with thorough stirring. Condensation is performed for 1.5 hours without further heating. The crude condensate is soluble in water without any residue. In order to isolate the condensation product, the condensation mixture is diluted with 150 parts by volume of methanol and the solution is poured, with stirring, into 2,000 parts by volume of isopropanol at about 65° C. The precipitate is filtered off with suction, washed with isopropanol, and dried. Yield: 5.4 parts by weight. According to analysis the condensate has a content of 24.4 more carbon atoms per molecule of diazo compound than does the uncondensed diazo compound; this corresponds to about 1.5 moles of second component per mole of diazo compound. (C 52.9%, N 5.1%, P 11.3%; atomic ratio: 36.4:3:3).

The examples below show the wide use of the new condensation products on various support materials and in various reprographic processes.

In addition to the advantages of the improved oleophilic properties of the exposure products and the improved light-sensitivity, which also repeatedly occur in the following examples, these examples show further advantages of individual groups of mixed condensates.

Example 29

An electrolytically roughened aluminum foil is coated by swabbing with a 2% by weight aqueous solution of the chloride of a condensation product prepared from Diazo compound 2 and Component $B_1$ No. 14, Table 1. After image-wise exposure to light through a negative, the foil is developed by wiping it over with 1.5% aqueous phosphoric acid and inked up with greasy ink. An efficient printing form is obtained.

A similarly efficient printing form is analogously obtained by applying the same solution to a mechanically grained aluminum foil, which has been pretreated in known manner with an alkali silicate.

Instead of using the chloride of the condensation product, it also is possible to use the corresponding zinc chloride double salt or cadmium chloride double salt. Developer II is suitable for development.

The condensation product is prepared in the following manner:

30.2 parts by weight of 3-methoxy-diphenylamine-4-diazonium-sulfate (Diazo 2, sulfate, Table 1) are dissolved in 93.5 parts by volume of 86% phosphoric acid. 29.3 parts by weight of finely pulverized 4,4-bis-acetoxy-methyl-diphenylether (Component $B_1$, No. 14, Table 1) are then added with vigorous stirring, the mixture is stirred for another 1.5 hours without heating and finally condensed for 3.5 hours at 40° C. The clear condensation mixture is dissolved in 500 parts by volume of water (clear solution) and the chloride of the condensation product is precipitated at 40° C. by dropwise adding 220 parts by volume of hydrochloric and (36% HCl diluted with the same volume of water). For purification, the precipitate is dissolved in warm water and the chloride is again precipitated by the addition of hydrochloric acid. Drying is performed at 30° C. by circulating air in a drying chamber. Yield: 38.7 parts by weight. (C 65.7%; N 8.1%, Cl, 8.6%; atomic ratio 28.5:3:1.26.)

Example 30

An aluminum foil roughened by means of metal brushes and pretreated with polyvinyl phosphonic acid according to U.S. Pat. No. 3,220,832 is coated with the following coating solutions, and the layer is dried:

| | 1 | 2 | 3 | 4 | 5 | 6 |
|---|---|---|---|---|---|---|
| Diazo-formaldehyde condensate (parts by weight)[1] | 0.4 | | | | 0.04 | 0.13 |
| Mixed condensate (parts by weight)[2] | | 0.34 | 0.34 | 0.34 | 0.31 | 0.23 |
| Phosphoric acid, moles per mole diazo groups | 2.8 | 0 | 0.5 | 2.8 | 0.5 | 2.8 |

[1] Formaldehyde condensate from diazo compound 2, chloride (Table I), in 2.8 moles of phosphoric acid, by analogy to Example 1 of U.S. Pat. No. 3,406,159.

[2] The mixed condensate (chloride) is the same as in Example 29.

In each case solution is effected in 100 parts by volume of ethylene glycol monomethyl ether/butyl acetate (8:2 parts by volume).

Upon exposure to a three-phase carbon arc lamp of 2.4 kw. under a negative original and a 21-step grey wedge with density increments of 0.15, the same quantity of hardened wedge steps is obtained in all cases of layers (judged after development and inking up with greasy ink) when the following exposure times are employed:

Duration of exposure in relative units:

1 ---------- 70
2 ---------- 18
3 ---------- 18
4 ---------- 35
5 ---------- 25
6 ---------- 50

The developer in Case 1 is water, in Cases 2 to 6 Developer II (see Examples 22 to 28). For the purpose of further increasing the length of printing run, it is possible to reinforce the printing formes obtained in this manner with suitable lacquers, e.g. the products described in U.S. Pats. Nos. 3.313,233, particularly Example 1, and 2,754,279.

After storage for 8 weeks at 52° C., the presensitized materials 1, 4 and 6 still can be easily processed. The layers containing less phosphoric acid or no phosphoric acid are less storable under these conditions.

For increasing the printing run of the printing formes produced from the reproduction material, it also is possible to provide the reproduction layer with a coating of water-insoluble polymers as described, for example, in U.S. Pat. No. 3,136,637.

It also is possible to further add to such coatings dyestuffs, pigments, and diazo compounds, e.g. the compounds described in U.S. Pats. Nos. 3,180,732 and 3,175,-906. A corresponding working method is described in U.S. Patent Application Ser. No. 652,024.

As a mixed condensate there also may be used a product prepared from 1 mole of 3-methoxy-diphenylamine-4-diazonium sulfate (Diazo 2, sulfate, Table 1) and 1.5 moles of 4,4'-bis-methoxymethyl-diphenylether (Component $B_1$ No. 15, Table 1) analogously to Example 29 and separated as the chloride. In this case, even shorter exposure times are required but the addition of more phosphoric acid is necessary for achieving layers of the same storability.

Example 31

The aluminum support used in Example 30, precoated with polyvinylphosphonic acid, is coated with the following solution:

1.25 parts by weight of a crude condensate of 3-methoxy-diphenylamine-4-diazonium chloride and formaldehyde in phosphoric acid (molar ratio 1:1:2.8), condensation for 40 hours at 40° C.,
10.0 parts by weight of the condensation product described in Example 8,
5.1 parts by weight of 85% phosphoric acid,
2,400.0 parts by weight of ethylene glycol monomethyl ether, and
580.0 parts by weight of butyl acetate.

The coating is dried for 2 minutes at 100° C.

The sensitivity of the reproduction layer to fingerprints during handling is considerably reduced, compared to a reproduction layer containing only the first-mentioned crude condensate, and the light-sensitivity of the new reproduction layer is somewhat more than twice as high as that of a layer containing only the first-mentioned crude condensate. Development of the exposed reproduction material can be effected with Developer II described in Examples 22 to 28. The printing form then can be lacquered with the conventional lacquers, e.g. those described in the preceding example, and its run thus can be further increased.

The reproduction material produced according to this example has a very good storability. Plates stored for three years in the absence of light at room temperature (not air-conditioned) still can be processed according to the above method into printable printing formes.

Example 32

A paper printing foil produced according to the disclosure of U.S. Pat. No. 2,778,735, is coated with the following solution, by swabbing, and dried.

Coating solution: 2 parts by weight of the mixed condensation product described in Example 12 are dissolved in 97 parts by weight of warm water. The solution is reacted with 0.53 part by weight of sodium sulfite and stirred for one hour. The somewhat turbid solution is directly used for coating the support.

After image-wise exposure of the reproduction material and development with water, a very satisfactorily oleophilic image is obtained which accepts greasy ink well. The image areas have better oleophilic properties than have those obtained according to the same working method using a commercial diazo resin (diphenylamine-4-diazonium sulfate condensed in 80% sulfuric acid with formaldehyde and precipitated as the zinc chloride double salt).

EXAMPLE 33

An electrolytically roughened aluminum foil is coated with a solution of the following constituents:

2.0 parts by weight of the diazo condensate described in Example 12,
80.0 parts by volume of water,
0.284 part by weight of zinc chloride,
0.527 part by weight of sodium sulfite, and
20.0 parts by volume of dimethylformamide.

After image-wise exposure under a line negative, the foil is developed with Developer II described in Examples 22 to 28, rinsed with water, treated with 1% aqueous phosphoric acid and inked up with greasy ink. An efficient printing form is obtained the image areas of which have better oleophilic properties than have those of a printing form produced in the same manner using the same derivative of a commercial diazo resin (see Example 32).

When employing the above coating solution, it also is possible to obtain offset printing forms on mechanically grained aluminum treated in known manner with aqueous alkali silicate solution, with development in the same manner.

Example 34

A polyethylene terephthalate film roughened by sand blasting is coated with the following finely ground coating mixture and the coating is dried:

1.25 parts by weight of poly-N-vinyl-N-methylacetamide (K value 91),
0.5 part by weight of Heliogen Blue B powder (CI 74,160),
0.1 part by weight of finely divided silicon dioxide (Aerosil MOX 170),
0.375 part by weight of the diazo condensate described below,
18.0 parts by weight of water, and
1.6 parts by weight of ethanol.

After image-wise exposure under a negative, a blue colored positive tanned image is obtained by rinsing with water. The diazo condensate is prepared as follows:

32.4 parts by weight of 3-methoxy-diphenylamine-4-diazonium-sulfate (Diazo 2, sulfate, Table 1), are dissolved in 320 parts by volume of 85% phosphoric acid. 16.6 parts by weight of finely pulverized and screened 1,3-dimethyl-4,6-dimethylol-benzene (Component $B_1$, No. 9, Table 1) are added, with vigorous stirring, during 10 minutes, and stirring is continued for 30 minutes at room temperature. Condensation is then performed, with stirring, for 42 hours at 40° C. The crude condensate is soluble in water without any residue.

For separating the condensation product, the condensation mixture is dissolved in 1,000 parts by volume of water, the product is precipitated by the addition of 60 parts by volume of 45% aqueous hydrobromic acid and the precipitate is filtered off with suction.

For purification, the product is again dissolved in 1,000 parts by volume of water of 50° C. and the product is again precipitated by the addition of hydrobromic acid, washed with 1% aqueous hydrobromic acid and the filtered product is air-dried. Yield: 42 parts by weight. (C 53.1%, N 7.8%, Br 18.6%; atomic ratio 23.8:3:1.25). About 1.1 moles of second component are present per mole of diazo compound.

Example 35

The same support as in Example 34 is coated with the following mixture:

4.0 parts by weight of polyvinylpyrrolidone (K value 90),
1.0 part by weight of the diazo condensate described in Example 29,
0.1 part by weight of crystal violet (CI 42,555),
12.0 parts by weight of ethanol, and
88.0 parts by weight of water.

After image-wise exposure under a negative, a blue colored positive tanned image is obtained by rinsing with water.

Example 36

An electrolytically roughened aluminum foil is coated with the coating solution described in Example 35.

After image-wise exposure under a positive, the layer parts not hardened by the action of light are dissolved away by means of water. After drying, the support surface bared in the image areas by development is slightly etched in the conventional manner and finally coated with the lacquer described in U.S. Pat. No. 3,374,734. A positive printing forme is obtained by inking up and removing the hardened reproduction layer by brushing with warm dilute phosphoric acid.

Example 37

A polyethylene terephthalate film provided with a hydrophilic mat layer of finely divided silica, titanium dioxide and hardened polyvinyl alcohol is coated with a 0.4% solution of the naphthalene-1-sulfonate of the condensation product described in Example 34. The solvent used is a mixture of 80 parts by weight of ethylene glycol monomethyl ether and 20 parts by weight of butyl acetate.

After image-wise exposure under a negative, development is performed by wiping over with Developer I or II (Examples 22 to 28) and the plate wet with the developer is linked up with greasy ink. A positive printing form is obtained.

As the support, there also may be used a sufficiently water-resistant paper foil having a hydrophilic mat layer of baryta, kaolin, and finely divided silica in hardened polyvinyl alcohol. The coating solution used in this case, however, is a 2% solution of the condensation product in alcohol. After image-wise exposure through a negative, a positive printing forme is obtained by means of Developer I.

Example 38

A nylon fabric conventionally used in screen printing and which has been clamped in a frame is coated by means of a doctor knife with the mixture below. The coating is dried by a cool stream of air.

90.0 parts by weight of a polyvinyl alcohol saponified to 98%, a 4% solution of which in water at 20° C. has a viscosity of 8 to 11 cp.,
423.0 parts by weight of water,
15.0 parts by weight of finely divided silica (Aerosil MOX 170),
30.0 parts by weight of dibutylphthalate,
7.5 parts by weight of the condensate described in Example 29, and
0.5 part by weight of crystal violet (CI 42,555).

The screen is exposed for 6 minutes to a xenon impulse lamp of 5 kw. at a distance of 1 m. A screen printing form is obtained by rinsing with cold water.

Example 39

A zinc plate (2 mm. thick) slightly etched superficially by heating it with dilute nitric acid is coated on a plate whirler (80 revolutions per minute) with the coating solution below. The coating is preliminarily dried and then further dried for 2 minutes at 100° C.

Coating solution:

3.0 parts by weight of the condensate described in Example 29,
10.0 parts by weight of a phenol-formaldehyde resin of the novolak type, melting range 75 to 83° C. (Alnovol 320 K),
60.0 parts by weight of ethylene glycol monomethyl ether, and
40.0 parts by weight of dimethyl formamide.

After storage for three days at room temperature, the reproduction material is exposed for 6 minutes under a line positive to a tube exposure device (Printaphot) containing 6 superactinic luminescent tubes (Philips Type TLA 20 W/05) which are mounted at a distance of 7 cm. from the reproduction material. Development is performed with a 2% by weight aqueous trisodiumphosphate solution to which 5% by volume of ethylene glycol monoethyl ether had been added.

The copied plate is heated for 15 minutes to 180° C. and then etched with 5% by weight nitric acid. A positive relief printing form is obtained.

Example 40

A plastic film laminated to a thin copper foil is cleaned on the copper surface with an abrasive, rinsed with acetone, then coated with the solution described in Example 39, and the coating is dried. The plate is exposed under a positive representing a circuit diagram and developed in the manner described in Example 39. A copied circuit (positive) is obtained by etching away the copper in the bared areas by means of 40% aqueous ferric chloride solution.

Example 41

An aluminum foil roughened by metal brushes and precoated with polyvinylphosphonic acid according to U.S. Pat. No. 3,220,832 is coated with the following coating solution and the coating is dried.

0.4 part by weight of the condensation product described below,
80.0 parts by weight of ethylene glycol monomethyl ether, and
20.0 parts by weight of butyl acetate.

Development of the material, image-wise exposed under a negative, for obtaining a positive printing form is performed as in Example 30.

For the preparation of the condensation product, 12.9 parts by weight of 4,4′-bis-methoxymethyl-diphenylether (Component $B_1$ No. 15, Table 1) are added, with thorough stirring, to a solution of 3.23 parts by weight of 3-methoxy-diphenylamine-4-diazoniumsulfate (Diazo 2, sulfate, Table 1) in 12 parts by weight of 86% phosphoric acid and condensation is performed for 24 hours at 40° C. The clear crude condensate is introduced into 100 parts by volume of 2N hydrochloric acid, a viscous tacky mass separating thereby. After decanting the aqueous mother liquor, this mass is kneaded with another 100 parts by volume of 2N hydrochloric acid and the aqueous phase is decanted again.

After drying under reduced pressure, the somewhat tacky condensate is used for coating. (C 64.6%, N 3.4%; atomic ratio 66.5:3.)

Example 42

Aluminum supports which have been electrolytically roughened and then anodized as well as pretreated with polyvinylphosphonic acid according to U.S. Patent No. 3,220,832 are each coated with one of the following coating solutions and the coating is dried.

| | (a), p.b.w. | (b), p.b.w. | (c), p.b.w. | (d), p.b.w. |
|---|---|---|---|---|
| Mixed condensate (see below) | 1.1 | 1.1 | 1.1 | 1.1 |
| Diazo condensate according to U.S. Pat. No. 3,406,159, Example 1, adjusted to 2.8 molecules of phosphoric acid per diazo group | 0.6 | 0.6 | 0.6 | 0.6 |
| p-Toluenesulfonic acid·$H^2O$ | 0.2 | 0.2 | 0.2 | 0.2 |
| Resin: | | | | |
| 1 | 3.0 | | | |
| 2 | | 3.0 | | |
| 3 | | | 0.1 | |
| 4 | | | 0.1 | |
| 5 | | | | 3.0 |
| Ethylene glycol monomethyl ether/butyl acetate 8:2 | [1] 100 | [1] 100 | [1] 100 | [1] 100 |

[1] Parts by volume.

The mixed condensate is obtained as follows:

32.3 parts by weight of 3-methoxy-diphenylamine-4-diazoniumsulfate (Diazo 2, sulfate, Table 1) are dissolved in 170 parts by weight of 85% phosphoric acid, 25.8 parts by weight of 4,4′-bis-methoxymethyl-diphenylether (Component $B_1$ No. 15, Table 1) are added dropwise and condensation is performed for 5 hours at 40° C. After dilution with 250 parts by volume of water, the chloride of the condensation product is precipitated by the addition of 220 parts by volume of semiconcentrated hydrochloric acid. The chloride of the condensate is again dissolved in water and the mesitylenesulfonate of the diazo compound is obtained, with the sodium salt of mesitylenesulfonic acid as a precipitate sparingly soluble in water. Yield: 53 parts by weight (C 67.2%, N 6.3%, S 4.6%; atomic ratio 37.3:3:0.96)

The condensation product has a homologous polymeric structure. A mixed condensate prepared in practically the same manner (condensation and working-up conditions are described below) is converted by means of 1-phenyl-3-methyl-5-pyrazolone into the azo dyestuff of which the mean molecular weight is determined. This dyestuff furthermore is fractioned and the mean molecular weights of the individual fractions are determined.

Preparation of the mixed condensate:

| | |
|---|---|
| 3-methoxy-diphenylamine - 4 - diazoniumsulfate | 32.3 p.b.w. |
| 86% phosphoric acid | 170.0 p.b.w. |
| 4,4′ - bis - methoxymethyl - diphenylether (98 to 99%) | 25.8 p.b.w. |
| duration of condensation | 4.5 hours at 40° C. |
| Separation as the chloride | Twice with hydrochloric acid. |
| Final form of separation | Salt of the mesitylenesulfonic acid. |
| Yield | 55.0 p.b.w. |

(C 67.2%, N 6.4%, S 4.5%, P 0.2%, Cl 0.23%, $OCH_3$ 4.9%; atomic ratio C:N:S:$OCH_3$=36.7:3:0.95:1.04.)

The dyestuff is obtained in a yield of 9.23 parts by weight from 10 parts by weight of that product in ethylene glycol monomethyl ether, with the addition of $NH_3$ and phenylmethylpyrazolone.

The mean molecular weight of the dyestuff is determined by osmonetric determination of the vapor pressure of a solution in chloroform and is 3,180.

The following resins are used:

Resin 1: Epoxy resin based on bis-phenol-A-epichlorohydrin, melting point 64 to 76° C., mean molecular weight 900.

Resin 2: Polyvinyl butyral, containing 69 to 71% polyvinyl butyral, 1% polyvinyl acetate, and 24 to 27% polyvinyl alcohol units; the viscosity of a 6% solution at 20° C. is 4 to 6 cp. (DIN 53015).

Resin 3: Unplasticized urea resin of an approximate acid number of 2 (Resamin 106 F).

Resin 4: Ricinene-modified alkyd resin (phthalic acid anhydride 38%, oil content 30%, acid number less than 10, viscosity 40% in xylene 550 to 700 cp. (Alftalat 814 B).

Resin 5: Polyvinyl acetate of a mean molecular weight of 100,000.

The plates are image-wise exposed for 2 minutes under a negative to a xenon impulse lamp of 5 kw. at a distance of 1 m. and then converted into printing formes by wiping them over with a developer of the composition below, the printing forms yielding long printing runs, particularly in the cases of samples (a), (b), and (d).

The developer used is a mixture of:

50.0 parts by weight of water,
15.0 parts by weight of isopropanol,
20.0 parts by weight of n-propanol,
12.5 parts by weight of n-propylacetate,
1.5 parts by weight of polyacrylic acid, and
1.5 parts by weight of acetic acid.

It also is possible to reinforce the printing forms in known manner by lacquering and thus to increase the length of the printing run.

Suitable layers also can be obtained by omitting the diazo condensate in the coating solutions (a) to (d) according to U.S. Pat. No. 3,406,159, Example 1, and by replacing the toluenesulfonic acid by about 0.5 to 2 moles of phosphoric acid per mole of diazo groups.

Instead of the mixed condensate employed, it also is possible to use mixed condensates of the same components but of another structural ratio, e.g. the following:

| | (1) | (2) |
|---|---|---|
| 3-methoxy-diphenylamine-4-diazoniumsulfate (Diazo 2, sulfate, Table 1) | 100 p.b.w. | 64.6 p.b.w. |
| 85% phosphoric acid | 527 p.b.w. | 340 p.b.w. |
| 4,4′-bis-methoxymethyldiphenylether (component $B_1$ No. 15, Table 1) | 60 p.b.w. | 77.4 p.b.w. |
| Duration of condensation | 6 hours at 40° C., left standing overnight. | 4.5 hours at 40° C. |
| Precipitated twice as the chloride and finally separated as the salt of | Mesitylene sulfonic acid. | Mesitylene sulfonic acid. |
| Yield | 140.0 p.b.w. | 126.0 p.b.w. |
| Analysis | C: 66.5%<br>N: 6.8%<br>S: 5.2% | C: 69.2%.<br>N: 4.9%.<br>S: 4.0%.<br>$OCH_3$: 4.9%. |
| Atomic ratio | 34.2:3:1 | 49.5:3:1.07:1.35. |

For the purpose of fractionating, chloroform solutions of the dyestuff are applied to aluminum foils and dried. These thin dyestuff layers are then extracted with mixtures of solvent (chloroform) and non-solvent (methanol), extraction being begun with low solvent power mixtures and continued with mixtures of increasing solvent power. Details of the test performance and the mean molecular weights of the individual fractions are given in the following table.

| Fraction number | Chloroform (ml.) | Methanol (ml.) | Fraction quantity (mg.) | N, percent | Mean molecular weight |
|---|---|---|---|---|---|
| 1 | | 150.0 | 3.2 | | |
| 2 | 60.0 | 90.0 | 13.9 | | |
| 3 | 67.5 | 82.5 | 65.8 | 11.8 | 1,115 |
| 4 | 75.0 | 75.0 | 89.6 | 11.8 | 1,451 |
| 5 | 82.5 | 67.5 | 91.2 | 11.5 | 1,828 |
| 6 | 90.0 | 60.0 | 152.6 | 11.3 | 2,530 |
| 7 | 97.5 | 52.5 | 247.3 | 10.8 | 4,012 |
| 8 | 105.0 | 45.0 | 429.4 | 10.6 | 6,165 |
| 9 | 112.5 | 37.5 | 156.6 | 10.3 | 6,674 |

The mean molecular weight of the azo dyestuff of (2) with methylphenylpyrazolone, determined as described above, is 2,390.

Example 43

The procedure is analogous to that of Example 42, but the following solution is used for coating:

1.0 part by weight of the mixed condensate described in Example 14,
1.6 parts by volume of 1 N hydrochloric acid,
1.0 part by weight of Resin 2 of Example 42,
0.4 part by weight of the diazo condensate according to U.S. Pat. No. 3,406,159, Example 1, adjusted to 2.8 molecules of phosphoric acid per diazo group,
4.0 parts by volume of water, and
96.0 parts by volume of a mixture of ethylene glycol monomethyl ether and butyl acetate in a ratio by volume of 8:2.

A highly light-sensitive reproduction material is obtained which, analogously to Example 42, can be processed into printing forms yielding long printing runs.

Example 44

An aluminum support, precoated according to U.S. Pat. No. 3,220,832 with polyvinylphosphonic acid and roughened by means of metal brushes, is coated with the following coating solution.

0.4 part by weight of one of the mixed condensates described below,
0.0605 part by weight of p-toluenesulfonic acid,
0.080 part by weight of 4-methoxy-4'-dimethylaminoazobenzene, and
100.0 parts by volume of a mixture of ethylene glycol monomethyl ether and butyl acetate in a ratio by volume of 8:2.

By image-wise exposure through a negative, a distinctly visible positive contrast image is obtained. Development to obtain a printing form can be performed with Developer I (Examples 22 to 28).

Examples 46 to 48

Examples 46 to 48 show the suitability of a number of other mixed condensates as constituents of light-sensitive reproduction layers of reproduction materials which are useful for the photomechanical preparation of offset printing forms. The supports used are aluminum foils roughened by means of metal brushes and pretreated according to U.S. Pat. No. 3,220,832 with polyvinyl phosphonic acid.

The coating solutions used as well as details about the mixed condensates employed are given in Table 4 below.

Referring to Example 46, it should be pointed out that the reproduction layer has a very good light-sensitivity and also a very good storability. It is thus possible to copy and develop the presensitized printing plate after storage for 8 hours at 100° C., without the non-image areas tending to scum.

Referring to Example 48, it should be noted that a printing form can be produced even after a very brief exposure to light. It is thus sufficient to expose the copy for 10 to 20 seconds to a 5 kw. xenon impulse lamp at a distance of 1 m. The printing form can be reinforced with the usual lacquers.

TABLE 4

| | Mixed condensate (MC) | | | | | Coating solution | | | |
|---|---|---|---|---|---|---|---|---|---|
| Ex. | Diazo compound $A(-D)_n$ | Component $B_1$ | $CH_2O$ | Separated in the form of— | Proportion $A(-D)_n$ to $B_1$ in MC (approx.) | Percent MC | Other additives | Solvent (mixtures, p.b.v.) | Developer |
| 46 | Diazo 2, $HSO_4^-$ | 21 | — | Naphthyl-(2)-$SO_3^-$. | 1:0.85 | 0.5 | | EGMME/BA, 80:20 | II (Ex. 22 to 28). |
| 47 | Diazo 5, $HSO_4^-$ | 15 | — | $Cl^-$ | 1:1.1 | 1.0 | 1.5 moles of $H_3PO_4$ per mole of diazo groups. | EGMME/BA, 80:20 | Do. |
| 48 | Diazo 10, $\frac{Cl^- \cdot ZnCl_2}{2}$ | 15 | — | Naphthyl-(2)-$SO_3^-$. | 1:1.75 | 0.5 | | EGMME | Do. |

NOTE.—EGMME=ethyleneglycol monomethyl ether; BA=butyl acetate; p.b.v.=parts by volume.

The mixed condensates are prepared analogously to Example 42 as follows:

| | (a) | (b) |
|---|---|---|
| 86% phosphoric acid | 120 p.b.w. | 170 p.b.w. |
| 4-methoxy-diphenyl-amine-4'-diazoniumsulfate (Diazo 3, Table 1). | 32.3 p.b.w. | 32.3 p.b.w. |
| 4,4'-bis-methoxymethyldiphenyloxide (component $B_1$ No. 15, Table 1). | 12.9 p.b.w. | 25.8 p.b.w. |
| Duration of condensation (40° C.) | 20 hours | 3.5 hours. |

The condensation mixtures form a clear solution in warm water. The condensation products are precipitated, with hydrochloric acid, as the chlorides.

| | (a) | (b) |
|---|---|---|
| Yield, p.b. w. | 22.1 | 44.5 |
| Atomic ratio $C:N$ in the condensation product | 29.5:3 | 34.2:3 |
| Analysis, percent: | | |
| C | 64.2 | 65.6 |
| N | 7.6 | 6.7 |

According to analysis, it can be assumed that the mixed condensate in case (a) contains about 1.2, and in case (b) about 1.5 moles of second component per mole of diazo compound.

Example 45

According to the procedure described in Example 39, a zinc plate is coated with the following coating solution:

0.3 part by weight of the condensation product described in Example 2,
1.0 part by volume of water,
0.54 part by volume of 1 N hydrochloric acid,
1.0 part by weight of the phenol-formaldehyde resin used in Example 39,
6.0 parts by weight of ethyleneglycol monomethylether, and
4.0 parts by weight of dimethyl formamide.

A positive relief printing form is obtained by processing in the manner described in Example 39.

The preparation of the diazo condensates used in Examples 46 to 48 is described below.

Example 46

The procedure is similar to that of Example 42 but the following substances are used: 16.2 parts by weight of 3-methoxy-diphenyl-amine-4-diazonium-sulfate (Diazo 2, sulfate, Table 1), 36 parts by volume of 86% phosphoric acid, 6.86 parts by weight of 4,4'-bis-methoxy-methyl-diphenylsulfide (Component $B_1$ No. 21, Table 1). Condensation is performed for 1.5 hours at room temperature and 20 hours at 40° C.

The crude condensate is dissolved in water and the condensation product is precipitated from this solution by the addition of hydrochloric acid. The viscous precipitate is redissolved in water and again precipitated by the addition of hydrochloric acid. The precipitate is again redissolved in water and, from this solution, by means of the sodium salt of naphthalene-2-sulfonic acid, the corresponding sulfonate of the condensation product is precipitated. After drying at 40° C., the yield is 12.9 parts by weight. (C 64.7%, N 6.4%, S 9.1%; atomic ratio 35.4:3:1.86.)

About 0.86 mole of second component is then present per mole of diazo compound.

A similarly good result is obtained with the working conditions of Example 46 when using a condensation product prepared from the same components but in different quantities.

In this case the condensation is as follows: 16.2 parts by weight of 3-methoxy-diphenylamine-4-diazonium-sulfate (Diazo 2, sulfate, Table 1), 50 parts by volume of 86% phosphoric acid, and 13.7 parts by weight of 4,4'-bis-methoxy-methyl-diphenylsulfide (Component $B_1$ No. 21, Table 1) are condensed for 4 hours at 40° C. The crude condensate is dissolved in water, cleared of a slight turbidity by means of activated charcoal, the product is precipitated with common salt solution, separated and washed with common salt solution. The chloride is again dissolved in water and the condensate is precipitated as a salt of mesitylene sulfonic acid. Yield: 24.8 parts by weight. (C 65.9%, N 6.5%, S 10.2%, atomic ratio 35.4:3:2.05.)

image areas are dyed by means of an aqeuous solution of crystal violet.

TABLE 5

| | Mixed condensate (MC) | | | | | | Coating composition | | | |
|---|---|---|---|---|---|---|---|---|---|---|
| Ex. | Diazo compound $A(D)_n$ | Component $B_1$ | Active CO compound | Separated as— | Ratio $(A(D)_n$ to $B_1$ (approx.) | Support | Percent MC | Further additives | Solvent (mixture, p.b.v.) | Developer |
| 49 | Diazo 2, $H_2PO_4^-$. | 2 | — | $H_2PO_4^- \cdot H_3PO_4$. | C:N, 10:3 | Sandblasted polyester film. | 0.55 | 5.5 p.b.w. polyvinylmethyl acetamide (K value 91)/0.55 p.b.w. of MC. | $H_2O$ | Water. |
| 50 | Diazo 2, $HSO_4^-$. | 15 | — | $Cl^-$ | 1:1.1 | Electrolytically roughened Al. | (1) | Coating solution, see below. | | Do. |

(1) 1 part by weight of the mixed condensate is dissolved in 10 p.b.v. of water and 0.39 p.b.w. of morpholine is added. The colloidal precipitate is drawn off by suction, briefly washed with water, and then introduced into 100 p.b.v. of dimethyl formamide in which 2 p.b.w. of polyvinyl methylacetamide (K value 91) are previously dissolved.

NOTE.—p.b.v.=parts by volume; p.b.w.=parts by weight.

The condensate contains about 1 mole of second component per mole of diazo compound.

Example 47

8.3 parts by weight of Diazo Compound 5 (sulfate, somewhat wet; N 6.2%) are dissolved in 60 parts by volume of 93% phosphoric acid and 5.2 parts by weight of 4,4'-bis-methoxymethyl-diphenylether (Component $B_1$ No. 15, Table 1) are dropwise added within 12 minutes. The mixture is stirred for one hour without further heating and for two hours at 40° C.

The clear water-soluble crude condensate is dissolved in water, the condensation product is precipitated by the addition of aqueous hydrochloric acid and the precipitate is separated again with hydrochloric acid, after dissolving it again in fresh water. After drying, 10 parts by weight of the chloride of the condensation product are obtained. (C 62.3%, N 4.3%; atomic ratio 33.8:2).

This means that about 1.1 moles of second component are present per mole of diazo compound.

Example 48.

0.94 part by weight of diazo compound No. 10 (zinc chloride double salt, N 8.9%) is dissolved in 10 parts by volume of 92% phosphoric acid and dry air is passed through the mixture until no more hydrochloric acid escapes, i.e. until the mixture is substantially free from chloride ions.

0.52 part by weight of 4,4'-bis-methoxyemthyl-diphenylether (Component $B_1$ No. 15, Table 1) is introduced and condensation is performed for 15 hours at room temperature. The condensation mixture is dissolved in 100 parts by volume of water, clarified with activated charcoal and the sulfonate of the diazo compound is precipitated with 0.92 part by weight of the sodium salt of naphthalene-2-sulfonic acid in 100 parts by volume of water. Yield after drying: 0.9 part by weight (C 64.4%, N 3.8%, S 4.8%; atomic ratio 59.3:3:1.66.)

Analysis shows that about 0.66 molecule of the sodium salt of the sulfonic acid has been entrained during precipitation. Considering this fact, the result of the analysis is a condensation ratio of diazo compound to second component of about 1:1.75.

Examples 49 and 50

These examples show that, in principle, not only the mixed condensate in the form of the diazonium salts, but also the diazoamino compounds obtainable from these, by reaction with sodium azide or with secondary amines, may be used as light-sensitive components of reproduction layers, and in special cases of reproduction layers suitable for the production of tanned images.

Table 5 contains the most important data of these examples.

In all cases, the coating compositions are whirl-coated onto the supports used, and the coating is then dried. After image-wise exposure, the areas not struck by light are removed with water, and, after drying, the cross-linked The mixed condensates are prepared as follows.

Example 49

6.5 parts by weight of 3-methoxy-diphenylamine-4-diazonium-phosphate (Diazo 2, phosphate) are dissolved 50 parts by volume of 86% phosphoric acid, then 3.9 parts by weight of hexa-methoxymethylmelamine (Component $B_1$ No. 2, Table 1) are introduced while vigorously stirring, and the mixture is condensed for 20 hours at room temperature.

The condensation product is separated out of the crude condensate by precipitation with isopropanol. Yield: 9.1 parts by weight. (C 32.9%, N 11.6%, P 14.9%.) According to analysis, the product contains the elements C and N in a ratio of about 10:3.

Example 50

The diazo mixed condensate is prepared as described in Example 29.

Example 51

The paper support used in Example 32 is coated by swabbing with the following coating solution:

2.0 parts by weight of the mixed condensate described below,
0.75 part by weight of 86% phosphoric acid, and
100.0 parts by volume of water.

After drying, the reproduction layer is image-wise exposed under a negative original and then wiped over with water. A highly ink-receptive, positive printing form is thus obtained.

The mixed condensate is prepared as follows:

15.42 parts by weight of diphenylamine-4-diazonium sulfate (Diazo 1, sulfate, Table 1) are dissolved in 100 parts by volume of 80% sulfuric acid. While vigorously stirring, 8.83 parts by weight of finely pulverized dimethylol-succinic diamide (Component $B_1$ No. 1, Table 1) are introduced, with cooling to remain a temperature of +25° C. The mixture is condensed for 15.5 hours at room temperature, the crude condensate is dissolved in 500 parts by volume of water, and the condensate is precipitated by adding 80 parts by volume of a 50% zinc chloride solution. The precipitate is separated, dissolved in 500 parts by volume of water at 50° C., reprecipitated by adding 50 parts by volume of a 50% zinc chloride solution, drawn off by suction, and dried under reduced pressure. Yield: 18.6 parts by weight. (C 40.8%, N 11.6%, ND 5.35%; atomic ratio: 17.8:4.35:2.) From the analysis, it may be assumed that a second component is incorporated, but the carbonamide groups appear to have become saponifide to some degree.

Example 52

This example proves the superiority of certain mixed condensates over known diazo diphenylamine formaldehyde condensates for the hydrophilic hardening of water-soluble colloids. Hydrophilic hardened colloids are of importance for a special type of positive-working, presensitized printing plate (see U.S. Pat. No. 3,085,008). With plates of this type, a mixture of a hydrophilic polymer and a diazo compound is coated onto the surface of a support, which has been rendered oleophilic. During image-wise exposure under a positive master, the colloid is cross-linked and anchored to the oleophilic support. The unexposed areas of the layer are then removed, and the oleophilic support is bared in these areas and will represent the image areas transferring the printing ink. A positive printing form is thus obtained.

Since the light-decomposition products of known formaldehyde condensates have oleophilic properties, the proportion of diazo condensate should not be too high; on the other hand, cross-linking of the layer must be as complete as possible in order to make it more resistant to attack during the printing process, and this is effected by a high proportion of diazo compound.

This example shows a comparison between two printing plates of this type, in which (a) one was prepared with the chloride of the formaldehyde condensate of diphenylamine-4-diazonium chloride produced in accordance with Example 1 of U.S. Pat. No. 3,311,605.
(b) while the other was prepared with the chloride of a mixed condensate of diphenylamine-4-diazonium salt and dimethylolurea prepared as described below.

A presensitized planographic printing plate produced in accordance with U.S. Pat. No. 3,396,019, Example 1, is completely exposed without using an original, e.g. under an arc lamp. Then, the plate is rinsed with water and dried. The plate is cut in half, and of the two halves one is coated with coating solution 1 and the other with coating solution 2, described below, and the coatings are then dried.

1. 0.125 part by weight of the condensate described at (a),
   0.78 part by weight of polyacrylamide (Cyanamer P 250),
   and
   1.00.0 parts by volume of water.
2. 0.125 part by weight of the mixed condensate described at (b),
   0.78 part by weight of polyacrylamide (Cyanamer P 250),
   and
   100.0 parts by volume of water.

After image-wise exposure under a positive original, the plates are developed by wiping them over with water and then are inked up with greasy ink.

While in Case 1 a positive printing form is obtained which shows excessive scumming in the non-image areas, a positive planographic printing plate is produced with solution 2 which, apart from minor coating deficiencies, is fully acceptable and the non-image areas of which (hardened hydrophilic colloid) do not accept greasy ink.

The mixed condensate employed in this example is prepared as follows:

23.2 parts by weight of diphenylamine-4-diazonium chloride (Diazo 1, chloride, Table 1) are dissolved in 50 parts by volume of a 36.5% aqueous solution of hydrochloric acid. With vigorous stirring, 12 parts by weight of finely pulverized dimethylol-urea (Component $B_1$ No. 3, Table 1) are introduced into the solution and stirring is continued, first for 3 hours at room temperature and then for 1 hour at 40° C. After standing overnight in a refrigerator, the mixture is diluted with 80 parts by volume of methanol and then introduced into 1,200 parts by volume of isopropanol. The precipitate is drawn off by suction, washed twice briefly each time wits 400 parts by volume of isopropanol, and dried under reduced pressure at 40° C. Yield: 15 parts by weight (chloride). A yellow, water-soluble powder is thus obtained which, according to analysis, contains about 0.9 molecule of urea per diazo group. (N 19.6%, ND 8.2%, Cl 10.8%; atomic ratio: 4.8:2:1.04)

Example 53

A trimetal plate consisting of layers of aluminum, copper and chromium is covered with a coating solution of the composition stated below, excess solution is allowed to drain, and the plate is dried.

2 parts by weight of the chloride of the mixed condensate described below,
1 part by weight of polyvinyl alcohol (residual acetyl content 12 percent, viscosity of a 4% aqueous solution 6.5 to 8.8 cp. at 20° C.), and
50 parts by volume of water.

After image-wise exposure under a positive original, the plate is developed by means of the developer II described in Examples 22 to 28, and then the chromium is etched away to the copper layer in the areas not covered by the reproduction layer, using an aqueous etching solution, containing 30 percent by weight of calcium chloride, 20 per cent by weight of zinc chloride, and about 1.5 to 3 percent by weight of ammonium chloride, tartaric acid and concentrated hydrochloric acid, for the chromium layer. The plate is decoated by treatment with a paste consisting of powdered chalk and dimethyl formamide. A positive multi-metal printing form is thus obtained from which very long runs can be printed.

The diazo mixed condensate is prepared in a manner similar to that described in Example 29, using, however, the following reactants and reaction conditions:

32.3 parts by weight of 3-methoxy-diphenylamine-4-diazonium sulfate (Diazo 2, sulfate, Table 1),
170.0 parts by weight of 86% phosphoric acid, and
64.4 parts by weight of methoxymethyl diphenylether made from CMDPO–32 (Component $B_1$ No. 22; see below).

The mass is condensed for 4.5 hours at 40° C., filtered until clear, precipitated by means of hydrochloric acid, dissolved again, and again precipitated with hydrochloric acid. Yield: 44 parts by weight.

According to the information given by the manufacturer (cf. U.S. Pat. No. 3,316,186, column 3, lines 41 to 64), the chloromethylated diphenylether CMDPO–32 of Dow Chemical Co. has a $CH_2Cl$ substitution degree of 2.8 and consists of the following components:

| | Percent |
|---|---|
| 2,4′-di-chloromethyl-diphenylether | 1.9 |
| 4,4′-di-chloromethyl-diphenylether | 8.6 |
| 2,2′,4′-tri-chloromethyl-diphenylether | 17.0 |
| 2,4,4′-tri-chloromethyl-diphenylether | 72.0 |
| 2,2′,4,4′-tetra-chloromethyl-diphenylether less than | 2.0 |

The ether mixture obtained by replacing halogen atoms by methoxy groups had a methoxy content of 28.9%. It was used for the preparation of a condensation product the elemental analysis of which was as follows: (C 67.5%, N 4.4%, Cl (total) 4.3%, Cl (ionogen) 3.8%, $OCH_3$ 12.7%; atomic ratio: 53.6:3:1.16:1.03:3.92.)

The result of the analysis shows that considerable quantities of reactive methoxymethyl groups are contained in the mixed condensate.

A reproduction material which also may be used with good success is produced by coating the same support with a coating solution of the following composition and drying the coating:

1 part by weight of the mixed condensate described in Example 29,
2 parts by weight of the polyvinyl alcohol used above in this example, and
50 parts by volume of water.

After image-wise exposure, the plate is developed by rinsing with water. Further processing to yield a multi-metal printing form is as described at the beginning of this example.

Instead of a support consisting of layers of aluminum, copper and chromium, a brass foil may be used which is coated with a thin chromium layer.

Example 54

A copper plate is bathed for a few seconds in a 1 to 2% ferric chloride solution, rinsed with water, cleaned with powdered chalk, again rinsed, and then dried.

Then, a solution consisting of:

8 parts by weight of the mixed condensate described below, and
100 parts by volume of a mixture of 8 parts by volume of ethylene glycol monomethyl ether and 2 parts by volume of butyl acetate is poured over the plate and the coating is dried by blowing warm air thereon.

After image-wise exposure under a positive screen original, the plate is wiped over for a few seconds with a 10% aqueous solution of n-propanol and developed with the Developer I used in Examples 22 to 28 until the reproduction layer has been removed from the unexposed areas.

After drying, the plate is etched in the normal manner with a 40% iron-III-chloride solution. A half-tone gravure form is thus obtained.

The mixed condensate is prepared as described in Example 53 using, however, the following components and conditions:

32.3 parts by weight of Diazo 2, sulfate (Table 1),
170.0 parts by weight of 86% phosphoric acid, and
32.3 parts by weight of Component $B_1$ No. 22 (Table 1).

The reaction mixture is condensed for 4.5 hours at 40° C., the condensation product is precipitated by adding a common salt solution, dissolved again, and reprecipitated with a common salt solution. Final precipitation is in the form of the mesitylene sulfonate. Yield: 55.7 parts by weight. (C 66.7%, N 5.8%, S 4.7%, $OCH_3$ 7.8%; atomic ratio: 40.2:3:1.06:1.82)

The result of the analysis shows that this condensate, too, contains reactive methoxymethyl groups in significant quantities.

By the procedure described in Example 40, printed circuits may be produced using the same coating composition.

Examples 55 to 67

These examples show the suitability of a series of mixed condensates produced from different components and separated in different forms (light-sensitive sulfonic acids and poly-functional sulfonic acids) for light-sensitive reproduction layers useful in the photomechanical production of planographic printing plates.

It is surprising that the precipitation product of the polyfunctional mixed condensate and the bivalent sulfonic acids used in Examples 60 and 61 is readily soluble in organic solvents.

Table 6 contains the data concerning the mixed condensates used, the coating solutions, and the development.

In some cases, phosphoric acid was added to the coating solutions. The addition of phosphoric acid, e.g., even in quantities from 0.1 to 0.3 mole per mole of diazo groups, has a favorable influence upon the storability of the coated materials and their developing characteristics.

After image-wise exposure under a negative, an image becomes clearly visible which is normally blueish-green, but more brown in the case of Example 60.

Development may be effected using one of Developers I or II described in Examples 22 to 28.

After inking up with greasy ink, printing plates are obtained from which a large number of flawless prints can be made. The printing run may be considerably increased by reinforcing the thoroughly developed printing plate with a conventional lacquer.

The printing plates coated in accordance with Examples 55 to 62 are more light-sensitive than those produced using the formaldehyde condensate of the diazo compound described in Example 1 of U.S. Pat. No. 3,406,159. The most essential increase in light-sensitivity is achieved by Examples 59, 64, and 65, the materials of Examples 64 and 65 being particularly advantageous because of their easier synthesis and the improved solubility of the products. The storability of the printing plates prepared with the two last-mentioned materials is remarkable.

The support used in Examples 55 to 65 was an aluminum foil which had been electrolytically roughened, then anodized, and finally treated with polyvinyl phosphonic acid. In Examples 66 and 67, an aluminum foil was used which had been roughened by means of metal brushes and then treated with polyvinyl phosphonic acid.

In addition to these supports, a series of supports also may be used in combination with the reproduction layers according to the invention, which are recommended for the so-called "wipe-on" process with known diazo resins which are commercially available.

TABLE 6

| | Mixed condensate (MC) | | | | Coating solution | | | |
|---|---|---|---|---|---|---|---|---|
| Ex. | Diazo compound $A(D)_n$ | Component $B_1$ | Separated in the form of— | Proportion of $A(D)_n$ to $B_1$ in MC (approx.) | Percent MC | Acid added | Solvent used (parts by vol.) | Developer |
| 55 | Diazo 2, $HSO_4^-$ | 9 | Naphthalene-1-$SO_3^-$ | 1:0.57 | 2 | ---------- | Ethyleneglycolmonomethylether/butyl acetate, 8:2. | I or II. |
| 56 | do | 9 | $PF_6^-$ | 1:0.42 | 2 | ---------- | Ethyleneglycolmonomethylether/dimethylformamide, 6:4. | Do. |
| 57 | do | 10 | Naphthalene-1-$SO_3^-$ | 1:0.57 | 2 | ---------- | Ethyleneglycolmonomethylether/butyl acetate, 8:2. | Do. |
| 58 | do | 10 | $PF_6^-$ | 1:0.31 | 2 | ---------- | do | Do. |
| 59 | Diazo 2, $H_2PO_4^-$ | 17 | $Cl^-$ | 1:0.63 | 2 | ---------- | do | Do. |
| 60 | Diazo 2, $HSO_4^-$ | 10 | Diazidostilbene-disulfonate. | 1:1 | 2 | 0.06 p.b.w. of 86% $H_3PO_4$/p.b.w. MC. | do | Do. |
| 61 | do | 10 | di-tert.Butylnaphthalene-di-$SO_3^-$. | 1:0.75 | 2 | 0.036 p.b.w. of 86% $H_3PO_4$/p.b.w. MC. | do | Do. |
| 62 | do | 10 | Naphthalene-2-$SO_3^-$ | 1:0.96 | 2 | 0.031 p.b.w. of 86% $H_3PO_4$/p.b.w. MC. | do | Do. |
| 63 | Diazo 2, $H_2PO_4^-$ | 11 | $Cl^-$ | 1:0.77 | 2 | 0.22 p.b.w. of 86% $H_3PO_4$/p.b.w. MC. | Ethyleneglycolmonomethylether/dimethylformamide, 6:4. | Do. |
| 64 | Diazo 2, $HSO_4^-$ | 15 | 2-diazo-1-naphthol-5-$SO_3^-$. | 1:1.1 | 2 | 0.035 p.b.w. 86% $H_3PO_4$/p.b.w. MC. | Ethyleneglycolmonomethylether/dimethylformamide, 6:4. | Do. |
| 65 | do | 15 | Mesitylene-$SO_3^-$ | 1:1 | 2 | ---------- | Ethyleneglycolmonomethylether/butyl acetate, 8:2. | Do. |
| 66 | Diazo 2, $H_2PO_4^-$ | 17 | $Cl^-$ | 1:0.63 | 0.4 | 0.355 p.b.w. of p-toluene sulfonic acid·$H_2O$/p.b.w. MC. | do | II. |
| 67 | do | 11 | $Cl^-$ | 1:0.77 | 0.4 | 0.425 p.b.w. p-toluene sulfonic acid·$H_2O$/p.b.w. MC. | do | II. |

The diazo compounds used in Examples 55 to 65 are prepared as follows:

Examples 55 and 56

Condensation is performed as described in Example 29, using, however, the following conditions and substances:

120.0 parts by weight of 86% phosphoric acid,
32.2 parts by weight of Diazo 2, sulfate, and
8.3 parts by weight of 1,3-dimethyl-4,6-dimethylolbenzene (Component $B_1$, No. 9, Table 1).

The mixture is condensed for 20 hours at 40° C. For Example 55, half of the mixture is dissolved in water, the condensate is precipitated by adding a common salt solution, the precipitate is dissolved in water, and reprecipitated in the form of the naphthalene-1-sulfonic acid salt. Yield: 11.5 parts by weight. (C 65.5%, N 8.0%, S 6.1%; atomic ratio: 28.7:3:1).

The mean molecular weight of the dyestuff produced with phenylmethyl-pyrazolone is 1256.

For Example 56, the other half of the crude condensation mixture is dissolved in water and the corresponding hexafluorophosphate is precipitated by adding hexafluorophosphoric acid. Yield: 21.2 parts by weight. (C 45.4%, N 9.2%; atomic ratio: 17.2:3.) The precipitate contains a small quantity of uncondensed diazo compound.

Examples 57 and 58

The procedure used in Examples 55 and 56 is repeated, using, however, the following substances and conditions:

120.0 parts by weight of 86% phosphoric acid,
32.3 parts by weight of Diazo 2, sulfate (Table 1), and
11.1 parts by weight of 4,6-diisopropyl-1,3-dimethylolbenzene (Component $B_1$, No. 10, Table 1).

The mixture is condensed for 20 hours at 40° C. For Example 57, half of the mixture is dissolved in water, the condensate is precipitated by adding a common salt solution, the precipitate is dissolved again in water, and then reprecipitated in the form of the naphthalene-1-sulfonic acid salt. Yield: 13.3 parts by weight. (C 66.3%, N 7.5%, S 5.6%; atomic ratio: 31:3:0.98.) Mean molecular weight of the pyrazolone dyestuff: 1299.

As Example 58, the second half of the mixture is dissolved in water, and the hexafluorophosphate is precipitated from the solution by adding hexafluorophosphoric acid. Yield: 11.1 parts by weight. (C 52.9%, N 10.7%; atomic ratio: 17.3:3.)

The product contains some uncondensed diazo compound.

Example 59

The procedure is similar to that described in Example 28, but the following conditions and substances are employed:

200.0 parts by volume of phosphoric acid,
3.23 parts by weight of Diazo 2, phosphate (Table 1), and
1.33 parts by weight of 9,10-bis-methoxymethyl-anthracene (Component $B_1$, No. 17, Table 1), in
20.0 parts by volume of glacial acetic acid.

The second component is dissolved in boiling glacial acetic acid and the solution is then poured into the diazo solution. Condensation extends over 20 hours at 40° C. The condensation product is separated in the form of the chloride. Yield: 2.8 parts by weight. (C 51.1%, N 7.8%; atomic ratio: 23:3.)

Examples 60 and 61

The condensation product is prepared in a similar manner as in Example 12, employing, however, the following conditions and substances:

240.0 parts by weight of 86% phosphoric acid,
64.6 parts by weight of Diazo 2, sulfate (Table 1), and
44.4 parts by weight of Component $B_1$, No. 10 (see Ex. 57–58).

The mixture is condensed for 20 hours at 40° C. The crude condensation mixture is dissolved in water and the solution is divided into two parts.

From the first half (Example 60), the condensate is precipitated first with hydrochloric acid to yield the chloride, and finally in the form of the 4,4′-diazido-stilbene-disulfonic acid salt. Yield: 41.9 parts by weight. (C 63.7%, N 12.9%, S 4.8%; atomic ratio: 70.6:12.3:2.)

From the second half (Example 61), the condensate is directly precipitated as the 2,6-di-tert.butyl-naphthalene-disulfonic acid salt. Yield: 38.3 parts by weight. (C 68.1%, N 7.7%, S 4.9%; atomic ratio: 31:3:0.835.)

Example 62

Condensation is effected as in Examples 60 and 61. The condensate is precipitated first with hydrochloric acid and then with naphthalene-2-sulfonic acid. (C 68.3%, N 6.6%, S 4.9%; atomic ratio: 36.2:3:0.98.)

Example 63

A procedure similar to that described in Example 5 is followed, employing, however, the following substances and conditions:

4.85 parts by weight of Diazo 2, phosphate (Table 1),
15.00 parts by volume of methane-sulfonic acid (90%), and
2.04 parts by weight of 1,5-di-acetoxymethyl-naphthalene (Component $B_1$, No. 11, Table 1).

Condensation is effected for 2 hours at room temperature. The condensation product is precipitate in the form of the chloride. Yield: 3.2 parts by weight. (C 64.0%, N 9.4%; atomic ratio: 23.8:3.)

Example 64

The condensate described in Example 42 is precipitated in the form of the 2-diazo-1-naphthol-5-sulfonic acid salt and dried over phosphorus pentoxide until a constant weight is obtained.

Example 65

The condensate corresponds to the one used in Example 42 for the preparation of the azo dyestuff to be fractionated.

Example 66

The condensate described in Example 59 is employed.

Example 67

The condensate described in Example 63 is employed.

Example 68

A screen printing form is prepared as described in Example 38, except that the diazo compound is replaced by the same quantity of the mixed condensate described in Example 52 and the coating solution is diluted with 200 parts by volume of water.

Example 69

An aluminum foil, roughened by means of metal brushes, is treated with polyvinyl phosphonic acid as described in U.S. Patent No. 3,220,832. This plate is then coated with a 0.5% solution of the mixed condensate described in Example 42 (starting material for the preparation of the dyestuff to be fractionated) in an ethyleneglycol monomethylether/butyl acetate mixture (parts by volume: 8 to 2), and the coating is superficially dried.

The plate is then coated with the following solution:

12.0 parts by weight of a diallyl isophthalate prepolymer commercially available under the designation "Dapon M",
55.0 parts by weight of xylene,
33.0 parts by weight of 4-methoxy-4-methyl-2-pentanone,
0.1 part by weight of Michler's ketone,
0.1 part by weight of benzil, and
0.4 part by weight of xanthone.

After the plate has dried, it is image-wise exposed under a negative master. It is developed by rinsing it with a suitable solvent, e.g. 1,1,1-trichloroethane. After drying, development is completed with the Developer II described in Examples 22 to 28 and the plate is then inked up with greasy ink. A printing plate is thus obtained which yields longer runs than a printing plate which was produced from a reproduction material without the second coating (of a second reproduction layer). The composition described in this example displays a relatively good light-sensitivity, because the mixed condensate contained in the first layer has a higher light-sensitivity.

Instead of the coating solution just described, a corresponding solution of polyvinyl cinnamate may be used for the second coating, which has been made sensitive to light of a longer wave-length by the addition of 5% of Michler's ketone.

Example 70

The procedure used in Example 54 is repeated, except that the coating solution used is a solution of 6 parts by weight of the mixed condensate described in Example 6 in 12 parts by weight of an ethyleneglycol monomethyl ether/butyl acetate mixture (proportion by volume: 8:2).

After image-wise exposure under a positive screen, the material is developed with the Developer II stated in Examples 22–28. By treatment with a 40% aqueous solution of iron-III-chloride, the copper in the unexposed areas is deep-etched. For decoating, the material is wiped over with dimethyl formamide. A half-tone gravure plate is thus obtained.

When the material is exposed under a negative and further processed appropriately, a positive relief printing form may be obtained.

Example 71

This example shows that mixed condensates containing only very little diazo compound still yield useful reproduction materials.

An electrolytically roughened aluminum foil is coated with a 2 percent ethyleneglycol monomethyl ether solution of a mixed condensate (which according to analysis contains about 18 p-cresol units per unit of 3-methoxy-4-diazo-diphenylamine), and the coating is then dried.

After image-wise exposure under a negative original, the foil is developed by rinsing it with acetone, dried, wiped over with water, and inked up with greasy ink.

A positive printing form is thus obtained which shows a slight scum, but may be cleaned by wiping over with a solution containing 75 parts by volume of water, 35 parts by volume of n-propanol, and 2 parts by weight of $NaH_2PO_4 \cdot 2H_2O$.

When a condensate consisting only of p-cresol units is prepared under identical conditions and a quantity of 3-methoxy-diphenylamine-4-diazonium chloride corresponding to the quantity of diazo compound incorporated above is added afterwards, a mixture is obtained from which a reproduction layer is produced which also yields a scumming positive printing form by image-wise exposure and development with acetone. However, in an attempt to clean this printing form by wiping it with the solution described above, this printing form is completely destroyed.

Even when ten times the quantity of diazo compound is added afterwards, no better results are obtained.

For the preparation of the mixed condensate, 0.323 part by weight of Diazo 2, sulfate (Table 1) is dissolved in 100 parts by volume of 86% phosphoric acid and this solution is mixed, while vigorously stirring, with a solution of 3.36 parts by weight of 2,6-dimethylol-4-methyl phenol (Component $B_1$, No. 5, Table 1) in 20 parts by volume of warm methanol. At the instant of mixing, a clear solution is formed, which rapidly becomes turbid while the condensate precipitates. After stirring for 1 hour and allowing to stand overnight, the mass was diluted with 400 parts by volume of water and mixed with 150 parts by volume of saturated common salt solution. The precipitate was drawn off by suction, washed neutral with water, and dried. Yield: 2.8 parts by weight. (C 71.0%, N 1.4%; atomic ratio: 177:3.)

An analysis of the 2,6-dimethylol-p-cresol homocondensate prepared under identical conditions yielded the following values: C 71.6%, H 7.1%. This analysis indicates a dibenzylether-like linkage of the units.

Example 72

For the photomechanical preparation of a screen printing stencil, the following procedure is used:

120 parts by weight of a 25% aqueous solution of polyvinyl alcohol (residual acetate content: less than 2 percent; viscosity of a 4% aqueous solution at 20° C.: 17–23 cp.) were thoroughly mixed with 100 parts by weight of an aqueous dispersion of a copolymer on the basis of vinyl acetate/maleic acid ester (protective colloid: polyvinyl alcohol; solids content: 55%; viscosity 5–25 poises measured by a Höppler viscosimeter).

100 parts by weight of this emulsion are thoroughly mixed with a solution of 1.5 parts by weight of the mixed condensate described in Example 29 in 10 parts by volume of water. The emulsion thus prepared is used in known manner for the coating of screens from which screen printing stencils are produced photomechanically. The layers possess an exceptionally good light-sensitivity.

As compared with known screens sensitized by means of chromates, these screens are distinguished by a considerably improved storability at room temperature.

The novel diazonium salts may also be used for sensitizing commercial pre-coated, but not yet sensitized screens.

The above-mentioned unsensitized emulsion, e.g., was applied to a screen and dried, and the layer thus produced was then thoroughly wetted with a 5 percent solution of the mixed condensate described in Example 29 in a 1:1 mixture of methanol and water. After drying, a screen printing stencil was obtained by the usual method.

Examples 73 to 82 show again the good oleophilic properties of the exposure products of some of the diazo mixed condensates when applied to superficially saponified cellulose acetate film. The mixtures obtained during condensation are diluted and then directly used for coating, in order to show that the inventive effect can be produced without separation of the high quantities of acid present. Of course, still better results are achieved when lower quantities of acid are added. For practical purposes, acid additions of less than 3 moles of acid per mole of diazo groups will be preferred for this type of support.

Detailed data concerning the condensation procedure and the coating solutions are listed in Table 7.

Examples 76, 78, 80, 81 and 82 yielded the most favorable results. Due to their high acid content, Examples 74 and 75 showed the weakest effects.

For comparison, a condensation product is prepared analogously to Example 1 of U.S. Pat. No. 3,406,159 from Diazo 3, chloride (Table 1) and formaldehyde in 2.8 basic moles of phosphoric acid, and the phosphoric acid content is then adjusted to 15 basic moles. Superficially saponified cellulose acetate films coated with a 1 percent and a 10 percent aqueous solution of this mixture, respectively, show almost no ink-receptivity in the image areas after image-wise exposure and development with water.

TABLE 7

| | Mixed condensate | | | | Coating solution | | |
|---|---|---|---|---|---|---|---|
| | Diazo compound $A(-D)_n$ | Component $B_1$ | Approx. ratio of $A(-D)_n$ and $B_1$ in cond. mixture | Mole $H_3PO_4$ per mole diazo groups (approx.) | Percentage of crude condensate | Solvent | Developer |
| Example: | | | | | | | |
| 73 | Diazo-2-sulfate | 28 | 1:1 | 15 | 1 | $H_2O$ | $H_2O$ |
| 74 | do | 23 | 1:1 | 150 | 10 | $H_2O$/methanol, 1:1 | $H_2O$ |
| 75 | do | 24 | 1:1 | 130 | 10 | do | $H_2O$ |
| 76 | do | 25 | 1:1 | 15 | 2 | $H_2O$ | $H_2O$ |
| 77 | do | 31 | 1:1 | 15 | 2 | $H_2O$ | $H_2O$ |
| 78 | do | 29 | 1:1.3 | 20 | 2 | $H_2O$ | $H_2O$ |
| 79 | do | 30 | 1:1 | 20 | 2.5 | $H_2O$ | $H_2O$ |
| 80 | do | 26 | 1:1 | 32 | 4 | $H_2O$ | $H_3O$ |
| 81 | do | 27 | 1:1 | 80 | (1) | $H_2O$ | $H_2O$ |
| 82 | do | 32 | 1:1 | 42 | 2 | $H_2O$ | $H_2O$ |

[1] 2% and 10%.

The mixed condensates are prepared as follows.

Example 73

Preparation of Component $B_1$.—12.4 parts by weight of 4,4′-dimethyldiphenylether are dissolved in 27 parts by volume of glacial acetic acid, and then first 5.7 parts by weight of paraformaldehyde, then 28 parts by weight of 63% aqueous hydrobromic acid solution, and finally 16.5 parts by weight of 95% sulfuric acid are added to the solution while stirring. After heating for two hours to 90–95° C., the mixture is allowed to cool overnight.

The crystals contained in the mixture are drawn off by suction, washed with water, and recrystallized from acetone without intermediate drying. Yield: 14.75 parts by weight. Melting point: 109–110° C.

The compound is dissolved in benzene and the solution is then introduced into a boiling solution of caustic soda in methanol (large excess of NaOH). After heating for two hours with reflux, the solution is mixed with water, the benzene phase is separated, washed, dried, and evaporated.

9.2 parts by weight of an oily substance are obtained (Component $B_1$, No. 28). ($OCH_3$ content: 21.7%.)

4.85 parts by weight of Diazo 2, sulfate (Table 1) are dissolved in 15 parts by volume of 86% phosphoric acid, and 4.3 parts by weight of the above described Component $B_1$, No. 28, are added to the solution while stirring. A clear, homogeneous reaction mixture is obtained. After condensing for 5 hours at 40° C., the mass is dissolved in water and the condensation product is precipitated in the form of the chloride by adding an aqueous common salt solution.

Yield: 6.9 parts by weight (C 65.0%, N 7.4%; atomic ratio: C:N=30.8:3.)

Example 74

Component $B_1$, No. 23, is prepared from the potassium salt of p-hydroxy-benzaldehyde and 2,2′-dichlorodiethyl ether (cf. "Makromolekulare Chemie," Vol. 17, page 156, 1955–56) and subsequent reduction with sodium boronhydride in a water-methanol mixture.

For the preparation of the condensate, 1.62 parts by weight of Diazo 2, sulfate (Table 1) are dissolved in 50 parts by volume of 86% phosphoric acid and this solution is then mixed with a solution of 1.6 parts by weight of Component $B_1$, No. 23, in 5 parts by volume of almost boiling glacial acetic acid. After 5 hours' condensation at 40° C. and standing overnight, a crude condensate is formed which is used for the preparation of the coating solution.

Example 75

Component $B_1$, No. 24, is prepared analogously to Component $B_1$, No. 23, from the potassium salt of p-hydroxy-benzaldehyde and 1,3-dibromo-propane, and subsequent reduction of the dialdehyde produced to the dialcohol by means of soium boronhydride.

For the preparation of the condensation product, 0.213 part by weight of Diazo 2, sulfate (Table 1) is dissolved in 1.5 parts by volume of 93% phosphoric acid and mixed with a hot solution of 0.19 part by weight of Component $B_1$, No. 24, in 1 part by volume of glacial acetic acid. After the addition of 3.5 parts by volume of 93% phosphoric acid, the mixture is maintained for 5 hours at a temperature of 40° C. The clear crude condensate which forms is used for preparing the coating solution.

Examples 76 and 77

For the preparation of Component $B_1$, No. 25, 100 parts by weight of diphenylene oxide are bromomethylated, analogously to Example 73 in a mixture of 300 parts by volume of glacial acetic acid, 54 parts by weight of paraformaldehyde, 500 parts by weight of 63% hydrobromic acid, and 294 parts by weight of 96% sulfuric acid at a temperature of 75° C., and the reaction product is then recrystallized from acetone, (bis-bromomethyl-diphenyleneoxide: calculated values—C 47.5%, Br 45.3%; values found: C 47.7%, Br 46.2%) and then caused to react with excess caustic soda solution in methanol.

For the preparation of the condensation product, 16.2 parts by weight of Diazo 2, sulfate (Table 1) are dissolved in 50 parts by volume of 86% phosphoric acid in 12.8 parts by weight of Component $B_1$, No. 51, are heated to 35° C. and then added dropwise.

The mixture is condensed for 5 hours at 40° C. The clear crude condensate is used directly for the experiment. The remainder of the mixture (less 0.2 part by weight) is dissolved in water, and the reaction product is precipitated from the aqueous solution by the addition of a common salt solution. Yield: 22.6 parts by weight. (C 65.7%, N 8.2%; atomic ratio: 2:3).

Component $B_1$, No. 31, and the condensation product prepared therefrom, which is used in Example 77, are prepared analogously to Example 76, except that dibenzothiophene is used as the starting material.

Examples 78 and 79

For the preparation of Component $B_1$, No. 29, thymylphenyl ether prepared in accordance with "Liebig's Annalen der Chemie," vol. 350, page 89 (1906) is bromomethylated for 3.5 hours at 90–95° C. analogously to Example 73 and the reaction product obtained is reacted with caustic soda solution in methanol without further purification. The reaction product thus obtained, which is a viscous oil, has an $OCH_3$ content of 18.6%.

For the preparation of the condensate, 4.85 parts by weight of Diazo 2, sulfate (Table 1) are dissolved in 20 parts by volume of 86% phosphoric acid, 6.0 parts by weight of Component $B_1$, No. 29, are added, and the mixture is condensed for 4 hours at 40° C.

The crude condensate thus obtained (1 part by weight) was used for the preparation of the coating solution. The remainder is dissolved in water and the condensation product is precipitated in the form of the chloride by adding a common salt solution. Yield: 9 parts by weight. (C 66.9%, N 6.7%; atomic ratio: 35:3.)

The condensate used in Example 79 is prepared analogously to Example 78, except that 3-bromo-4-methoxy-diphenylether (prepared in accordance with J. Am. Chem. Soc. *61*, 2702, 1939), is used as the starting material for the preparation of Component $B_1$, No. 30.

Example 80

For the preparation of Component $B_1$, No. 26, diphenyl methane is bromomethylated for 5 hours at 90–95° C. in analogy to Example 73, and the pure 4,4′-bis-bromomethyl-diphenylmethane (melting point 153–154° C.) obtained by recrystallization from benzene is then reacted with sodium hydroxide in methanol.

For the preparation of the condensate, 4.85 parts by weight of Diazo 2 sulfate (Table 1) are dissolved in 15 parts by volume of 86% phosphoric acid and 3.85 parts by weight of Component $B_1$, No. 26, are added dropwise. After adding 15 parts by volume of 93% phosphoric acid, the mixture is condensed for 10 hours at 40° C.

2 parts by weight of the crude condensate are used for the preparation of the coating solution. The remainder is dissolved in water and a common salt solution is added to precipitate the condensate in the form of the chloride, which is then separated and dried. (C 68.6%, N 8.0%; atomic ratio: 30:3.)

Example 81

For the preparation of Component $B_1$, No. 27, diphenyl is bromomethylated for 5 hours at 90–92° C. in analogy to Example 73, and the component of the reaction product which is sparingly soluble in acetone is reacted with sodium hydroxide and methanol ($OCH_3$ content: 23.8%).

For the preparation of the condensate, 6.4 parts by weight of Diazo 2, sulfate (Table 1) are dissolved in 50 parts by volume of 86% phosphoric acid, and 4.8 parts by weight of Component $B_1$, No. 27, are dissolved in 10 parts by volume of warm methanol and this solution is added to the diazo solution. After heating for 2 hours at 40° C., 50 parts by volume of 93% phosphoric acid are added to the mixture which is condensed for 12.5 hours at 40° C.

A sample of the crude condensate is used for the preparation of the coating solution. The remainder is dissolved in water, and hydrochloric acid is added to the aqueous solution to precipitate the chloride of the condensate, which is then separated and dried. (C 68.2%, N 8.2%; atomic ratio: C:N=29.1:3.)

Example 82

For synthesizing Component $B_1$, No. 32, 1,4-diphenoxybenzene prepared in accordance with "Liebig's Annalen der Chemie," vol. 350, page 98 (1906) is bromomethylated for 3 hours at 90–92° C. analogously to Example 73 and the reaction product obtained is reacted with methanolic caustic soda solution. ($OCH_3$ content: 19.2%.)

For the preparation of the mixed condensate, 2.3 parts by weight of Diazo 2, sulfate (Table 1) are dissolved in 20 parts by volume of 86% phosphoric acid, and 2.3 parts by weight of Component $B_1$, No. 32, are added as a hot solution in 1 part by volume of glacial acetic acid. After condensing for 6 hours at 40° C. and standing overnight, a crude condensate has formed which is used for preparing the coating solution.

The mixed condensate may be precipitated from an aqueous solution by adding hydrochloric acid, methane sulfonic acid, or benzene sulfonic acid, e.g.

Example 83

The diazo mixed condensate described in Example 42, in the form of the chloride, is dissolved in water and the aqueous solution is then added to an aqueous solution of sodium azide. The azide, which precipitates with the evolution of nitrogen, is dissolved in toluene, and a 1 percent toluene solution prepared in this manner is used for sensitizing an aluminum foil precoated with polyvinyl phosphonic acid.

After image-wise exposure under a negative original, a brownish image becomes visible. By development with the developer described in Example 1 of U.S. Pat. No. 2,994,609, an offset printing form having good oleophilic properties is produced.

Example 84

An aluminum support which has been roughened by wire brushes and pretreated with polyvinyl phosphonic acid in accordance with U.S. Pat. No. 3,220,832 is sensitized with a blue-colored sensitizing solution of the following composition:

0.55 part by weight of the mixed condensate described in Example 42,
1.65 parts by weight of a polyvinyl formal resin (Formvar) containing 5.5–7.0% of hydroxyl groups, 22–30% of acetate groups ($CH_3COO$—), and 50% of formal groups and having a viscosity of 18–22 cp. (5% solution in ethylenechloride, measured by means of an Ostwald viscosimeter),
0.10 part by weight of Crystal Violet,
0.55 part by volume of 1 M ortho-phosphoric acid,
60.00 parts by volume of ethyleneglycol monomethyl ether,
32.00 parts by volume of tetrahydrofurane, and
8.00 parts by volume of ethyleneglycol methylether acetate.

After drying, the coated aluminum foil is insensitive to humidity and has an excellent shelf-life, so that it can be stored for many months, if kept in the dark.

For the preparation of a printing form, the material is exposed for 1 minute under a conventional xenon lamp, developed with the Developer II mentioned in Examples 22–28, to which 30% of n-propanol have been added, and then inked up in the customary manner with greasy ink. The printing form thus produced may be used for printing approximately 100,000 prints in an offset machine.

Examples 85 and 86

Aluminum foil roughened by means of metal brushes and precoated with polyvinyl phosphonic acid is coated with solutions of the following compositions and the coatings are dried.

| | 85 | 86 |
|---|---|---|
| MC of Example 80 (chloride), p.b.w | 0.83 | |
| MC of Example 81 (chloride), p.b.w | | 0.81 |
| p-Toluenesulfonic acid·$1H_2O$, p.b.w | 0.3 | 0.3 |
| Mixture of 80 p.b.v. of ethylene glycol monomethylether and 20 p.b.v. of butyl acetate, p.b.v | 100 | 100 |

After image-wise exposure under a screen negative, development is performed with one of the developers given in Examples 22 to 28 and the foil is inked up with greasy ink. Efficient printing forms with good oleophilic properties are obtained.

For the described reproduction materials, about one quarter of the exposure time required for a material according to Example 30, Test 1, which contains a formaldehyde condensate of the same diazo compound but without second component, is sufficient.

It is possible to satisfactorily process the presensitized printing plates produced according to Examples 85 and 86 into printing forms, even if they have been heated for 6 hours to 100° C. before exposure to light.

The printing forms can be improved in their efficiency in the usual manner by lacquering.

The mixed condensates used in Examples 85 and 86 also may be first isolated as salts of organic sulfonic acids and then be employed, as it is already described as a particularly advantageous modification in the case of the corresponding condensation products of the bis-methoxymethyl-diphenylether (Example 42) and the bis-methoxymethyl-diphenylsulfide (Example 46).

As sulfonic acids for the separation of the condensation products, there are preferably used in this connection aromatic monosulfonic acids, i.e. such of the benzene and naphthalene series containing up to 12 carbon atoms, e.g. benzene sulfonic acid, toluene sulfonic acid, mesitylene sulfonic acid, p-chloro-benzene sulfonic, p-methoxy-benzene sulfonic acid, naphthalene-1-sulfonic acid, and naphthalene-2-sulfonic acid; especially advantageous are the mesitylene sulfonic acid and the naphthalene-2-sulfonic acid.

The condensates of 3-methoxy-diphenylamine-4-diazonium salts described in Example 46 (1:1 condensate), 85, and 86, in the form of the salts of such sulfonic acids, are, similarly to the corresponding condensation products with bis-methoxymethyl-diphenylether, particularly suitable for the combination with resins insoluble in water, as they are described in Example 42, to produce storable and especially efficient presensitized planographic printing plates.

Particularly long printing runs are obtained also in this case by the addition of polyvinyl formals, e.g. when the coating solution is prepared analogously to Example 84, with the exception that, instead of the mixed condensate used there, the same quantity of the mesitylene sulfonates of the diazo condensates according to Examples 46, 85, or 86 is used.

As described in Example 42, the mesitylene sulfonates of the diazo condensates are prepared from the corresponding chlorides.

For developing the image-wise exposed plates, it is possible to use the Developer II mentioned in Examples 22 to 28, to which about 30 percent of n-propanol are advantageously added.

Example 87

The aluminum support used in Example 42 is coated with a coating solution of the following composition:

1.0 part by weight of the mixed condensate described in Example 2,
1.8 parts by volume of 1 N hydrochloric acid in ethylene glycol monomethyl ether (for conversion of the diazo compound into the chloride),
2.0 parts by weight of an epoxy resin based on bisphenol A and having a melting range of 96–104° C. and an epoxy equivalent weight of 875–975 (Epikote 1004).
4.0 parts by volume of water,
75.0 parts by volume of ethyleneglycol monomethyl ether, and
20.0 parts by volume of butyl acetate.

By drying the coating, a light-sensitive reproduction material is produced. After exposure, it may be converted into a printing form by means of the developer solution mentioned in Example 42.

An additional treatment with the Developer II described in Examples 22 to 28 may be of advantage.

The following examples show the suitability of a number of further compounds for the production of mixed condensates:

Example 88

An intimate mixture of 10.8 parts by weight of 3-methoxydiphenylamine-4-diazonium chloride (Diazo 2, chloride, Table 1) (97.3%) and 0.96 part by weight of paraformaldehyde is introduced, with stirring, into 11.8 parts by weight of 93% phosphoric acid. 1.57 parts by weight of 2,6-bis-(methoxymethyl) - 4 - methyl-phenyl (Component $B_1$, No. 33, Table 1) are then added with adequate stirring. The mixture is then condensed with stirring for 24 hours at 40° C. and a crude condensate is obtained which forms a clear solution in water and does not lose this property even after storage for several months at room temperature.

If, however, 2,6-bis-(methoxymethyl)-4-methyl-phenol is introduced into the phosphoric acid in the absence of the diazo compound and of formaldehyde, the product rapidly dissolves but, after several seconds, a condensation product separates which is scarcely soluble in the acid and in hot water.

Example 89

32.3 parts by weight of 3-methoxy-diphenylamine-4-diazoniumsulfate (Diazo 2, sulfate, Table 1) are dissolved in 100 parts by volume of 86% phosphoric acid. 28.6 parts by weight of 4,4′-bis-(ethoxymethyl)-diphenylether (Component $B_1$, No. 34, Table 1) are then added dropwise with vigorous stirring, stirring is continued for 1 hour without heating and then for another 3.5 hours at 40° C. After standing overnight (room temperature), the mass is dissolved in water (clear solution) and the chloride of the condensation product is precipitated as described in Example 29. Yield: 41.8 parts by weight. As compared with the uncondensed diazo compound, the condensation product has an excess content of 15.8 carbon atoms per diazo group. (C 65.9%, N 8.0%, Cl 8.8%; atomic ratio: 28.8:3:1.3.)

The 4,4′ - bis - (ethoxymethyl) - diphenylether is obtained as a viscous oil from the commercial 4,4′ - bis-(chloromethyl - diphenylether by reaction with sodium ethylate.

EXAMPLE 90

The procedure is the same as that in Example 89, except that instead of the 4,4′ - bis - (ethoxymethyl) - diphenylether, the equivalent quantity (23.0 parts by weight) of 4,4′ - bis - (hydroxymethyl) - diphenylether (Component $B_1$, No. 35, Table 1) is used. The hydroxymethyl compound must be used in a very finely powdered form and is to be introduced only slowly. Careless working may lead to products which are scarcely soluble or insoluble in water. (Condensates of the hydroxymethyl compound predominantly with one another.) Working up is the same as is Example 89. Yield: 41.2 parts by weight. (C 65.6%, N 8.4%, Cl 8.7%; atomic ratio: 27.4:3:1.23.)

The 4,4′ - bis - (hydroxymethyl) - diphenylether is obtained, e.g., by alkaline saponification from the diacetyl compound described in Example 29.

The condensation products prepared according to Examples 89 and 90 may be used with good success in light-sensitive layers of this invention corresponding to those in which the condensation product prepared according to Example 29 is used.

EXAMPLE 91

A mixture of the following components is condensed as described in Example 65:

| | (a), p.b.w. | (b). p.b.w, |
|---|---|---|
| 4-diazo-diphenylamine-3-carboxylic acid (inner salt) (diazo 11, inner salt, Table 1) | 5.5 | 11.0 |
| 86% phosphoric acid | 51.0 | 51.0 |
| 4,4′-bis-(methoxymethyl)-diphenylether (component $B_1$, No. 15, Table 1) | 5.2 | 5.2 |

The clear crude condensates are introduced (a) into 290 parts by volume of methanol, and (b) into 370 parts by volume of methanol, and the precipitates formed are washed (a) with 80 parts by volume of methanol and (b) with three times 100 parts by volume of methanol, and then dried.

Yield:

(a) 8.0 parts by weight
(C 59.1%, N 6.1%, P 5.6%; atomic ratio 34:3:1.25)
(b) 6.8 parts by weight
(C 63.5%, N 7.3%, P 3.3%; atomic ratio: 30.4:3:-0.61)

From the result of the analysis, it can be assumed that the diazo compound and the second component are present in the condensate in a proportion of about 1:1.5 (in the case of a), and about 1:1.24 (in the case of (b).

EXAMPLE 92

15.42 parts by weight of diphenylamine-4-diazonium sulfate (Diazo 1, sulfate, Table 1) are dissolved in 100 parts by volume of 96.5% phosphoric acid and 7.4 parts by weight of dimethyloloxamide (Component $B_1$, No. 36, Table 1) are than added with stirring in small portions. Condensation is carried out for 24 hours at room temperature. The condensation mixture is dissolved in 0.5 liter of water and 80 parts by volume of 50% zinc chloride solution are slowly added dropwise with stirring at 40° C. After cooling down to +10° C., the precipitate is filtered by suction, again dissolved in 0.5 liter of water at 50° C., the product is again precipitated by adding dropwise zinc chloride solution (45 parts by volume) and isolated as described above. Yield: 16.3 parts by weight. According to analysis, the condensation product contains 3 N atoms per 10.6 C atoms. (C 43.0%, N 14.2%.) The diazo homocondensate would have a C:N ratio of 13.3.

EXAMPLE 93

15.42 parts by weight of diphenylamine - 4 - diazonium sulfate (Diazo 1, sulfate, Table 1) (95%) are dissolved in 100 parts by volume of methane sulfonic acid (90%). 10.8 parts by weight of finely powdered dimethylol adipic acid diamide (Component $B_1$, No. 37, Table 1) (94.7%) are added in portions with adequate stirring. When the slight increase in heat caused by the reaction has vanished, the mass is condensed for 25 hours at room temperature. The crude condensate is dissolved in 500 parts by volume. By the addition of 80 parts by volume of 50% zinc chloride solution, the condensate separates as a tacky precipitate at room temperature. The mother liquor is decanted, the precipitate is dissolved in 500 parts by volume of water at 50° C., and again precipitated after cooling down to +10° C. by the addition of 50 parts by volume of 50% zinc chloride solution. The product is filtered by suction and dried under reduced pressure. According to analysis, the condensate contains about 0.7 molecule of the acid amide per molecule of diazo compound.

EXAMPLE 94

4.47 parts by weight of diphenylamine-4-diazonium phosphate (Diazo 1, phosphate, Table 1) (98.4%) are dissolved in 60 parts by volume of 92% phosphoric acid. 4.85 parts by weight of trimethylolcitroamide (Component $B_1$, No. 38, Table 1) (86.3%, remainder water) are then added and the mass in condensed for 45 hours at room temperature, The condensation mixture forming a clear solution in water is diluted with 30 parts by volume of methanol and the mixture is stirred into 500 parts by volume of isopropanol. The precipitating reaction product is filtered by suction and dried under reduced pressure. Yield: 10.8 parts by weight. According to analysis, the ratio N:C is 3:10.8. (C 28.8%, N 9.3%.)

EXAMPLES 95 and 96

In these examples, it is shown how two further diazo compounds (Nos. 12 and 13, Table 1) may be condensed with a component $B_1$ in an acid condensation medium to form mixed condensates.

In both examples, the diazo compounds are dissolved in the condensation medium in the form of their metal halide double salts. Dry air is passed through the mixture until hydrogen chloride ceases to escape. Then the second component is added and condensation is effected at room temperature for the periods of time stated. Mixed condensates result which form clear solutions in water.

If the component $B_1$ is introduced alone into the condensation medium, a homocondensate of component $B_1$ is formed during a condensation process of the same duration, which separates readily from the condensation mixture and is not dissolved by the addition of water.

In the following table, the quantities used and the duration of the condensation process are stated:

| Example | 95 | 96 |
|---|---|---|
| Condensation medium | 90% methane sulfonic acid (10 p.b.v.). | 90% methane sulfonic acid (10 p.b.v.). |
| Diazo compound | 2,5-dimethoxy-4-(N-methyl-N-phenylmercapto-acetylamino)-benzene diazonium chloride plus ½ mole of zinc chloride (N 8.8%) (0.95 p.b.w.). | 4-[N-methyl-N-(β-phenylmercapto-ethyl)-amino]-benzene diazonium chloride plus ½ mole of tin tetrachloride (N 6.3%) (1.33 p.b.w.). |
| Second component | 1,4-bis-hydroxy methylbenzene (0.14 p.b.w.) (Component $B_1$, No. 12, table 1). | 1,4-bis-hydroxy-methylbenzene (0.14 p.b.w.) (Component $B_1$, No. 12, Table 1). |
| Duration of condensation process. | 4 hours | 4 hours. |

It will be obvious to those skilled in the art that many modifications may be made within the scope of the present invention without departing from the spirit thereof, and the invention includes all such modifications.

What is claimed is:

1. A process for the preparation of a polycondensation product of an aromatic diazonium compound which comprises reacting in the absence of added formaldehyde at least one $A—N_2X$ compound and at least one $B_1$ compound of the formula $$E(—CHR_a—OR_b)_m$$

in which $A—N_2X$ is a radical of a compound selected from the group consisting of a compound of the formula

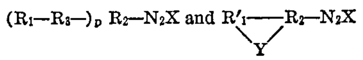

wherein $R_1$ is a phenyl or naphthyl group
$R'_1$ is a phenylene or naphthylene group
$R_2$ is a phenylene group
$R_3$ is a single bond or one of the groups
—$(CH_2)_q$—$NR_4$—
—O—$(CH_2)_r$—$NR_4$—
—S—$(CH_2)_r$—$NR_4$—
—S—$CH_2$—CO—$NR_4$—
—O—$R_5$—O—
—O—
—S— or
—CO—$NR_4$—
the left-hand free valence of the specified groups is attached to $R_1$ and the right-hand free valence is attached to $R_2$,
wherein
$q$ is a number from 0 to 5
$r$ is a number from 2 to 5
$R_4$ is selected from the group consisting of hydrogen, alkyl with 1 to 5 carbon atoms, aralkyl with 7 to 12 carbon atoms, and aryl with 6 to 12 carbon atoms,
$R_5$ is an arylene group having 6 to 12 carbon atoms
Y is one of the groups —NH—, and —O—
X is an anion
p is a number from 1 to 3
E is a radical obtained by splitting off of m H atoms from a compound free of diazonium group selected from the group consisting of aromatic amines, phenols, thiophenols, phenol ethers, aromatic thioethers, aromatic heterocyclic compounds, aromatic hydrocarbons and organic acid amides,
$R_a$ is selected from the group consisting of hydrogen and phenyl,
$R_b$ is selected from the group consisting of hydrogen and alkyl $C_nH_{2n+1}CO$— wherein $n$ is from 0 to 3 and a phenyl group, and
$m$ is an integer from 1 to 10.

in a strongly acidic condensation medium and under condensation conditions sufficient to produce a polycondensation product of an aromatic diazonium compound containing, on the average, about 0.1 to 50 $B_1$ units per unit of $A—N_2X$.

2. A process according to claim 1 in which the condensation medium used is a concentrated acid.

3. A process according to claim 2 in which the condensation medium used is selected from the group consisting of phosphoric acid, methane sulfonic acid, and sulfuric acid, in a concentration in the range of about 70 to 100 percent.

4. A process according to claim 3 in which the condensation medium used is orthophosphoric acid in a concentration of about 80 to 100 percent.

5. A process according to claim 1 in which the condensation is performed in a temperature range of about 10° C. to 70° C.

6. A process according to claim 1 in which the condensation is performed in a temperature range of about 10° C. to 40° C.

7. A process according to claim 1 wherein E is a radical

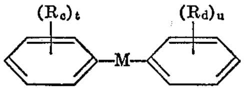

wherein

M is selected from the group consisting of a single bond, an alkylene chain, having 1 to 3 carbon atoms and the groups —O—alkylene—O—
—O—alkylene—O—alkylene—O—
—O—arylene—O—
—O—, or
—S—, $R_c$ and $R_d$ being selected from the group consisting of H, alkyl having 1 to 3 carbon atoms, alkoxy having 1 to 3 carbon atoms, and halogen, and

*t* and *u* being whole numbers from 1 to 4.

8. A process according to claim 1 in which *m* is 2.

9. A process according to claim 1 in which the E $(—CHR_a—OR_b)_m$ compound is a compound selected from the group consisting of diphenyl ethers, diphenyl sulfides, diphenyl methanes, and biphenyls.

10. A process according to claim 1 in which the $B_1$ compound is a substantially pure compound of the formula E $(—CHR_a—OR_b)_2$ wherein E is a radical of a compound selected from the group consisting of diphenyl ethers, diphenyl sulfides, diphenyl methanes and biphenyls, and the $—CHR_a—OR_b$ groups are in the 4,4′-positions.

11. A process according to claim 1 in which a $B_1$ compound is used wherein $R_a$ is H.

12. A process according to claim 1 in which a $B_1$ compound is used wherein $R_b$ is $CH_3$.

13. A process according to claim 1 in which the $A—N_2X$ units are derived from at least one compound of the formula $$R_1—R_3—R_2—N_2X$$

wherein

X is the anion of the diazonium compound, $R_1$ is selected from the group consisting of phenyl and substituted phenyl having at least one condensable nucleus position, the substituents being groups activating condensability, $R_2$ is selected from the group consisting of phenylene and phenylene substituted by one or more halogen atoms, alkyl groups with 1 to 3 carbon atoms, and alkoxy groups with 1 to 5 carbon atoms, and $R_3$ is a single bond or one of the groups

—O—
—S—

H
|
—N—

14. A process according to claim 13 in which the $A—N_2X$ units are derived from a compound of the formula

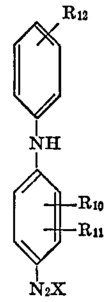

wherein $R_{10}$, $R_{11}$, and $R_{12}$ are selected from the group consisting of hydrogen, halogen, alkyl groups with 1 to 3 carbon atoms, and alkoxy groups with 1 to 5 carbon atoms, and X is the anion of the diazonium salt.

15. A process according to claim 14 in which the $A—N_2X$ units are derived from a compound of the formula

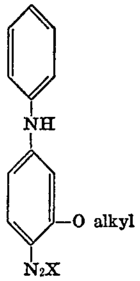

the alkyl group containing 1 to 5 carbon atoms.

16. A process according to claim 1 in which the polycondensation product contains about 0.1 to 10 units derived from $B_1$ per unit of $A—N_2X$.

17. A process according to claim 1 in which the $A—N_2X$ compound is 3-methoxy-diphenylamine-4-diazonium dihydrogen phosphate and the $B_1$ compound is 2,6-dimethylol-4-methyl-phenol.

18. A process according to claim 1 in which the $A—N_2X$ compound is 3-methoxy-diphenylamine-4-diazonium hydrogensulfate, the $B_1$ compound is 4-methyl-2,6-bis-hydroxymethyl-anisole, and the polycondensation product is separated as the chloride.

19. A process according to claim 1 in which the $A—N_2X$ compound is 3-methoxy-diphenylamine-4-diazonium hydrogensulfate, the $B_1$ compound is 1,3-diisopropyl-4,6-dimethylol-benzene, and the polycondensation product is separated as the chloride.

20. A process according to claim 1 in which the $A—N_2X$ compound is 3-methoxy-diphenylamine-4-diazonium hydrogenphosphate, the $B_1$ compound is 1,5-diacetoxymethyl-naphthalene, and the polycondensation product is separated as the chloride.

21. A process according to claim 1 in which the $A—N_2X$ compound is 3-methoxy-diphenylamine-4-diazonium hydrogensulfate, the $B_1$ compound is an isomeric mixture of di-, tri-, and tetra-methoxymethyl diphenylethers, and the polycondensation product is separated as the chloride.

22. A process according to claim 1 in which the $A—N_2X$ compound is 3-methoxy-diphenylamine-4-diazonium hydrogensulfate, the $B_1$ compound is 4,4′-di-methoxymethyl-diphenylsulfide, and the polycondensation product is separated as the chloride.

23. A process according to claim 1 in which the $A—N_2X$ compound is 3-methoxy-diphenylamine-4-diazonium hydrogensulfate and the $B_1$ compound is di-methoxymethyl-diphenyleneoxide.

24. A process according to claim 1 in which the A—$N_2X$ compound is 3-methoxy-diphenylamine-4-diazonium hydrogensulfate and the $B_1$ compound is di-methoxymethyl-dibenzothiophene.

25. A process according to claim 1 in which the A—$N_2X$ compound is a mixture of diphenylamine-4-diazonium hydrogenphosphate and 3-methoxy-diphenylamine-4-diazonium hydrogenphosphate and the $B_1$ compound is 2,5-diethoxymethyl-thiophene.

26. A process according to claim 1 in which the A—$N_2X$ compound is 3-methoxy-diphenylamine-4-diazonium hydrogensulfate and the $B_1$ compound is methoxymethylated 2-isopropyl-5-methyl-diphenylether.

27. A process according to claim 1 in which the A—$N_2X$ compound is 3-methoxy-diphenylamine-4-diazonium hydrogensulfate and the $B_1$ compound is 4,4'-dimethoxymethyl-diphenylmethane.

28. A process according to claim 1 in which the A—$N_2X$ compound is 3-methoxy-diphenylamine-4-diazonium hydrogensulfate and the $B_1$ compound is 4,4'-dimethoxymethyl-biphenyl.

29. A process according to claim 1 in which the A—$N_2X$ compound is 3-methoxy-diphenylamine-4-diazonium hydrogensulfate, the $B_1$ compound is 4,4 -dimethoxymethyl-diphenylether, and the polycondensation product is separated as the mesitylenesulfonate.

30. A process according to claim 7 in which M is selected from the group consisting of a single bond and the groups

—O—,

—S—, or

—$CH_2$—.

31. A process according to claim 1 in which $R_2$ is a phenylene group either unsubstituted or substituted by one or two substituents selected from the group consisting of halogen atoms, alkyl groups with 1 to 4 carbon atoms, alkoxy groups with 1 to 5 carbon atoms and carboxyl groups.

32. A process according to claim 1 in which A—$N_2X$ is a radical of a compound of the formula $$(R_1—R_3—)_pR_2—N_2X$$

wherein $R_1$ is a phenyl or naphthyl group either unsubstituted or substituted by one or two substituents increasing the reactivity of the aromatic nucleus with respect to condensation, selected from the group consisting of alkyl group with 1 to 4 carbon atoms, alkoxy and alkylmercapto groups with 1 to 5 carbon atoms, aryloxy and arylmercapto groups with 6 or 7 carbon atoms, hydroxy, mercapto, amino, and anilino groups, $R_2$ is a phenylene group either unsubstituted or substituted by one or two substituents selected from the group consisting of halogen atoms, alkyl groups with 1 to 4 carbon atoms, alkoxy groups with 1 to 5 carbon atoms and carboxyl groups, $R_3$ is a single bond or one of the groups —$(CH_2)_q$—$NR_4$—
—O—$(CH_2)_r$—$NR_4$—
—S—$(CH_2)_r$—$NR_4$—
—S—$CH_2$—CO—$NR_4$—
—O—$R_5$O—
—O—
—S— or
—CO—$NH_4$— the left-hand free valence of the specified group is attached to $R_1$ and the right-hand free valence is attached to $R_2$, wherein $q$ is a number from 0 to 5

$r$ is a number from 2 to 5

$R_4$ is selected from the group consisting of hydrogen, alkyl with 1 to 5 carbon atoms, aralkyl with 7 to 12 carbon atoms, and aryl with 6 to 12 carbon atoms, $R_5$ is an arylene group having 6 to 12 carbon atoms, X is an anion, and $p$ is a number from 1 to 3.

References Cited

UNITED STATES PATENTS

| | | | |
|---|---|---|---|
| 2,063,631 | 12/1936 | Schmidt et al. | 260—141 |
| 2,541,727 | 2/1951 | Von Glahn et al. | 96—91 R |
| 3,163,633 | 12/1964 | Steppan et al. | 260—141 |
| 3,235,383 | 2/1966 | Steppan et al. | 260—141 X |
| 3,311,605 | 3/1967 | Steppan et al. | 260—141 |
| 3,406,159 | 10/1968 | Steppan et al. | 260—141 |
| 3,591,575 | 7/1971 | Golda | 260—141 |
| 3,679,419 | 7/1972 | Gillich | 96—91 R |

FOREIGN PATENTS

| | | | |
|---|---|---|---|
| 631,751 | 11/1963 | Belgium | 96—45 |

FLOYD DALE HIGEL, Primary Examiner

U.S. Cl. X.R.

96—33, 49, 66 R, 75 R, 115; 260—140, 142, 349

UNITED STATES PATENT OFFICE
CERTIFICATE OF CORRECTION

Patent No. 3,849,392 Dated November 19, 1974

Inventor(s) Hartmut Steppan

It is certified that error appears in the above-identified patent and that said Letters Patent are hereby corrected as shown below:

Column 1, line 6, "Kalle Aktiengesellschaft, Wiesbaden-Biebrich" should read --- Hoechst Aktiengesellschaft, Frankfurt/Main".

Column 3, line 52, "Tencher" should read --- Teuscher ---.

Column 4, line 65, "occure" should read --- occur ---.

Column 5, line 56, "reduced" should read --- reduce ---.

Column 31, line 73, "initail" should read --- initial ---.

Column 33, line 4, "repreduction" should read --- reproduction ---.

Column 36, line 21, "solvel" should read --- solved ---; line 24, "effective" should read --- effected ---.

Column 47, line 47, "methoxyemthyl" should read --- methoxymethyl ---.

Column 48, line 22, "in" should be inserted after "dissolved". Line 56, "remain" should read --- maintain ---.

Column 49, line 40, "1.000" should read --- 100.0 ---. Line 69, "wits" should read --- with ---.

Column 64, line 31, "formula" should read --- formulae ---. Line 73, "and" should be inserted after "alkyl".

Signed and sealed this 4th day of February 1975.

(SEAL)
Attest:

McCOY M. GIBSON JR.
Attesting Officer

C. MARSHALL DANN
Commissioner of Patents